United States Patent
Zhang et al.

(10) Patent No.: US 10,969,784 B2
(45) Date of Patent: *Apr. 6, 2021

(54) SYSTEM AND METHOD FOR PROVIDING EASY-TO-USE RELEASE AND AUTO-POSITIONING FOR DRONE APPLICATIONS

(71) Applicant: Hangzhou Zero Zero Technology Co., Ltd., Zhejiang (CN)

(72) Inventors: Tong Zhang, Zhejiang (CN); Mengqiu Wang, Zhejiang (CN)

(73) Assignee: Hangzhou Zero Zero Technology Co., Ltd., HangZhou (CN)

( * ) Notice: Subject to any disclaimer, the term of this patent is extended or adjusted under 35 U.S.C. 154(b) by 205 days.

This patent is subject to a terminal disclaimer.

(21) Appl. No.: 16/192,151

(22) Filed: Nov. 15, 2018

(65) Prior Publication Data

US 2019/0086919 A1   Mar. 21, 2019

Related U.S. Application Data

(63) Continuation of application No. 15/658,572, filed on Jul. 25, 2017, now Pat. No. 10,168,704.

(Continued)

(51) Int. Cl.
*B64C 39/02* (2006.01)
*G05D 1/00* (2006.01)
(Continued)

(52) U.S. Cl.
CPC ........ *G05D 1/0088* (2013.01); *B64C 39/024* (2013.01); *G05D 1/0016* (2013.01); *G05D 1/0094* (2013.01); *G05D 1/0669* (2013.01); *G06F 3/017* (2013.01); *H04N 5/23216* (2013.01); *H04N 5/23296* (2013.01); *H04N 5/232935* (2018.08); *B64C 2201/146* (2013.01); *B64D 47/08* (2013.01); *G06F 3/0488* (2013.01);

(Continued)

(58) Field of Classification Search
CPC . B64C 2201/146; B64C 39/024; B64D 47/08; G05D 1/0016; G05D 1/0088; G05D 1/0094; G05D 1/0669; G06F 2203/04808; G06F 3/017; G06F 3/0488; G06F 3/16; H04N 5/2252; H04N 5/2258; H04N 5/23216; H04N 5/232935; H04N 5/23296
See application file for complete search history.

(56) References Cited

U.S. PATENT DOCUMENTS

| 10,168,704 B2 * | 1/2019 | Zhang | H04N 5/23216 |
| 2015/0035437 A1 * | 2/2015 | Panopoulos | F21V 14/02 |
| | | | 315/112 |

(Continued)

FOREIGN PATENT DOCUMENTS

| CN | 105391939 A | 3/2016 |
| CN | 105549604 A | 5/2016 |
| CN | 106708089 A | 5/2017 |

OTHER PUBLICATIONS

International Search Report and Written Opinion (International Application No. PCT/IB2018/053947) dated Sep. 19, 2018; 9 pages.

*Primary Examiner* — Timothy A Brainard
(74) *Attorney, Agent, or Firm* — Howard & Howard Attorneys PLLC

(57) ABSTRACT

System and method for controlling an aerial system to perform a selected operation using an easy-to-use release and auto-positioning process.

20 Claims, 32 Drawing Sheets

Related U.S. Application Data

(60) Provisional application No. 62/515,400, filed on Jun. 5, 2017.

(51) Int. Cl.
| | |
|---|---|
| *H04N 5/232* | (2006.01) |
| *G06F 3/01* | (2006.01) |
| *G05D 1/06* | (2006.01) |
| B64D 47/08 | (2006.01) |
| G06F 3/16 | (2006.01) |
| G06F 3/0488 | (2013.01) |
| H04N 5/225 | (2006.01) |

(52) U.S. Cl.
CPC ...... *G06F 3/16* (2013.01); *G06F 2203/04808* (2013.01); *H04N 5/2252* (2013.01); *H04N 5/2258* (2013.01)

(56) References Cited

U.S. PATENT DOCUMENTS

| | | |
|---|---|---|
| 2015/0120095 A1 | 4/2015 | Coulmeau et al. |
| 2016/0062364 A1* | 3/2016 | Foinet .................. G05D 1/0011 701/2 |
| 2016/0194079 A1 | 7/2016 | Montreuil |
| 2016/0304217 A1 | 10/2016 | Fisher et al. |

* cited by examiner

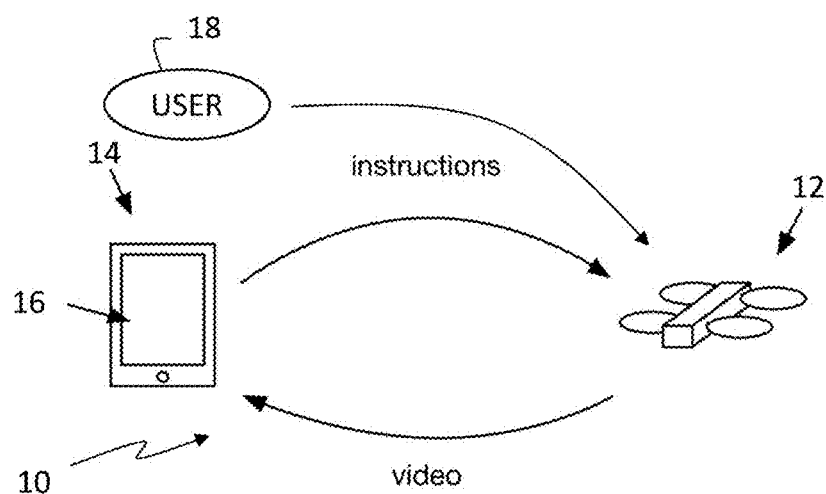
FIGURE 1
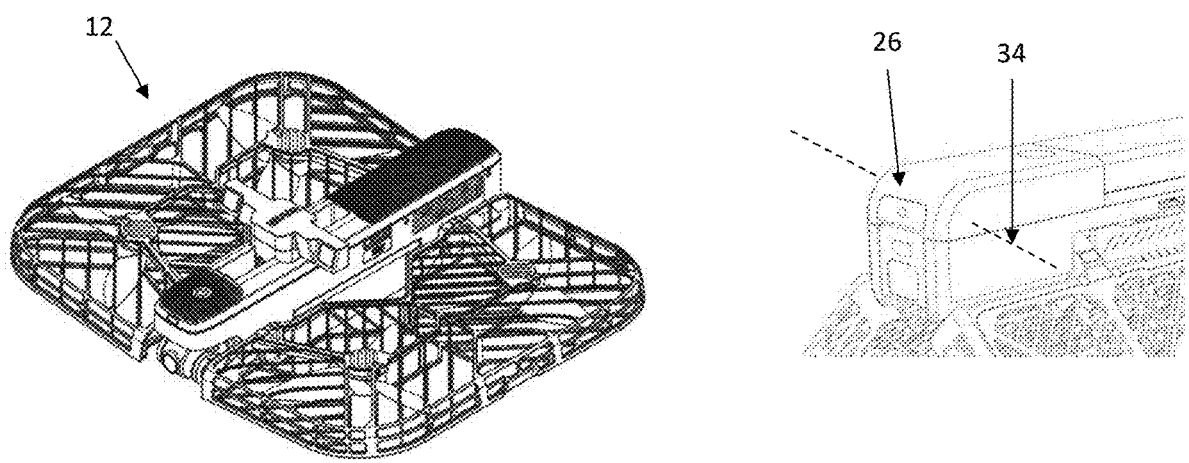
FIGURE 2
FIGURE 3

SYSTEM AND METHOD FOR PROVIDING EASY-TO-USE RELEASE AND AUTO-POSITIONING FOR DRONE APPLICATIONS

CROSS-REFERENCE TO RELATED APPLICATION

This application is a continuation of U.S. patent application Ser. No. 15/658,572, filed Jul. 25, 2017, which claims the benefit of U.S. Provisional Patent Application Ser. No. 62/515,400, filed Jun. 5, 2017, the disclosures of which are hereby incorporated by reference in their entirety.

TECHNICAL FIELD

This invention relates generally to the aerial system field, and more specifically, to a system and method for providing easy-to-use release and auto-position of a drone.

BACKGROUND OF THE INVENTION

Traditional user interface for operating a drone is not user friendly. When a user wants to take a photo or video with a drone equipped with a camera, a dedicated remote controller or a cell phone is used to wirelessly control and maneuver the drone. And it takes a significant amount of effort for the user to position the drone to a desired location and camera view angle before a photo or video can be captured. The battery time is not long for small/medium size drones, typically in the range of 5-20 mins. The longer it takes to position the drone, the less time it leaves for the user to actually use the drone to capture photos and videos. So it is beneficial to have an intuitive, easy-to-use and reliable drone selfie interaction such that the drone can be placed to a desired location as quickly as possible and that most of the flying time of the drone camera can be saved and utilized for its most important functionality: taking photos and videos.

The present invention is aimed at one or more of the problems identified above.

SUMMARY OF THE INVENTION

In one aspect of the present invention, an aerial system having a body, a lift mechanism, an optical system and a processing system is provided. The lift mechanism is coupled to the body. The optical system is controllably mounted to the body by an actuation system. The processing system is coupled to the lift mechanism, the optical system, and the actuation system and is configured to:

provide a user interface to allow a user to select an operation to perform;

detect a flight event;

control the aerial system to move to a designated position defined by the selected operation;

perform a predefined action defined by the selected operation;

operate the aerial system in a retrieving mode when the predefined action has completed;

detect a standby event; and operate the aerial system in a standby mode in response to detecting the standby event.

In another aspect of the present invention, a method for controlling an aerial system is provided. The method includes the steps of:

providing a user interface;

allowing a user to select an operation to perform;

detecting a flight event;

controlling the aerial system to move to a designated position defined by the selected operation;

performing a predefined action defined by the selected operation;

operating the aerial system in a retrieving mode when the predefined action has completed;

detecting a standby event; and operating the aerial system in a standby mode in response to detecting the standby event.

BRIEF DESCRIPTION OF THE FIGURES

FIG. 1 is a schematic representation of an aerial system and a system for controlling the aerial system, according to an embodiment of the present invention.

FIG. 2 is a picture of an exemplary aerial system, according to an embodiment of the present invention.

FIG. 3 is a picture of an exemplary optical system, according to an embodiment of the present invention.

DETAILED DESCRIPTION OF THE INVENTION

Figure 4:
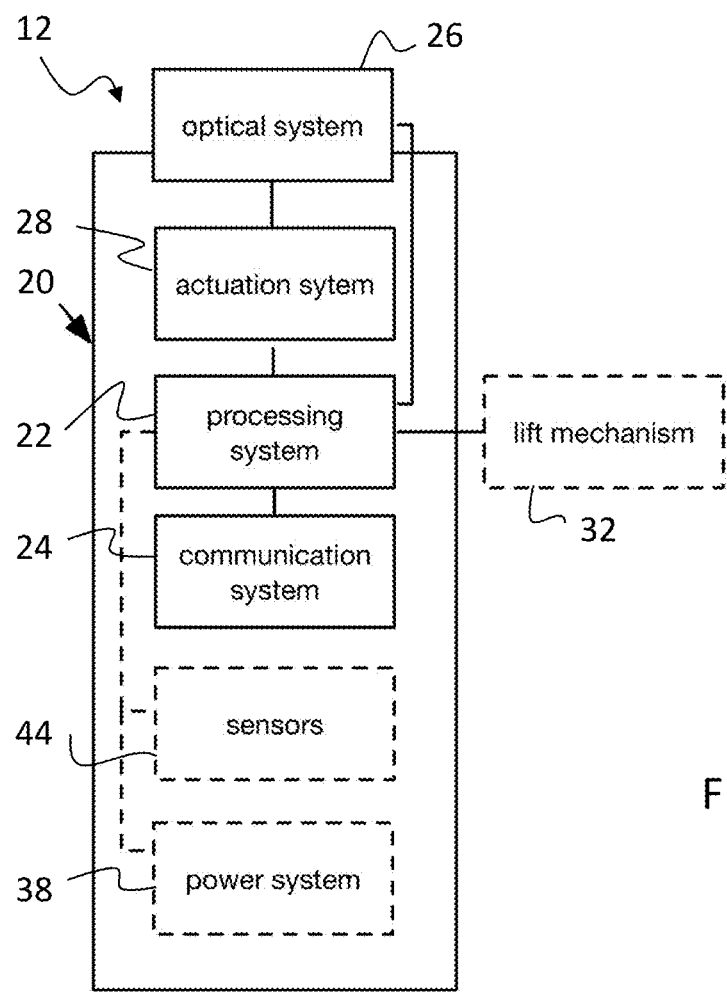
FIG. 4 is a second schematic representation of the aerial system, according to an embodiment of the present invention.

The following description of the embodiments of the invention is not intended to limit the invention to these embodiments, but rather to enable any person skilled in the art to make and use this invention. With reference to the drawings and in operation, system 10 for controlling an aerial system 12, for example a drone, is provided. The system 10 includes a remote device 14 with a control client 16. The control client 16 provides a user interface (see below) that allows a user 18 to send instructions to the aerial system 12 to control operation thereof. As discussed in more depth below, the aerial system 12 includes one or more cameras (see below) for obtaining pictures and/or video which may be sent to the remote device 14 and/or stored in memory on the aerial system 12.

Alternatively, or in addition, the aerial system 12 may include one or more sensors (see below) for detecting or sensing operations or actions, i.e., expressions, performed by the user 18 to control operation of the aerial system 12 (see below) without direct or physical interaction with the remote device 14. In controller-free embodiments, the entire control loop from start (release and hover) to finish (grab and go), as well as controlling motion of the aerial system 12 and trigger of events, e.g., taking pictures and video, are performed solely on board the aerial system 12 without involvement of the remote device 14. In some such embodiments or systems 10, a remote device 14 may not be provided or included.

In further embodiments of the present invention, the aerial system 12 through a control client 16 on the remote device 14 or through a user interface on the body of the drone or aerial system 12, allows a user to select an action to be performed by the aerial system 12. Once the action is selected, the drone lifts off, moves to a designated position, and performs the necessary steps to complete the selected action.

In some embodiments, the remote device 14 includes one or more sensors that detect or sense operation or actions performed by the user 18 to control operation of the aerial system 12 without physical interaction with the remote device 14 under certain conditions, for example, when the aerial system 12 is too far from the user 18.

An exemplary aerial system 12 and control system 10 is shown in FIGS. 1-5. The control client 16 of the aerial system 12 functions to receive data from the aerial system 12, including video images and/or video, and control visual display on the remote device 14. The control client 16 may also receive operation instructions and facilitate aerial system 12 remote control based on operation instructions. The control client 16 is preferably configured to execute on a remote device 14, but can alternatively be configured to execute on the aerial system 12 or on any other suitable system. As discussed above, and more fully below, the aerial system 12 may be controlled solely without direct or physical interaction with the remote device 14.

The control client 16 can be a native application (e.g., a mobile application), a browser application, an operating system application, or be any other suitable construct.

The remote device 14 executing the control client 16 functions to display the data (e.g., as instructed by the control client 16), receive user inputs, compute the operation instructions based on the user inputs (e.g., as instructed by the control client 16), send operation instructions to the aerial system 12, store control client information (e.g., associated aerial system identifiers, security keys, user account information, user account preferences, etc.), or perform any other suitable functionality. The remote device 14 can be a user device (e.g., smartphone, tablet, laptop, etc.), a networked server system, or be any other suitable remote computing system. The remote device 14 can include one or more: outputs, inputs, communication systems, sensors, power sources, processing systems (e.g., CPU, memory, etc.), or any other suitable component. Outputs can include: displays (e.g., LED display, OLED display, LCD, etc.), audio speakers, lights (e.g., LEDs), tactile outputs (e.g., a tixel system, vibratory motors, etc.), or any other suitable output. Inputs can include: touchscreens (e.g., capacitive, resistive, etc.), a mouse, a keyboard, a motion sensor, a microphone, a biometric input, a camera, or any other suitable input. Communication systems can include wireless connections, such as radios supporting: long-range systems (e.g., Wi-Fi, cellular, WLAN, WiMAX, microwave, IR, radio frequency, etc.), short-range systems (e.g., BLE, BLE long range, NFC, ZigBee, RF, audio, optical, etc.), or any other suitable communication system. Sensors can include: orientation sensors (e.g., accelerometer, gyroscope, etc.), ambient light sensors, temperature sensors, pressure sensors, optical sensors, acoustic sensors, or any other suitable sensor. In one variation, the remote device 14 can include a display (e.g., a touch-sensitive display including a touchscreen overlaying the display), a set of radios (e.g., Wi-Fi, cellular, BLE, etc.), and a set of orientation sensors. However, the remote device 14 can include any suitable set of components.

The aerial system 12 functions to fly within a physical space, capture video, stream the video in near-real time to the remote device 14, and operate based on operation instructions received from the remote device 14.

The aerial system 12 can additionally process the video (e.g., video frames) prior to streaming the video to the remote device 14 and/or audio received from an onboard audio sensor; generate and automatically operate based on its own operation instructions (e.g., to automatically follow a subject); or perform any other suitable functionality. The aerial system 12 can additionally function to move the optical sensor's field of view within the physical space. For example, the aerial system 12 can control macro movements (e.g., large FOV changes, on the order of meter adjustments), micro movements (e.g., small FOV changes, on the order of millimeter or centimeter adjustments), or any other suitable movement.

As discussed in more detail below, the aerial system 12 can perform certain functionality based on onboard processing of sensor data from onboard sensors. This functionality may include, but is not limited to:

Take-off and landing;
Owner recognition;
Facial recognition;
Speech recognition;
Facial expression and gesture recognition; and,
Control, e.g., motion, of the aerial system based on owner, facial, expression and gesture recognition, and speech recognition.

As shown in FIGS. 2-5, the aerial system 12 (e.g., drone) can include a body 20, a processing system 22, a communication system 24, an optical system 26, and an actuation mechanism 28 mounting the optical system 26 to the body 20. The aerial system 12 can additionally or alternatively include lift mechanisms, sensors, power system, or any other suitable component (see below).

The body 20 of the aerial system 12 functions to mechanically protect and/or retain the aerial system components. The body 20 can define a lumen, be a platform, or have any suitable configuration. The body 20 can be enclosed, open (e.g., a truss), or have any suitable construction. The body 20 can be made of metal, plastic (e.g., polymer), carbon composite, or any other suitable material. The body 20 can define a longitudinal axis, a lateral axis, a transverse axis, a front end, a back end (e.g., opposing the front end along the longitudinal axis), a top, a bottom (e.g., opposing the top along the transverse axis), or any other suitable reference. In one variation, while in flight, a transverse axis of the body 20 can be substantially parallel a gravity vector (e.g., perpendicular a ground plane) and the body's longitudinal and lateral axes can be substantially perpendicular the gravity vector (e.g., parallel the ground plane). However, the body 20 can be otherwise configured.

The processing system 22 of the aerial system 12 functions to control aerial system operation. The processing system 22 can: receive operation instructions from the communication system 24, interpret the operation instructions into machine instructions, and control aerial system components based on the machine instructions (individually or as a set). The processing system 22 can additionally or alternatively process the images recorded by the camera, stream images to the remote device 14 (e.g., in real- or near-real time), or perform any other suitable functionality. The processing system 22 can include one or more: processors 30 (e.g., CPU, GPU, etc.), memory (e.g., Flash, RAM, etc.), or any other suitable processing component. In one variation, the processing system 22 can additionally include dedicated hardware that automatically processes the images (e.g., de-warps the image, filters the image, crops the image, etc.) prior to transmission to the remote device 14. The processing system 22 is preferably connected to the active components of the aerial system 12 and mounted to the body 20, but can alternatively be otherwise related to aerial system components.

The communication system 24 of the aerial system functions to send and/or receive information from the remote device 14. The communication system 24 is preferably connected to the processing system 22, such that the communication system 24 sends and/or receives data form the processing system 22, but can alternatively be connected to any other suitable component. The aerial system 12 can include one or more communication systems 24 of one or more types. The communication system 24 can include wireless connections, such as radios supporting: long-range systems (e.g., Wi-Fi, cellular, WLAN, WiMAX, microwave, IR, radio frequency, etc.), short-range systems (e.g., BLE, BLE long range, NFC, ZigBee, RF, audio, optical, etc.), or any other suitable communication system 24. The communication system 24 preferably shares at least one system protocol (e.g., BLE, RF, etc.) with the remote device 14, but can alternatively communicate with the remote device 14 via an intermediary communication system (e.g., a protocol translation system). However, the communication system 24 can be otherwise configured.

The optical system 26 of the aerial system 12 functions to record images of the physical space proximal the aerial system 12. The optical system 26 is preferably mounted to the body 20 via the actuation mechanism 28, but can alternatively be statically mounted to the body 20, removably mounted to the body 20, or otherwise mounted to the body 20. The optical system 26 is preferably mounted to the front end of the body 20, but can optionally be mounted to the bottom (e.g., proximal the front), top, back end, or any other suitable portion of the body 20. The optical system 26 is preferably connected to the processing system 30, but can alternatively be connected to the communication system 24 or to any other suitable system. The optical system 26 can additionally include dedicated image processing hardware that automatically processes images recorded by the camera prior to transmission to the processor or other endpoint. The aerial system 12 can include one or more optical systems 26 of same or different type, mounted to the same or different position. In one variation, the aerial system 12 includes a first optical system 26, mounted to the front end of the body 20, and a second optical system 26, mounted to the bottom of the body 20. The first optical system 26 can actuate about a pivotal support, and the second optical system 26 can be substantially statically retained relative to the body 20, with the respective active surface substantially parallel the body bottom. The first optical sensor 36 can be high-definition, while the second optical sensor 36 can be low definition. However, the optical system 26 can be otherwise configured.

Figure 5:
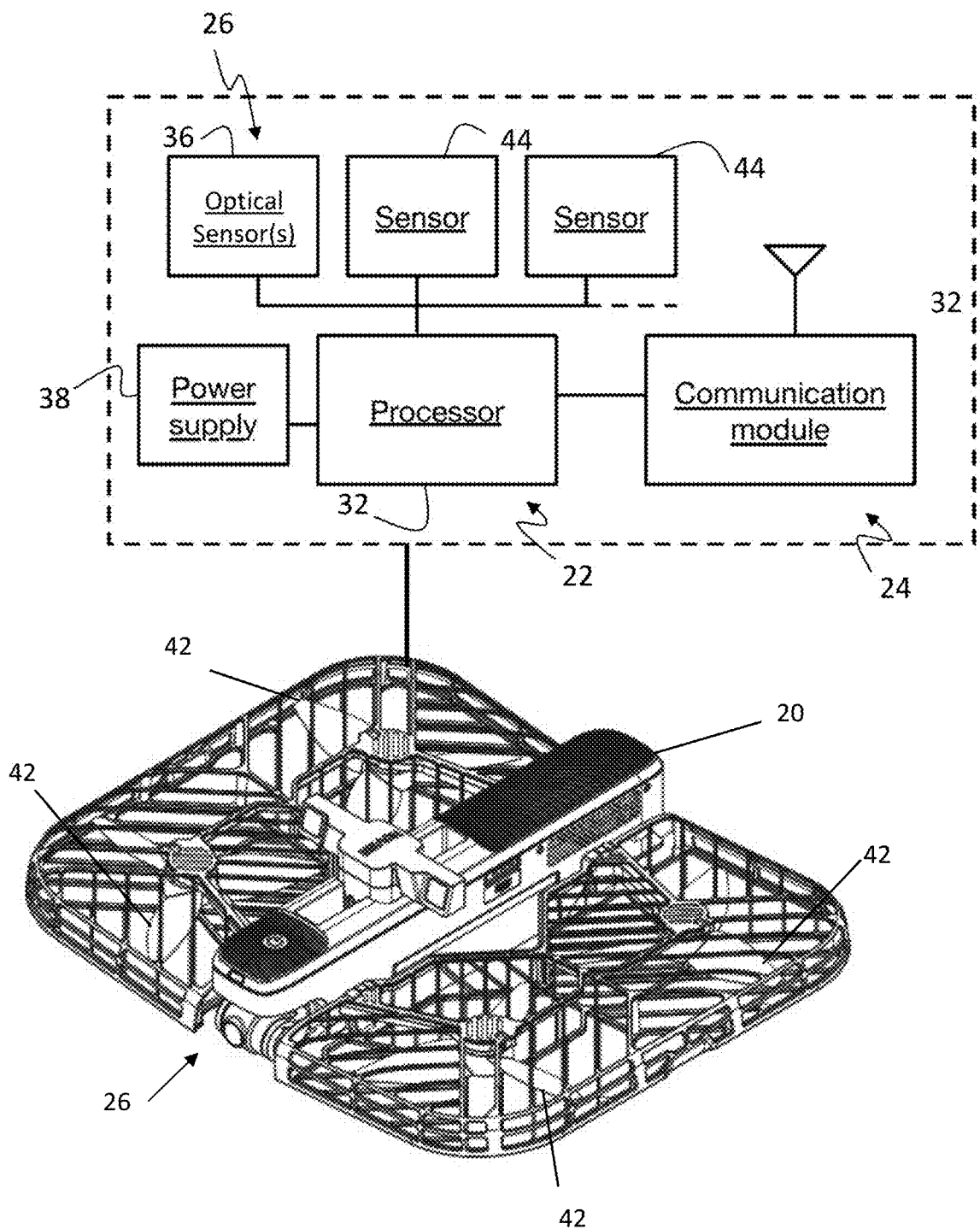
FIG. 5 is a third schematic representation of the system for controlling the aerial system and the aerial system according to an embodiment of the present invention.

The optical system 26 can include one or more optical sensors 36 (see FIG. 5). The one or more optical sensors 36 can include: a single lens camera (e.g., CCD camera, CMOS camera, etc.), a stereo-camera, a hyperspectral camera, a multispectral camera, or any other suitable image sensor.

However, the optical system 26 can be any other suitable optical system 26. The optical system 26 can define one or more active surfaces that receive light, but can alternatively include any other suitable component. For example, an active surface of a camera can be an active surface of a camera sensor (e.g., CCD sensor, CMOS sensor, etc.), preferably including a regular array of sensor pixels. The camera sensor or other active surface is preferably substantially planar and rectangular (e.g., having a first sensor edge, a second sensor edge opposing the first sensor edge, and third and fourth sensor edges each perpendicular to and extending from the first sensor edge to the second sensor edge), but can alternatively have any suitable shape and/or topography. The optical sensor 36 can produce an image frame. The image frame preferably corresponds with the shape of the active surface (e.g., rectangular, having a first and second frame edge opposing each other, etc.), more preferably defining a regular array of pixel locations, each pixel location corresponding to a sensor pixel of the active surface and/or pixels of the images sampled by the optical sensor 36, but can alternatively have any suitable shape. The image frame preferably defines aspects of the images sampled by the optical sensor 36 (e.g., image dimensions, resolution, pixel size and/or shape, etc.). The optical sensor 36 can optionally include a zoom lens, digital zoom, fisheye lens, filter, or any other suitable active or passive optical adjustment. Application of the optical adjustment can be actively controlled by the controller, manually controlled by the user 18 (e.g., wherein the user manually sets the adjustment), controlled by the remote device 14, or otherwise controlled. In one variation, the optical system 26 can include a housing enclosing the remainder of the optical system components, wherein the housing is mounted to the body 20. However, the optical system 26 can be otherwise configured.

The actuation mechanism 28 of the aerial system 12 functions to actionably mount the optical system 26 to the body 20. The actuation mechanism 28 can additionally function to dampen optical sensor vibration (e.g., mechanically stabilize the resultant image), accommodate for aerial system roll, or perform any other suitable functionality. The actuation mechanism 28 can be active (e.g., controlled by the processing system), passive (e.g., controlled by a set of weights, spring elements, magnetic elements, etc.), or otherwise controlled. The actuation mechanism 28 can rotate the optical system 26 about one or more axes relative to the body, translate the optical system 26 along one or more axes relative to the body, or otherwise actuate the optical system 26. The optical sensor(s) 36 can be mounted to the support along a first end, along an optical sensor back (e.g., opposing the active surface), through the optical sensor body, or along any other suitable portion of the optical sensor 36.

In one variation, the actuation mechanism 28 can include a motor (not shown) connected to a single pivoted support (e.g., gimbal), wherein the motor pivots the support about the rotational (or gimbal) axis 34 based on instructions received from the controller. The support is preferably arranged with the rotational axis substantially parallel the lateral axis of the body 20, but can alternatively be arranged with the rotational axis at any other suitable orientation relative to the body 20. The support is preferably arranged within a recessed cavity defined by the body 20, wherein the cavity further encompasses the optical sensor 36 but can alternatively be arranged along the body exterior or arranged at any other suitable portion of the body 20. The optical sensor 36 is preferably mounted to the support with the active surface substantially parallel the rotational axis (e.g., with the lateral axis, or axis parallel the lateral axis of the body 20, substantially parallel the rotational axis), but can alternatively be arranged with the active surface arranged at any suitable angle to the rotational axis.

The motor is preferably an electric motor, but can alternatively be any other suitable motor. Examples of electric motors that can be used include: DC motors (e.g., brushed motors), EC motors (e.g., brushless motors), induction motor, synchronous motor, magnetic motor, or any other suitable electric motor. The motor is preferably mounted to the body 20 (e.g., the body interior), electrically connected to and controlled by the processing system 22, and electrically connected to and powered by a power source or system 38. However, the motor can be otherwise connected. The actuation mechanism 28 preferably includes a single motor-support set, but can alternatively include multiple motor-support sets, wherein auxiliary motor-support sets can be arranged orthogonal (or at any other suitable angle to) the first motor-support set.

In a second variation, the actuation mechanism 28 can include a set of pivoted supports and weights connected to the optical sensor 36 offset from the optical sensor center of gravity, wherein the actuation mechanism 28 passively stabilizes the optical sensor 36.

A lift mechanism 40 of the aerial system 12 functions to enable aerial system flight. The lift mechanism 40 preferably includes a set propeller blades 42 driven by a motor (not shown), but can alternatively include any other suitable propulsion mechanism. The lift mechanism 40 is preferably mounted to the body 20 and controlled by the processing system 22, but can alternatively be otherwise mounted to the aerial system 12 and/or controlled. The aerial system 12 can include multiple lift mechanisms 40. In one example, the aerial system 12 includes four lift mechanisms 40 (e.g., two pairs of lift mechanisms 40), wherein the lift mechanisms 40 are substantially evenly distributed about the perimeter of the aerial system 12 (e.g., wherein the lift mechanisms 40 of each pair oppose each other across the body 20). However, the lift mechanisms 40 can be otherwise configured.

Additional sensors 44 of the aerial system function to record signals indicative of aerial system operation, the ambient environment surrounding the aerial system 12 (e.g., the physical space proximal the aerial system 12), or any other suitable parameter. The sensors 44 are preferably mounted to the body 20 and controlled by the processing system 22, but can alternatively be mounted to any other suitable component and/or otherwise controlled. The aerial system 12 can include one or more sensors 36, 44. Examples of sensors that can be used include: orientation sensors (e.g., accelerometer, gyroscope, etc.), ambient light sensors, temperature sensors, pressure sensors, optical sensors, acoustic sensors (e.g., microphones), voltage sensors, current sensors, or any other suitable sensor.

The power supply 38 of the aerial system 12 functions to power the active components of the aerial system 12. The power supply 38 is preferably mounted to the body 20, and electrically connected to all active components of the aerial system 12 (e.g., directly or indirectly), but can be otherwise arranged. The power supply 38 can be a primary battery, secondary battery (e.g., rechargeable battery), fuel cell, energy harvester (e.g., solar, wind, etc.), or be any other suitable power supply. Examples of secondary batteries that can be used include: a lithium chemistry (e.g., lithium ion, lithium ion polymer, etc.), nickel chemistry (e.g., NiCad, NiMH, etc.), or batteries with any other suitable chemistry.

The methods described herein may be used with one or more aerial systems 12, and can optionally be used with a remote computing system, or with any other suitable system. The aerial system 12 functions to fly, and can additionally function to take photographs, deliver loads, and/or relay wireless communications. The aerial system 12 is preferably a rotorcraft (e.g., quadcopter, helicopter, cyclocopter, etc.), but can alternatively be a fixed-wing aircraft, aerostat, or be any other suitable aerial system 12. The aerial system 12 can include a lift mechanism 40, a power supply 38, sensors 36, 44, a processing system 22, a communication system 24, a body 20, and/or include any other suitable component.

The lift mechanism 40 of the aerial system functions to provide lift, and preferably includes a set of rotors driven (individually or collectively) by one or more motors. Each rotor is preferably configured to rotate about a corresponding rotor axis, define a corresponding rotor plane normal to its rotor axis, and sweep out a swept area on its rotor plane. The motors are preferably configured to provide sufficient power to the rotors to enable aerial system flight, and are more preferably operable in two or more modes, at least one of which includes providing sufficient power for flight and at least one of which includes providing less power than required for flight (e.g., providing zero power, providing 10% of a minimum flight power, etc.). The power provided by the motors preferably affects the angular velocities at which the rotors rotate about their rotor axes. During aerial system flight, the set of rotors are preferably configured to cooperatively or individually generate (e.g., by rotating about their rotor axes) substantially all (e.g., more than 99%, more than 95%, more than 90%, more than 75%) of the total aerodynamic force generated by the aerial system 1 (possibly excluding a drag force generated by the body 20 such as during flight at high airspeeds). Alternatively, or additionally, the aerial system 12 can include any other suitable flight components that function to generate forces for aerial system flight, such as jet engines, rocket engines, wings, solar sails, and/or any other suitable force-generating components.

In one variation, the aerial system 12 includes four rotors, each arranged at a corner of the aerial system body. The four rotors are preferably substantially evenly dispersed about the aerial system body, and each rotor plane is preferably substantially parallel (e.g., within 10 degrees) a lateral plane of the aerial system body (e.g., encompassing the longitudinal and lateral axes). The rotors preferably occupy a relatively large portion of the entire aerial system 12 (e.g., 90%, 80%, 75%, or majority of the aerial system footprint, or any other suitable proportion of the aerial system 12). For example, the sum of the square of the diameter of each rotor can be greater than a threshold amount (e.g., 10%, 50%, 75%, 90%, 110%, etc.) of the convex hull of the projection of the aerial system 12 onto a primary plane of the system (e.g., the lateral plane). However, the rotors can be otherwise arranged.

The power supply 38 of the aerial system functions to power the active components of the aerial system 12 (e.g., lift mechanism's motors, power supply 38, etc.). The power supply 38 can be mounted to the body 20 and connected to the active components, or be otherwise arranged. The power supply 38 can be a rechargeable battery, secondary battery, primary battery, fuel cell, or be any other suitable power supply.

The sensors 36, 44 of the aerial system function to acquire signals indicative of the aerial system's ambient environment and/or aerial system operation. The sensors 36, 44 are preferably mounted to the body 20, but can alternatively be mounted to any other suitable component. The sensors 36, 44 are preferably powered by the power supply 38 and controlled by the processor, but can be connected to and interact with any other suitable component. The sensors 36, 44 can include one or more: cameras (e.g., CCD, CMOS, multispectral, visual range, hyperspectral, stereoscopic, etc.), orientation sensors (e.g., inertial measurement sensors, accelerometer, gyroscope, altimeter, magnetometer, etc.), audio sensors (e.g., transducer, microphone, etc.), barometers, light sensors, temperature sensors, current sensor (e.g., Hall effect sensor), air flow meter, voltmeters, touch sensors (e.g., resistive, capacitive, etc.), proximity sensors, force sensors (e.g., strain gauge meter, load cell), vibration sensors, chemical sensors, sonar sensors, location sensor (e.g., GPS, GNSS, triangulation, etc.), or any other suitable sensor. In one variation, the aerial system 12 includes a first camera mounted (e.g., statically or rotatably) along a first end of the aerial system body with a field of view intersecting the lateral plane of the body; a second camera mounted along the bottom of the aerial system body with a field of view substantially parallel the lateral plane; and a set of orientation sensors, such as an altimeter and accelerometer. However, the system can include any suitable number of any sensor type.

The processing system 22 of the aerial system functions to control aerial system operation. The processing system 22 can perform the method; stabilize the aerial system 12 during flight (e.g., selectively operate the rotors to minimize aerial system wobble in-flight); receive, interpret, and operate the aerial system 12 based on remote control instructions; or otherwise control aerial system operation. The processing system 22 is preferably configured to receive and interpret measurements sampled by the sensors 36, 44, more preferably by combining measurements sampled by disparate sensors (e.g., combining camera and accelerometer data). The aerial system 12 can include one or more processing systems, wherein different processors can perform the same functionality (e.g., function as a multi-core system), or be specialized. The processing system 22 can include one or more: processors (e.g., CPU, GPU, microprocessor, etc.), memory (e.g., Flash, RAM, etc.), or any other suitable component. The processing system 22 is preferably mounted to the body 20, but can alternatively be mounted to any other suitable component. The processing system 22 is preferably powered by the power supply 38, but can be otherwise powered. The processing system 22 is preferably connected to and controls the sensors 36, 44, communication system 24, and lift mechanism 40, but can additionally or alternatively be connected to and interact with any other suitable component.

The communication system 24 of the aerial system functions to communicate with one or more remote computing systems. The communication system 24 can be a long-range communication module, a short-range communication module, or any other suitable communication module. The communication system 24 can facilitate wired and/or wireless communication. Examples of the communication system 24 include an 802.11x, Wi-Fi, Wi-Max, NFC, RFID, Bluetooth, Bluetooth Low Energy, ZigBee, cellular telecommunications (e.g., 2G, 3G, 4G, LTE, etc.), radio (RF), wired connection (e.g., USB), or any other suitable communication system 24 or combination thereof. The communication system 24 is preferably powered by the power supply 38, but can be otherwise powered. The communication system 24 is preferably connected to the processing system 22, but can additionally or alternatively be connected to and interact with any other suitable component.

The body 20 of the aerial system functions to support the aerial system components. The body can additionally function to protect the aerial system components. The body 20 preferably substantially encapsulates the communication system 24, power supply 38, and processing system 22, but can be otherwise configured. The body 20 can include a platform, a housing, or have any other suitable configuration. In one variation, the body 20 includes a main body housing the communication system 24, power supply 38, and processing system 22, and a first and second frame (e.g., cage) extending parallel the rotor rotational plane and arranged along a first and second side of the main body 20. The frames can function as an intermediary component between the rotating rotors and a retention mechanism (e.g., retention mechanism such as a user's hand). The frame can extend along a single side of the body 20 (e.g., along the bottom of the rotors, along the top of the rotors), along a first and second side of the body 20 (e.g., along the top and bottom of the rotors), encapsulate the rotors (e.g., extend along all sides of the rotors), or be otherwise configured. The frames can be statically mounted or actuatably mounted to the main body 20.

The frame can include one or more apertures (e.g., airflow apertures) fluidly connecting one or more of the rotors to an ambient environment, which can function to enable the flow of air and/or other suitable fluids between the ambient environment and the rotors (e.g., enabling the rotors to generate an aerodynamic force that causes the aerial system 1 to move throughout the ambient environment). The apertures can be elongated, or can have comparable length and width. The apertures can be substantially identical, or can differ from each other. The apertures are preferably small enough to prevent components of a retention mechanism (e.g., fingers of a hand) from passing through the apertures. The geometrical transparency (e.g., ratio of open area to total area) of the frame near the rotors is preferably large enough to enable aerial system flight, more preferably enabling high-performance flight maneuvering. For example, each aperture can be smaller than a threshold size (e.g., smaller than the threshold size in all dimensions, elongated slots narrower than but significantly longer than the threshold size, etc.). In a specific example, the frame has a geometrical transparency of 80-90%, and the apertures (e.g., circles, polygons such as regular hexagons, etc.) each of define a circumscribed circle with a diameter of 12-16 mm. However, the body can be otherwise configured.

The body 20 (and/or any other suitable aerial system components) can define a retention region that can be retained by a retention mechanism (e.g., a human hand, an aerial system dock, a claw, etc.). The retention region preferably surrounds a portion of one or more of the rotors, more preferably completely surrounding all of the rotors, thereby preventing any unintentional interaction between the rotors and a retention mechanism or other object near the aerial system 12. For example, a projection of the retention region onto an aerial system plane (e.g., lateral plane, rotor plane, etc.) can overlap (e.g., partially, completely, a majority of, at least 90% of, etc.) a projection of the swept area of one or more of the rotors (e.g., swept area of a rotor, total swept area of the set of rotors, etc.) onto the same aerial system plane.

The aerial system 12 can additionally include inputs (e.g., microphones, cameras, etc.), outputs (e.g., displays, speakers, light emitting elements, etc.), or any other suitable component.

The remote computing system functions to receive auxiliary user inputs, and can additionally function to automatically generate control instructions for and send the control instructions to the aerial system(s) 12. Each aerial system 12 can be controlled by one or more remote computing systems. The remote computing system preferably controls the aerial system 12 through a client (e.g., a native application, browser application, etc.), but can otherwise control the aerial system 12. The remote computing system can be a user device, remote server system, connected appliance, or be any other suitable system. Examples of the user device include a tablet, smartphone, mobile phone, laptop, watch, wearable device (e.g., glasses), or any other suitable user device. The user device can include power storage (e.g., a battery), processing systems (e.g., CPU, GPU, memory, etc.), user outputs (e.g., display, speaker, vibration mechanism, etc.), user inputs (e.g., a keyboard, touchscreen, microphone, etc.), a location system (e.g., a GPS system), sensors (e.g., optical sensors, such as light sensors and cameras, orientation sensors, such as accelerometers, gyroscopes, and altimeters, audio sensors, such as microphones, etc.), data communication system (e.g., a Wi-Fi module, BLE, cellular module, etc.), or any other suitable component.

With reference to FIGS. 1-9, and specifically, to FIGS. 6-9, in one aspect the present invention provides a system 10 and method for controller-free user drone interaction. Normally, the aerial system, or drone, 12 requires a separate device, e.g., the remote device 14. The remote device 14 may be embodied in different types of devices, including, but not limited to a ground station, remote control, or mobile phone, etc. . . . . In some embodiments, control of the aerial system 12 may be accomplished by the user through user expression without utilization of the remote device 14. User expression may include, but is not limited to, any action performed by the user that do not include physical interaction with the remote device 14, including thought (through brain wave measurement), facial expression (including eye movement), gesture and/or voice. In such embodiments, user instructions are received directly via the optical sensors 36 and at least some of the other sensors 44 and processed by the onboard processing system 22 to control the aerial system 12.

In some embodiments, the aerial system 12 may alternatively be controlled via the remote device 14.

In at least one embodiment, the aerial system 12 may be controlled without physical interaction with the remote device 14, however, a display of the remote device 14 may be used to display images and/or video relayed from the aerial system 12 which may aid the user 18 in controlling the aerial system 12. In addition, sensors 36, 44 associated with the remote device 14, e.g., camera(s) and/or a microphone (not show) may relay data to the aerial system 12, e.g., when the aerial system 12 is too far away from the user 18. The sensor data relayed from the remote device 14 to the aerial system 12 is used in the same manner as the sensor data from the on-board sensors 36, 44 are used to control the aerial system 12 using user expression.

In this manner, the aerial system 12 may be fully controlled, from start to finish, either (1) without utilization of a remote device 14, or (2) without physical interaction with the remote device 14. In the below described embodiments, control of the aerial system 12 based on user instructions received at various on-board sensors 36, 44. It should be noted that in the following discussion, utilization of on-board sensors 36, 44 may also include utilization of corresponding or similar sensors on the remote device 14.

In general, the user 18 may utilize certain gestures and/or voice control to control take-off, landing, motion of the aerial system 12 during flight and other features, such as triggering of photo and/or video capturing. As discussed above, the aerial system 12 may provide the following features without utilization of, or processing by, a remote device 14:

Take-off and landing;
Owner recognition;
Facial recognition;
Speech recognition;
Facial expression and gesture recognition; and,
Control, e.g., motion, of the aerial system based on owner, facial, expression and gesture recognition, and speech recognition.

As detailed above, the aerial system 12 includes an optical system 26 that includes one or more optical sensor 36, such as a camera. The at least one on-board camera is configured for live video streaming and computer vision analysis. Optionally the aerial system 12 can have at least one depth sensor (or stereo-vision pair) for multi-pixel depth sensing. Optionally the aerial system 12 can have at least one microphone on board for voice recognition and control.

In general, in order to provide full control of the aerial system 12, a plurality of user/drone interactions or activities from start to end of an aerial session are provided. The user/drone interactions, include, but are not limited to take-off and landing, owner recognition gesture recognition, facial expression recognition, and voice control.

In one aspect of the present invention, take-off of the aerial system 12 is managed using a release and hover procedure (see below).

After the aerial system 12 is released and hovering, the owner or specific user must be recognized. In one aspect of the present invention only commands or instructions from the owner or specific user are followed. In another aspect of the present invention, commands from any user within the field of view of the at least one camera may be followed.

To identify the owned, the aerial system 12, once aloft, may automatically spin 360 degrees slowly to search for its owner 18. Alternatively, the aerial system 12 can wait still for the owner 18 to show up in the field of view. This may be set in the default settings. Once the owner 18 is found, an exemplary default action for the drone system 12 is to automatically adjust its own position and orientation to aim the owner at the center of the camera field of view with a preferred distance (by yawing and/or moving in forward/backward direction). In one preferred embodiment, after the owner 18 or any person is recognized as the target, the aerial system 12 can then start tracking the target and scan for gesture commands.

In one aspect of the invention, the owner 18 may be recognized as a function of visual information, e.g., data received from the optical sensors 36. For all the commands based on facial expression recognition and gesture recognition techniques, face recognition is an essential prerequisite. By pre-registering the face of the user to the aerial system 12 (via app or an on-board routine), the aerial system 12 can distinguish the owner from any other persons in the video. Typical face recognition techniques include principle component analysis (PCA) using Eigen face, elastic bunch graph matching using the Fisherface algorithm, etc.

After the owner's or user's face has been identified, the owner's (or other user's) face may be tracked and the face and its proximal area in captured images. Commands or instructions from the owner or other user's facial expressions and/or gesture can be taken to control the aerial system 12. As stated above, however, in other aspect any user in view of the camera may control the aerial system 12.

Alternatively, or in addition, voice recognition can be used to identify whether the voice is from the owner or not. Techniques used to process and store voice prints include frequency estimation, hidden Markov models, Gaussian mixture models, pattern matching algorithms, neural networks, matrix representation, Vector Quantization and decision trees.

Gesture recognition may also play an important role in the aerial system 12. After the drone is released in the air, gesture input command becomes a major user interfacing tool. Gesture recognition can be achieved by using a single RGB camera, and/or a multi-pixel depth sensor (time-of-flight based depth camera, stereovision pair, infrared camera with structural light pattern, etc.). The state-of-the-art gesture recognition algorithms can achieve real time recognition with the computation run time at 100 ms level on the latest high-end processors.

Recognized gestures, which may be assigned or re-assigned different functions or events, may include, but are not limited to thumb up, thumb down, open palm, fist, victory gesture, etc. . . . . . After a specific gesture is recognized, the assigned event is triggered.

A facial expression recognition implementation contains the following steps: raw data pre-processing/detection, feature extraction, classification, post-processing, outputting result. Detection methods can be categorized as knowledge based, feature based, texture based, skin color based, multiple features, template matching (local binary patterns LBP), active shape model, appearance based, and distribution features. Typical feature extraction methods include discrete cosine transform (DCT), Gabor filter, principle component analysis (PCA), independent component analysis (ICA), linear discriminant analysis (LDA). And existing classification methods include Hidden Markov Model (HMM), neural networks, support vector machine (SVM), AdaBoost, etc.

Speech or voice recognition may be used as a tool for command input. Speech or voice recognition techniques may include, but are not limited to, Hidden Markov model (HMM), Long Short-Term Memory (LSTM) Recurrent Neural Networks (RNN), Time Delay Neural Networks (TDNNs), etc.

Figure 6:
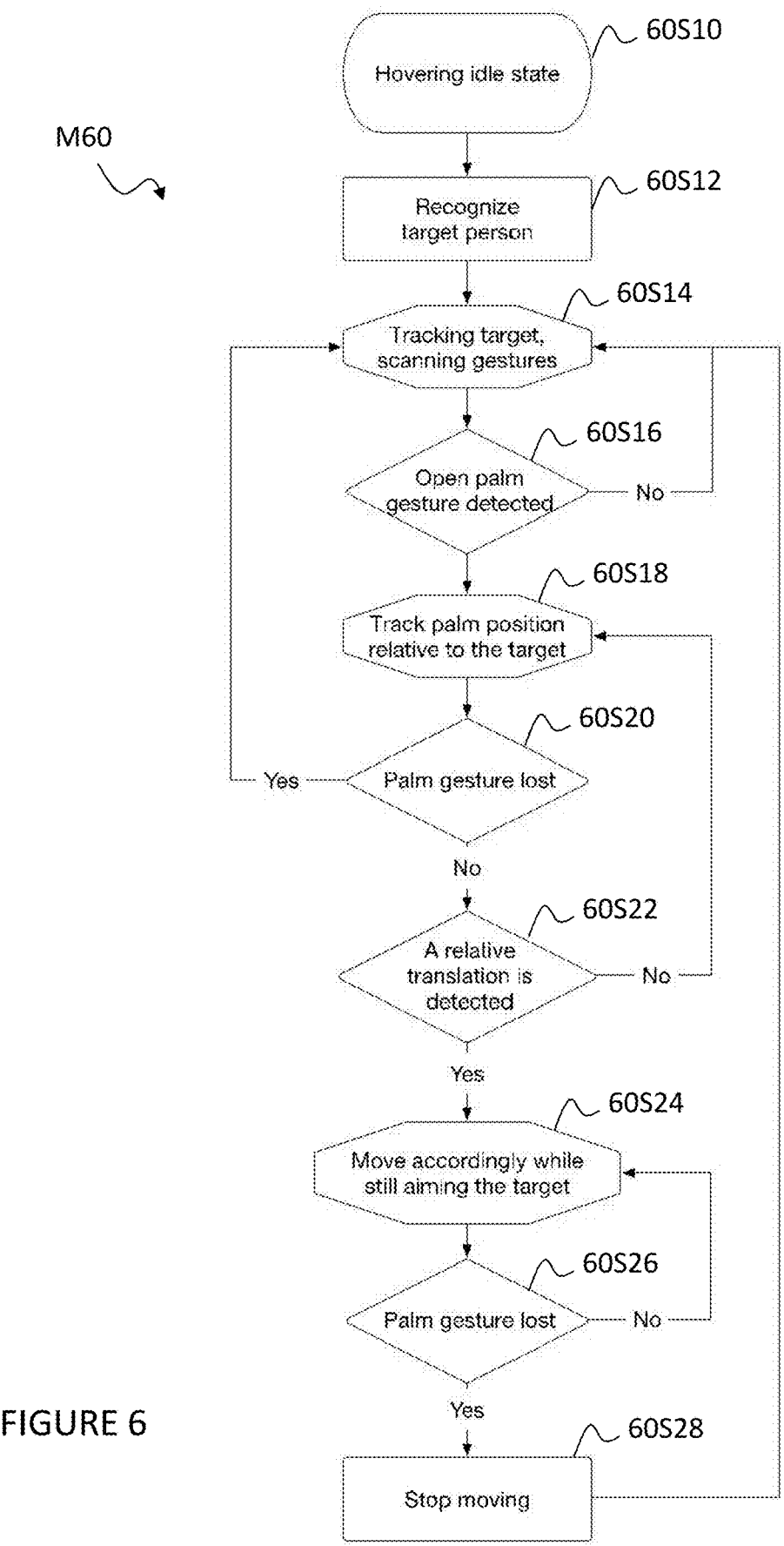
FIG. 6 is a first flowchart diagram of a method for remote-free user control of an aerial system using user expression, according to an embodiment of the present invention.

With specific reference to FIG. 6, a method M60 for providing user expression control of the motion of the aerial system 12 according to one embodiment of the present invention is shown. In a first step 60S10, after the aerial system 12 has taken off, the aerial system 12 enters a hover state (see below). In a second step 60S12, the processing system 22 searches for and recognizes a target person, e.g., facial recognition. It should be noted that target person recognition could be accomplished through other methods, including, but not limited to, use of RFID tags and the like. The target person may be the owner or any user with the field of view.

In a third step 60S14 the target (person) is tracked and gesture or expressions performed by the target are detected and observed. For example, visual information and/or audio information, e.g., a picture or video of the target's face and an area proximal to the target's face may be processed to detect predefined user expressions. As stated above, user expressions may include thought, facial expressions, gestures and/or voice.

In the illustrated embodiment, user gestures performed by the targets hands are used. In a fourth step 60S16, if an open palm is detected, then the method 60 proceeds to a fifth step 60S18. Otherwise, the method M60 returns to the third step 60S14.

In the fifth step 60S18, the position of the target's palm is tracked relative to the face of the target. In a sixth step 60S20, if the palm gesture (or open palm of the target) is lost, then the method M60 returns to the third step 60S14. In the seventh step 60S22, if movement, i.e., a relative translation of the palm relative to the target, is detected, then the method M60 proceed to an eighth step 60S24. Otherwise, the method M60 returns to the fifth step 60S28.

In the eighth step 60S24, the aerial system 12 is instructed to move as a function of the relative translation or movement of the open palm detected in the seventh step 60S22. In a ninth step 60S26, if the palm gesture is lost then the method M60 proceeds to a tenth step 60S28. Otherwise, the method M60 returns to the eighth step 60S24. In the tenth step 60S28, the aerial system 12 is instructed to stop moving and the method M60 returns to the third step 60S14.

Figure 7:
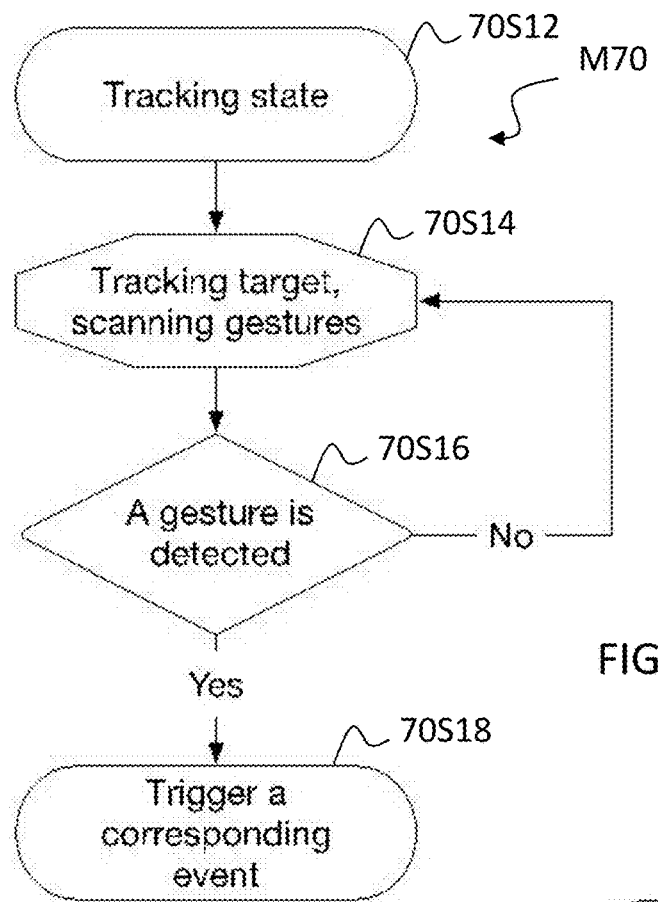
FIG. 7 is a second flowchart diagram of a method for remote-free user control of an aerial system using user expression, according to an embodiment of the present invention.

With reference FIG. 7, a method M70 to initiate an event of the aerial system 12 according to an embodiment of the present invention is illustrated. In the illustrated embodiment, the aerial system event may be triggered in response to detection of a predetermined or pre-defined user expression. User expression, as discussed above may include thought, facial expression, gesture and/or voice. In a first step 70S12, after the aerial system 12 has taken off and a target user has been identified, the aerial system 12 enters a tracking state. In a second step 70S14, the target is tracked and the processing system 22 scans for predetermined/predefined user expressions, e.g., gestures. In a third step 70S16, if a predetermined/predefined expression, e.g., gesture, is detected, then the method M70 proceeds to a fourth step 70S18. Otherwise, the method 70 returns to the second step 70S14. In the fourth step 70S18, the event corresponding to the detected predefined or predetermined expression, e.g., gesture is triggered. Exemplary events include, but are not limited to taking a picture or snapshot, start shooting video, start (user) auto-follow, and start an auto-capturing routine.

Figure 8:
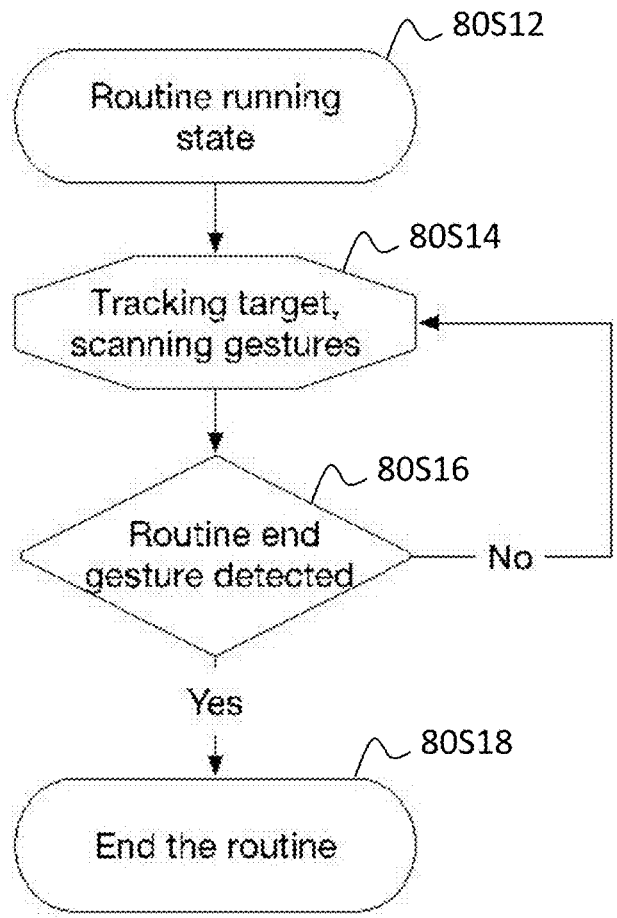
FIG. 8 is a third flowchart diagram of a method for remote-free user control of an aerial system using user expression, according to an embodiment of the present invention.

With reference FIG. 8, a method M80 to terminate a running event of the aerial system 12 according to an embodiment of the present invention is illustrated. In the illustrated embodiment, the aerial system 12 event may be terminated in response to detection of a predetermined or pre-defined user expression. User expression, as discussed above may include thought, facial expression, gesture and/or voice. In a first step 80S12, after the running event has been triggered or initiated (see above and FIG. 7). The aerial system 12 enters an event or routine running state. In a second step 80S14, the target is tracked and the processing system 22 scans for predetermined/predefined user expressions, e.g., gestures. In a third step 80S16, if a predetermined/predefined termination or touring end expression, e.g., gesture, is detected, then the method M80 proceeds to a fourth step 80S18. Otherwise, the method M80 returns to the second step 80S14. In the fourth step 80S18, the event corresponding to the detected predefined or predetermined expression, e.g., gesture is terminated.

Figure 9:
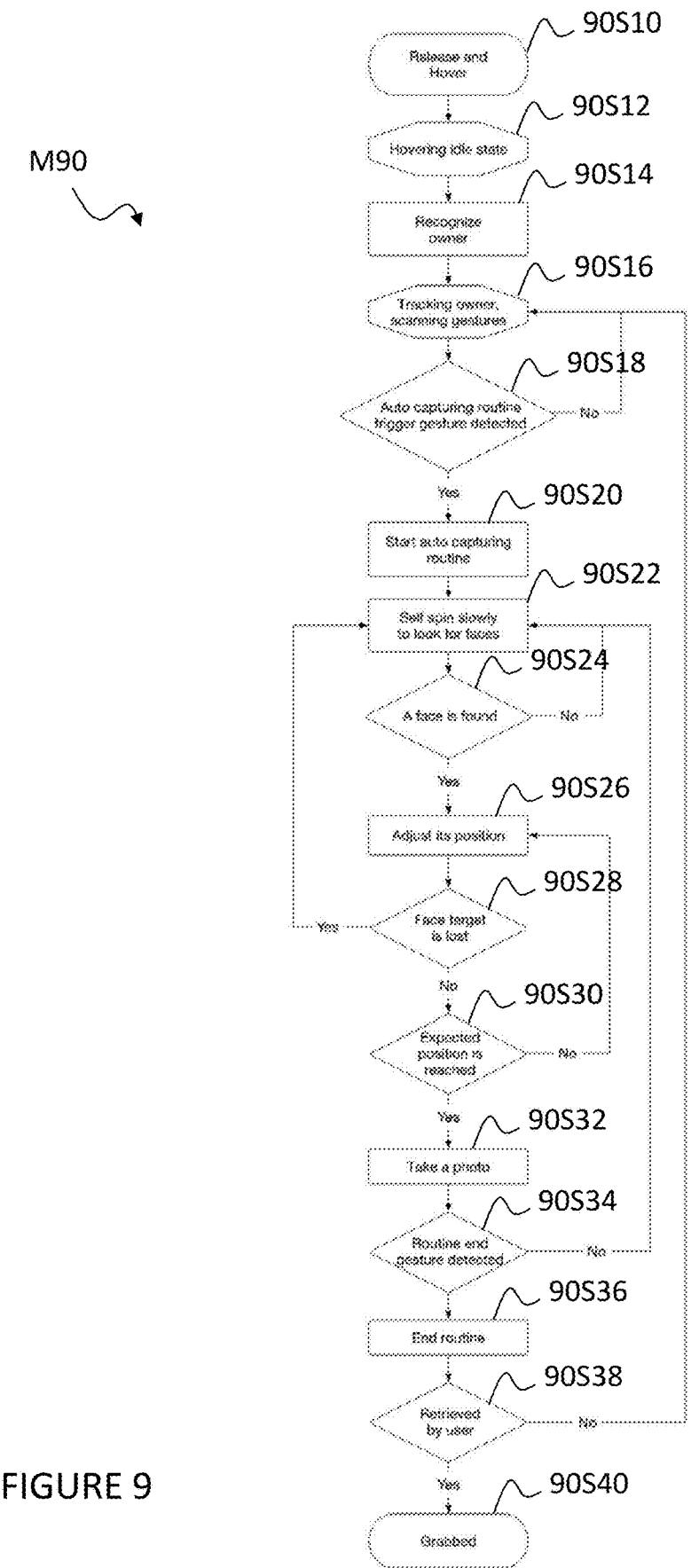
FIG. 9 is a fourth flowchart diagram of a method for remote-free user control of an aerial system using user expression, according to an embodiment of the present invention.

With reference to FIG. 9, a method M90 to perform an auto-capture event according to an embodiment of the present invention is provided. The method M90 allows the user or target to signal to the aerial system 12 and trigger an event during which the aerial system 12 moves and positions itself to a position relative to the target that allows the aerial system 12 to land and/or land safely. For example, the aerial system 12 may position itself to a location that allows the user 18 to position their hand below the aerial system 12, and upon a termination expression by the user 18, the aerial system 12 may land and/or allow itself to be captured by the user 18.

In a first step 90S10, the user may release the aerial system 12 and the aerial system 12 takes off and begins to hover. In a second step 90S12, the aerial system 12 enters a hover idle state during which the aerial system 12 may begin to search for a target or any user (based on default settings).

In a third step 90S14, the target (or owner) or any user enters a field of view of one of the optical system 26 and is recognized. In a fourth step 90S16, the recognized target (or owner or any user) is tracked and expressions or gestures of the recognized target are scanned and analyzed. In a fifth step 90S18, if a user expression corresponding to an auto-capture trigger is detected, then the method M90 proceeds to a sixth step 90S20. Otherwise, the method M90 returns to the fourth step 90S16.

In the sixth step 90S20, the auto-capturing routing is initiated. In a seventh step 90S22, the processing system 22 automatically controls the aerial system 12 to slowly rotate to look for faces. If in an eighth step 90S24, a face is found then the method M90 proceeds to a ninth step 90S26. Otherwise, the method M90 returns to the seventh step 90S22.

In the ninth step 90S26, the processing system 22 instructs the aerial system 12 to adjust its position relative to the target. In a tenth step 90S28, if the face of the target is lost, then the method M90 returns to the seventh step 90S22. Otherwise, the method M90 proceeds to an eleventh step 90S30.

In the eleventh step 90S30, if an expected position (relative to the target) is reached, then the method M90 proceeds to a twelfth step 90S32. Otherwise, the method M90 returns to the ninth step 90S26.

In the twelfth step 90S32, a picture may be taken. In a thirteenth step 90S34, if an auto-capture end or termination expression, e.g., gesture, is detected, then the method M90 proceeds to a fourteenth step 90S36. Otherwise, the method M90 returns to the seventh step 90S22.

In the fourteenth step 90S36, the auto-capture routine is terminated. In a fifteenth step 90S38, if the aerial system 12 has been retrieved by the user 18, then the method M90 proceeds to a sixteenth step 90S40. Otherwise, the method M90 returns to the fourth step 90S16. In the sixteenth step 90S40, the aerial system 12 has been grabbed by the user 18 and may be shut down.

In one embodiment, of the present invention, before grabbing the drone back, the user 18 may use gesture control/voice control to command the drone to come closer, making it reachable by the user.

Figure 10:
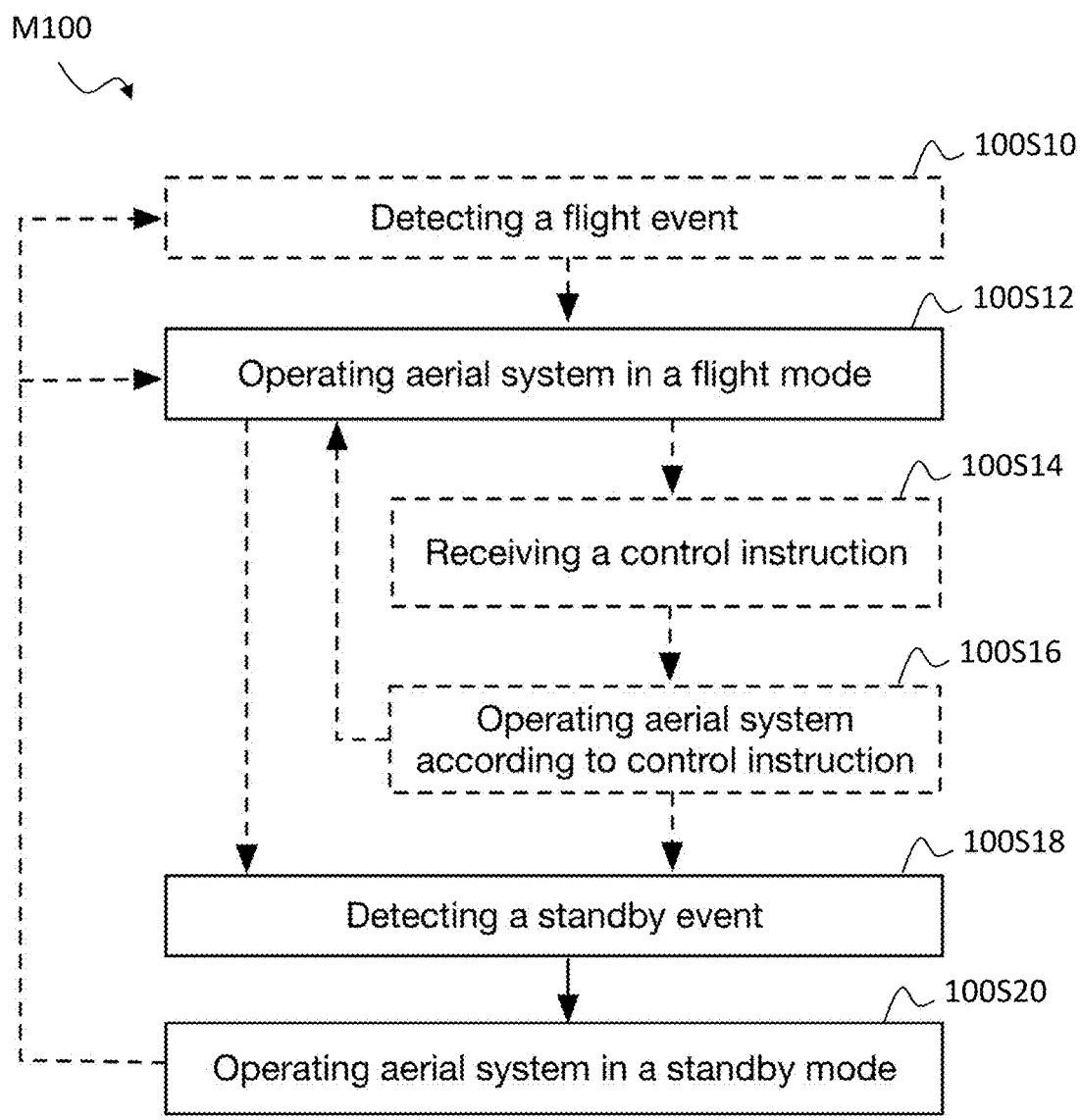
FIG. 10 is a flowchart diagram of the method for automatic aerial system operation.

As shown in FIG. 10, a method M100 for automatic aerial system operation may include: operating the aerial system 12 in a flight mode 100S12, detecting a standby event 100S18, and operating the aerial system 12 in a standby mode 100S20. The method M100 can additionally include: detecting a flight event 100S10, receiving a control instruction 100S14, and/or operating the aerial system 12 according to the control instruction 100S16.

Figure 11:
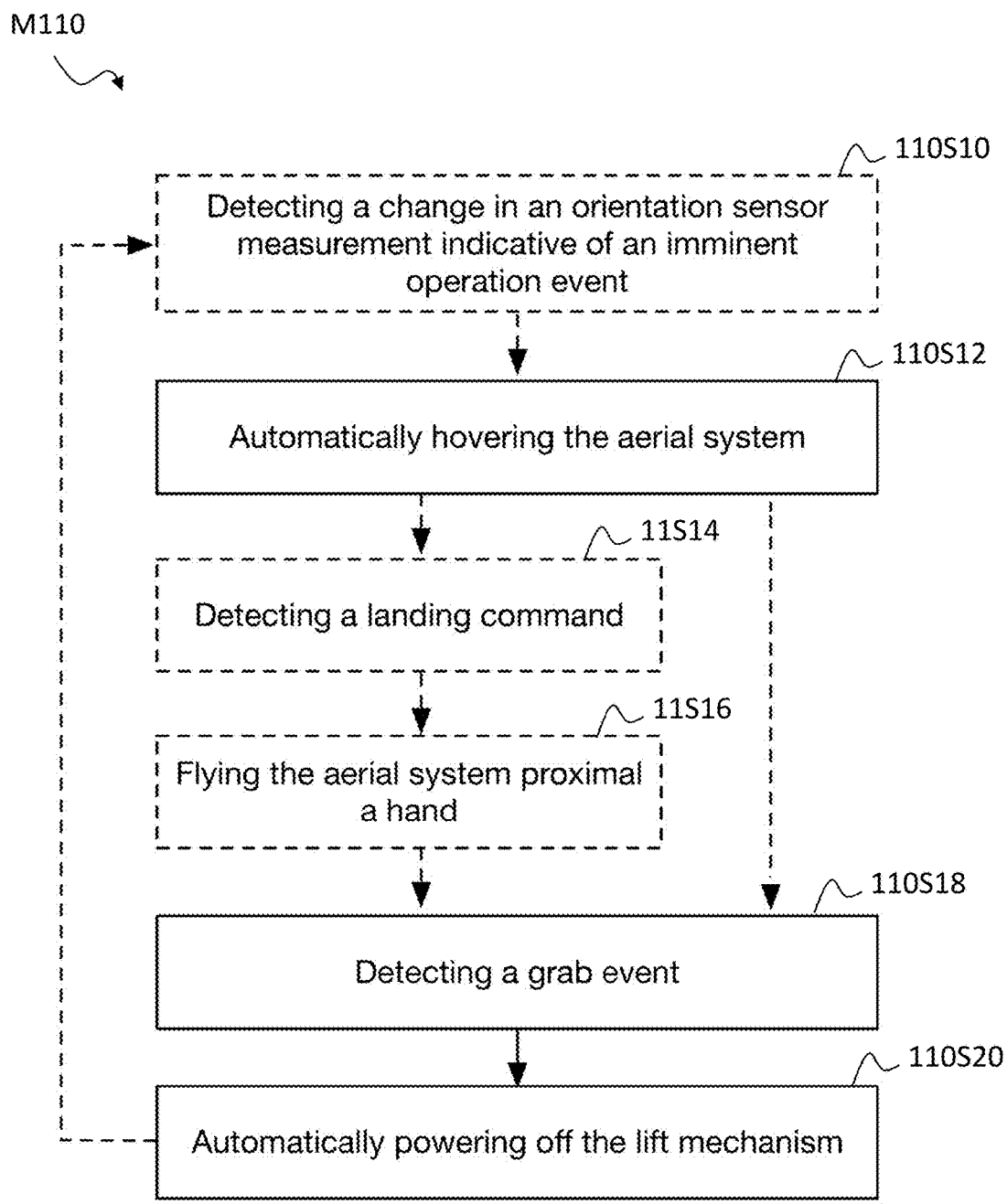
FIG. 11 is a flowchart diagram of a variation of the method for automatic aerial system operation.

The method functions to automatically cease aerial system flight, independent of control instruction receipt. In a first variation, the aerial system automatically detects that the aerial system 12 has been restrained during flight and automatically operates in a standby mode in response to determination of aerial system restraint. In a specific example, the aerial system 12 slows down or stops the lift mechanism 40 once it detects that a user has grabbed the aerial system mid-flight or mid-air (e.g., as shown in FIG. 11). In a second variation, the aerial system automatically identifies a landing site and automatically operates to land on the landing site. In a first specific example, the aerial system automatically detects a user's hand below the aerial system 12 (e.g., using a camera with a field of view directed downward and visual analysis methods) and gradually slows the propeller speed to land the aerial system 12 on the user's hand. In a second specific example, the aerial system automatically detects a landing site in front of the aerial system 12, automatically flies toward the landing site, and automatically controls the lift mechanism 40 to land on the landing site. However, the method can otherwise cease aerial system flight.

The method can additionally function to automatically fly the aerial system 12, independent of control instruction receipt. In a first variation, the aerial system automatically hovers (e.g., in place) when the aerial system 12 is released (e.g., from a user's hand). In a second variation, the aerial system automatically flies along a force application vector, stops, and hovers in response to the aerial system 12 being thrown or pushed along the force application vector. In a third variation, the aerial system 12 can automatically take off from a user's hand. However, the method can otherwise fly the aerial system 12.

This method can confer several benefits over conventional systems. First, by automatically entering an aerial system standby mode, automatically flying in response to aerial system release, and/or automatically landing on a user's hand or user-specified landing site, the method enables more intuitive user interactions with the aerial system 12. Second, by automatically operating independent of outside control instruction receipt, the method frees a user from controlling those aspects of aerial system flight. This can enable the user to control auxiliary systems (e.g., camera systems), minimize multitasking, or otherwise reduce user interaction required for aerial system flight. However, the method can confer any other suitable set of benefits.

Detecting a flight event 100S10 functions to detect an imminent operation event 110S10 requiring or otherwise associated with aerial system flight. The imminent operation event 110S10 can be freefall (e.g., aerial system motion along a first axis parallel a gravity vector), imminent freefall, aerial system arrangement in a predetermined orientation (e.g., arrangement with a major aerial system plane within a predetermined range from perpendicular to a gravity vector for a predetermined amount of time, such as 0.5 s), manual support of the aerial system 12 in mid-air (e.g., based on the acceleration patterns, rotation patterns, vibration patterns, temperature patterns, etc.), or be any other suitable imminent operation event. 100S10 preferably includes detecting a change in a sensor signal associated with imminent operation. The change is preferably detected by the processing system 22 based on signals received from the on-board sensors 36, 44 (e.g., orientation sensors), but can alternatively be detected by the remote computing system (e.g., wherein the sensor signals are transmitted to the remote computing system), or detected by any other suitable system. The predetermined change can be set by a manufacturer, received from the client running on the remote computing system, received from a user 18, or otherwise determined.

The change can be determined: at a predetermined frequency, every time a new orientation sensor signal is received, or at any other suitable time. The predetermined change can be a signal change, a parameter change (e.g., amount of acceleration change, velocity change, etc.), a rate of change (e.g., rate of acceleration change), or be any other suitable change.

The change indicative of imminent operation can be received from a user 18, received from the client, automatically learned (e.g., based on a trained learning set of labeled accelerometer patterns), or otherwise determined. The actual change can be considered a change indicative of imminent operation if the actual change substantially matches the predetermined change indicative of imminent operation, is classified as a change indicative of imminent operation, substantially matches a pattern parameter values indicative of imminent operation, or can be otherwise detected.

The orientation sensor signals can be periodically monitored for the predetermined change, wherein monitoring the signals can include temporarily caching a set of prior orientation sensor signals, determining a change between the cached orientation sensor signals and a new orientation sensor signal. However, the orientation sensor signals can be otherwise monitored. In one embodiment (shown in FIG. 12), the predetermined change can be the acceleration (e.g., proper acceleration) or a component of the acceleration (e.g., along an axis associated with a gravity vector) becoming substantially equal to zero (e.g., less than 0.1 g, less than 0.3 g, less than a threshold fraction of a typical acceleration observed in the aerial system 12, such as 10% or 30%, etc.), dropping toward zero, dropping toward zero beyond a threshold rate, or exhibiting any other suitable absolute change, pattern of change, or other change indicative of freefall. The axis associated with a gravity vector can be an axis parallel the gravity vector, a predetermined aerial system axis and/or orientation sensor axis (e.g., a central axis perpendicular to a lateral plane of the aerial system), or be any other suitable axis. In a specific example, detecting the flight event 100S10 includes detecting a proper acceleration substantially equal to zero at an accelerometer mounted to the aerial system body.

In a first variation of this embodiment, the axis can be the axis perpendicular the bottom of the aerial system 12 (e.g., bottom of the aerial system housing). In a second variation, the aerial system 12 can automatically identify the axis parallel the gravity vector. This can include identifying the axis for which a measured acceleration that is substantially the same as or higher than the magnitude of gravity acceleration was measured (e.g., for a predetermined period of time). In this variation, upon determination that the predetermined change has occurred, the method can additionally include analyzing the sensor measurements from other axes to determine whether the aerial system 12 is truly in freefall (e.g., wherein the measurements from other axes are less than the gravity acceleration magnitude) or has simply been rotated (e.g., wherein the measurements from one or more other axes is more than or equal to the gravity acceleration magnitude).

Additionally, or alternatively, in this variation, the method can include correlating the acceleration measurements with disparate orientation information (e.g., measurements from one or more sensors such as a gyroscope or camera). The method can optionally selectively ignore or not consider measurements for certain axes (e.g., longitudinal axis of the aerial system 12).

However, the axis can be otherwise determined, or no single axis may be used (e.g., instead relying on a total magnitude).

In a second embodiment (shown in FIG. 13), altimeter signals can be periodically monitored for a predetermined change. The predetermined change can be a predetermined decrease in altitude, a predetermined rate of altitude change, or be any other suitable change.

In a third embodiment, accelerometer and/or gyroscope signals can be periodically monitored for an indication that the aerial system 12 is being supported in a substantially horizontal orientation (e.g., an axis perpendicular the bottom of the aerial system 12 is within a threshold angle from a gravity vector, such as 1°, 5°, 10°, or 15°). In one example, the flight event is detected 100S10 when the spatial sensor signals indicate that the aerial system 12 has been supported substantially horizontally for greater than a threshold time (e.g., 100 ms, 350 ms, 1 s, 2 s, 5 s, etc.) while the aerial system 12 is in a standby state and the sonar and optical sensors are sampling valid data for flight control. However, the change indicative of imminent operation can be otherwise determined.

Operating the aerial system 12 in a flight mode 100S12 functions to fly the aerial system 12. 100S12 preferably includes operating the lift mechanism 40 in a flight mode, but can additionally or alternatively include operating any other suitable aerial system components in a flight mode. The aerial system 12 is preferably automatically operated by the processing system 22, but can alternatively be automatically operated by the remote computing system or by any other suitable system. The aerial system 12 is preferably operated in a flight mode 100S12 automatically in response to detecting the flight event 100S10, but can additionally or alternatively be operated after a predetermined time duration has passed after the flight event is detected 100S10, after the aerial system altitude has changed beyond a predetermined altitude change (e.g., as determined from the altimeter), or at any other suitable time. The aerial system 12 is preferably operated according to a set of operation parameters, wherein the operation parameters can be predetermined, selected (e.g., based on the sensor measurement combination at the time of or preceding change detection; based on the classification of the sensor measurement patterns or combination; etc.), or otherwise determined. The operation parameters can include: power provided to the lift mechanism 40 (e.g., voltage, current, etc.), lift mechanism 40 speed or output, timing, target sensor measurements, or any other suitable operation parameter.

The aerial system 12 can operate in the flight mode using signals from: a front-facing camera, a downward-facing camera, orientation sensors, a laser system (e.g., rangefinder, LIDAR), radar, stereo-camera system, time of flight, or any other suitable optical, acoustic, range finding, or other system. The aerial system 12 can process the signals using RRT, SLAM, kinematics, optical flow, machine learning, rule-based algorithms, or any other suitable method. In a specific example, the path movement mode includes sampling a series of images with a front-facing camera and automatically determining the aerial system physical position within a 3-D space using the series of images and a location method (e.g., SLAM) running on-board the aerial system 12. In a second specific example, the path movement mode includes sampling a series of images with a down-facing camera (e.g., sampling at 60 fps, or at any other suitable frequency), automatically detecting apparent movement between the aerial system 12 and the ground based on the sampled images (e.g., using optical flow), which can assist in determining aerial system position or kinematics (e.g., speed, acceleration), and automatically correcting the aerial system balance or position based on the detected apparent movement. In a third specific example, the aerial system location determined using the first specific example and the aerial system kinematics determined using the second specific example can be fed into a flight control algorithm to hover, fly, or otherwise control the aerial system 12.

The flight mode preferably includes a hover mode in which the aerial system position in the air (e.g., vertical position, lateral position, etc.) is substantially maintained, but can alternatively be any other suitable flight mode. The flight mode preferably includes maintaining an aerial system orientation such that a central axis normal to a lateral plane of the aerial system 12 is substantially parallel to a gravity vector (e.g., within 20°, within 10°, within 3°, within 1°, etc.). However, the central axis can be otherwise maintained. The flight mode preferably includes generating a force at the lift mechanism 40 equal and opposite the force exerted on the aerial system 12 by gravity (e.g., to hover), but can alternatively include generating a vertical force greater or lesser than the gravitational force (e.g., to increase or decrease altitude, and/or to arrest vertical movement and bring the aerial system 12 into a hovering state). The flight mode can additionally or alternatively include generating a non-vertical force and/or a torque (e.g., to change the aerial system pitch or roll, to cause or arrest lateral movement, etc.). For example, the flight mode can include detecting an orientation, position, and/or velocity change, determining that the change is due to wind and/or another external perturbation such as a collision (e.g., classifying the change as a wind and/or collision event, determining a probability of wind perturbation, determining a probability of the perturbation being a grab event, etc.), and operating the lift mechanism 40 to correct for the change and return to an original or desired position, orientation, and/or velocity.

The flight mode can additionally or alternatively include a path movement mode (e.g., flying in a straight line, flying along a predetermined path, etc.), a program mode (e.g., flying along a path determined dynamically based on a flight program, flying based on facial and/or body tracking such as following or orbiting around a person or maintaining the person's face within a camera field of view, etc.), and/or any other suitable mode. The flight mode can optionally include capturing an image (e.g., storing a single image, streaming a video, etc.) using an aerial system camera mounted (or otherwise mechanically coupled) to the body 20.

The flight mode can additionally or alternatively include an imaging mode, wherein the aerial system automatically identifies an imaging target (e.g., person, face, object, etc.) and controls its flight to automatically follow the imaging target through a physical space. In one variation, the aerial system 12 can run object recognition and/or tracking methods, facial recognition and/or tracking methods, body recognition and/or tracking methods, and/or any other suitable method on the sampled images (e.g., from the front-facing camera) to identify and track the imaging target. In a specific example, the aerial system 12 can automatically image a substantially 360° region about itself (e.g., by rotating about the central axis, by moving the camera around, by using a 360° camera, etc.), automatically identify imaging targets from the image, and automatically follow an imaging target (e.g., automatically identified or manually selected) about the physical space. However, the imaging mode can be otherwise performed. However, the flight mode can include any other suitable set of operation modes.

The aerial system 12 can be operated in the flight mode by independently controlling the angular velocity of each rotor and/or the power delivered to each rotor. However, the rotors can be controlled as a group or in any other suitable manner. 100S12 preferably includes generating an aerodynamic force at the set of rotors that is substantially equal to the total aerodynamic force generated by the aerial system 12, more preferably also substantially equal to the net force exerted by the aerial system 12 (e.g., wherein the aerial system 12 does not include any other components configured to generate significant aerodynamic force, or to otherwise exert significant force, such as propulsive force, on the ambient environment).

In one variation, operating the aerial system 12 in the flight mode can include spooling up the rotor angular velocity of each rotor to a flight rotor speed (e.g., at which the set of rotors generates a flight aerodynamic force) from a standby rotor speed (e.g., at which the set of rotors generates a standby aerodynamic force lower than the flight aerodynamic force, such as substantially zero force or a small fraction of the flight aerodynamic force). In this variation, the flight rotor speed is preferably the hover rotor speed at which the aerial system hovers; alternatively, the speed can be any other suitable rotation speed. The flight speed can be preset (e.g., by a manufacturer), received from the client, automatically determined (e.g., based on the rate of signal change), or otherwise determined. The standby rotor speed can be low speed (e.g., a proportion of the hover speed), substantially zero angular velocity (e.g., wherein the rotors are not rotating), or have any other suitable speed. The standby rotor speed can be preset (e.g., by a manufacturer), received from the client, or otherwise determined. The rotor speed can be immediately transitioned from the standby rotor speed to the flight rotor speed, transitioned based on the rate of orientation sensor signal change, transitioned at a predetermined rate, or transitioned in any other suitable manner.

Figure 14:
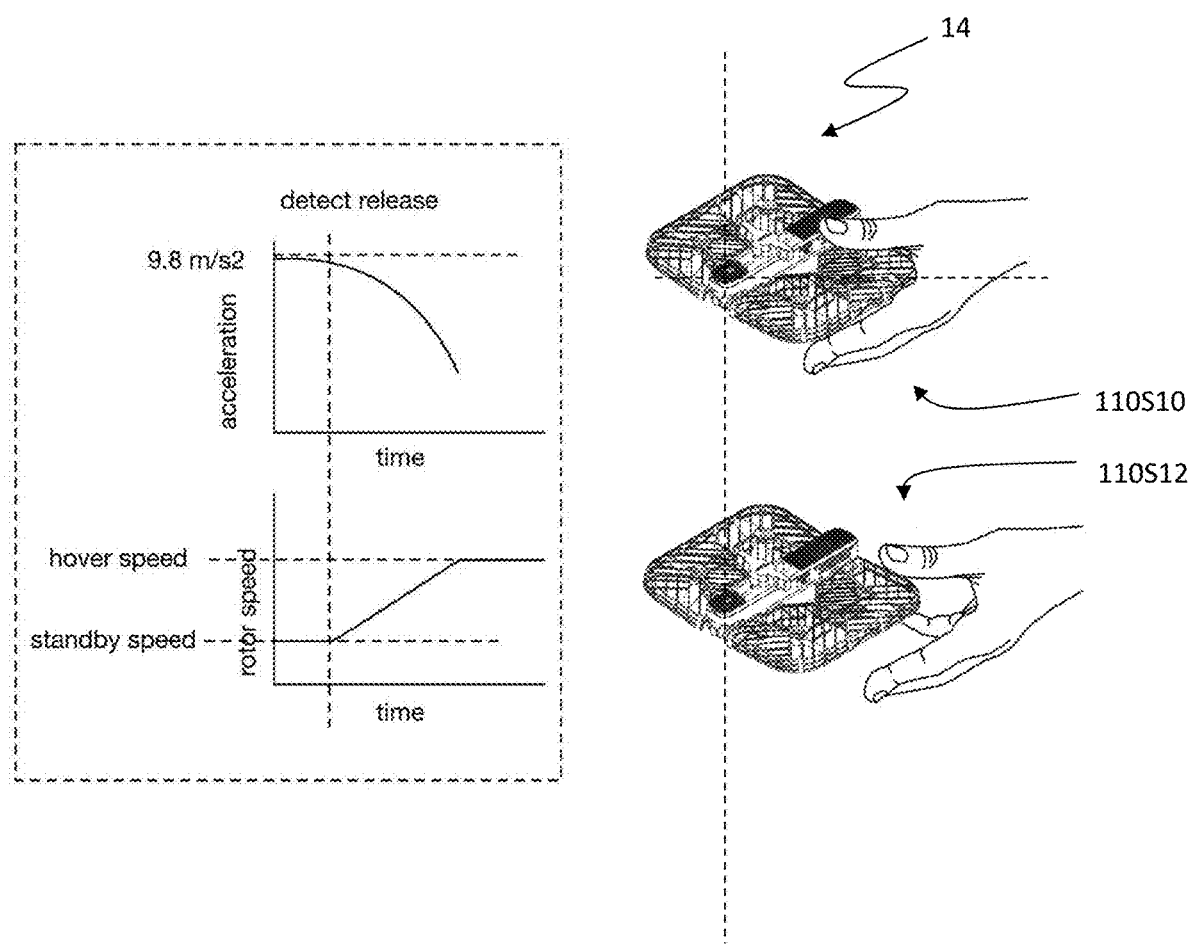
FIG. 14 is a schematic representation of a first variation of automatic aerial system operation, including a specific example of the detected sensor signal change indicative of freefall and a specific example of lift mechanism control in response to the detected sensor signal change.
Figure 16:
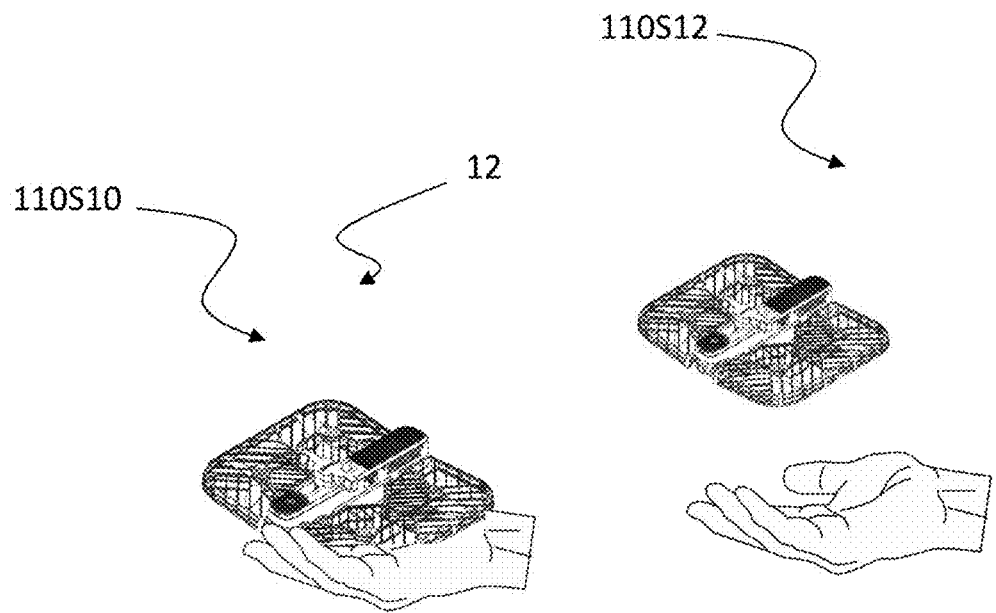
FIG. 16 is a schematic representation of a third variation of automatic aerial system operation, in which the aerial system automatically lifts off a support surface.
Figure 17:
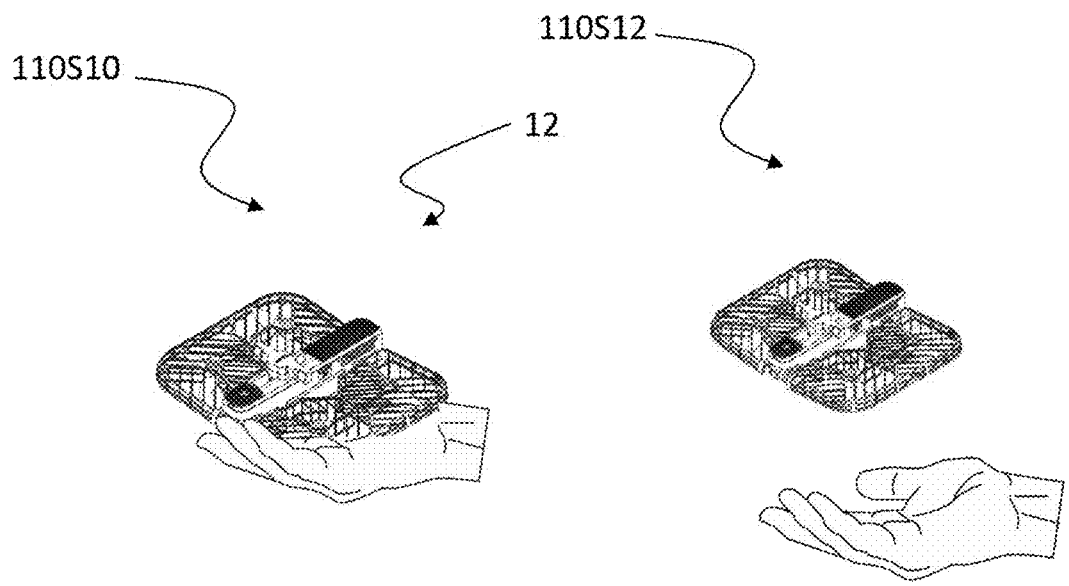
FIG. 17 is a schematic representation of a fourth variation of automatic aerial system operation, in which the aerial system automatically hovers upon removal of a support surface.

In a first example, the rotation speed is first increased to a speed above the hover speed, then lowered to the hover speed, such that the aerial system ceases freefall and hovers after freefall is detected. This can function to prevent the aerial system 12 from freefalling when a support surface is suddenly removed (shown in FIG. 17). In a second example, the rotation speed can be proportionally related to the rate of acceleration change. In a specific example, the rotation speed can be faster than the hover speed when the acceleration change exceeds that associated with freefall (e.g., when the aerial system is thrown down). This can function to enable the aerial system 12 to recover faster and/or recover an initial altitude (e.g., measured before or when the change was detected). In a second specific example, the rotation speed can be increased proportionally to the amount of acceleration change. In operation, this causes the rotors to gradually spool up as the aerial system 12 is gradually released by the user 18 (shown in FIG. 14). In a third specific example, the rotor speed can increase at a predetermined rate. In operation, this causes the rotors to gradually spool up, slowly lifting the aerial system away from a support surface, such as a user's hand (shown in FIG. 16). In this specific example, the method can additionally include switching to the first example when the support surface is suddenly removed (e.g., as determined from a sudden change in the orientation sensor signal). The rotation speed can optionally be limited to prevent or minimize wake effects. However, the lift mechanism can be otherwise operated in response to detection of the change.

The method can optionally include monitoring sensor signals associated with a second axis and determining the lift mechanism operation parameters (for lift mechanism operation in response to imminent operation detection) based on the sensor signals for the second axis. This can function to select lift mechanism operation parameters that enable the aerial system traverses a distance along the second axis before halting and hovering. The second axis is preferably different from the axis substantially parallel to the gravity vector (e.g., perpendicular the axis substantially parallel to the gravity vector, at a non-zero angle to the axis, etc.), but can alternatively be the same. The axes can be fixed with respect to the aerial system 12, or can be dynamically transformed (e.g., to attempt to fix the axes with respect to gravity and/or the ambient environment, possibly based on measurements sampled by the accelerometer, gyroscope, camera, and/or any other suitable sensors). The sensor signals for the second axis that are considered in determining the lift mechanism operation parameters can be sensor signals acquired concurrently with the sensor signals for the first axis, before the imminent operation change is detected, after the imminent operation change is detected (e.g., in response to change detection), or at any other suitable time. The distance can be predetermined, determined based on time (e.g., the aerial system 12 can traverse along the second axis for 1s after release), determined based on the amount of applied force, or be determined in any other suitable manner.

Figure 15:
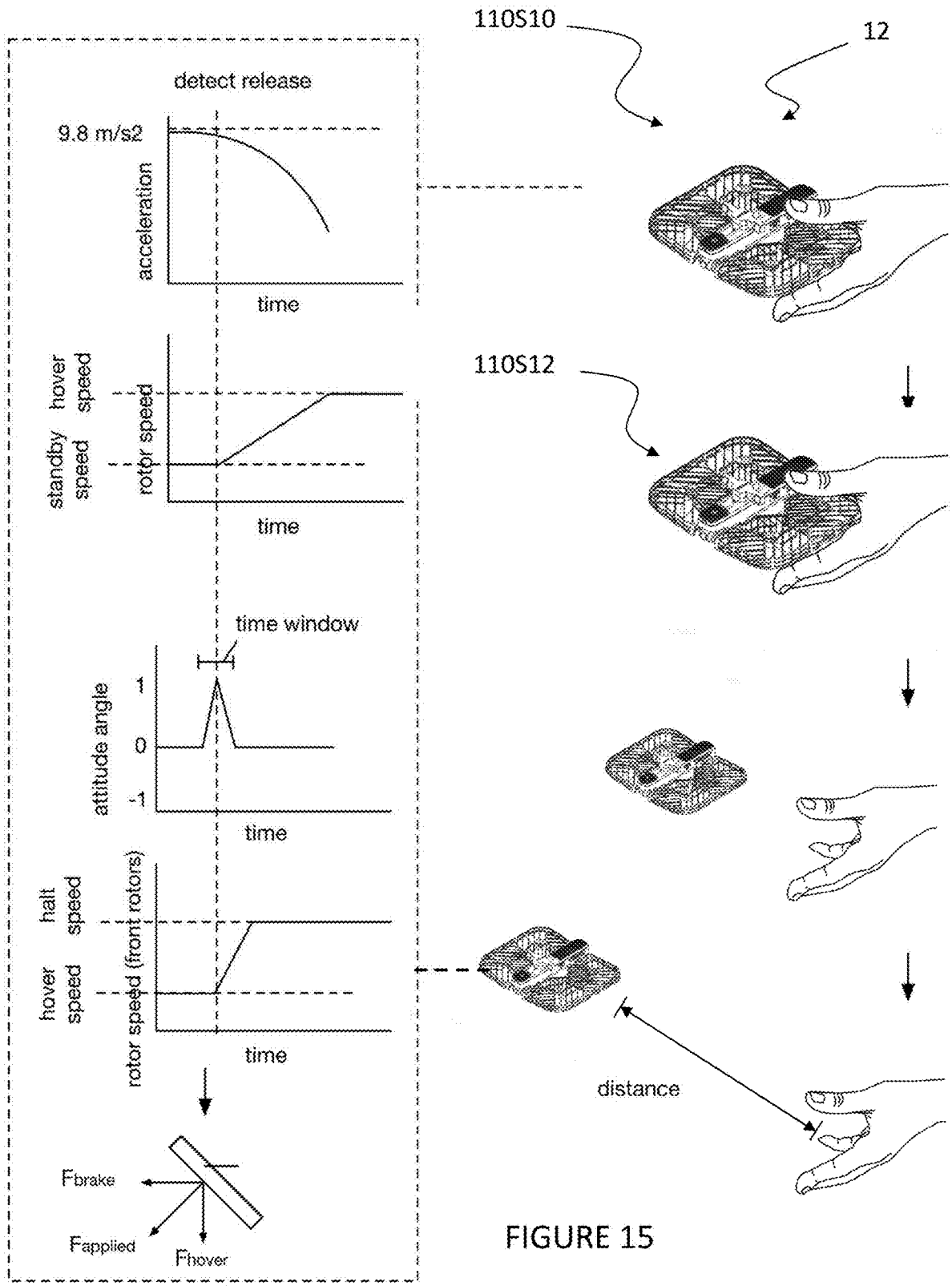
FIG. 15 is a schematic representation of a second variation of automatic aerial system operation including detection of an applied force along a second axis, further including a specific example of the detected sensor signal change indicative of freefall and a specific example of lift mechanism control in response to the detected sensor signal change.

In one variation, shown in FIG. 15, the second axis can be parallel the longitudinal axis of the body (e.g., intersect the camera field of view). In response to detecting force application along the second axis (e.g., within a time window of change detection), the aerial system 12 can automatically determine lift mechanism operation instructions to counteract the applied force. This can function to allow the aerial system 12 to travel a predetermined distance along the second axis before ceasing further traversal. Force application and/or applied force magnitude can be determined from an orientation sensor monitoring the second axis (e.g., the accelerometer for the second axis), determined from a force sensor arranged along an aerial system surface perpendicular the second axis, or otherwise determined. The applied force to be counteracted can be the instantaneous force in the second axis at the time the predetermined condition is met, the applied force measured within a time window of imminent operation event detection (e.g., the maximum force, minimum amount of force, etc.), the applied force measured concurrent with imminent operation event detection, or be any other suitable force measured at any other suitable time. In one example, the lift mechanism operation instructions can include spooling up the rotors to hover the aerial system immediately after imminent operation event detection, allowing the aerial system 12 to coast using the applied force for a predetermined period of time after imminent operation event detection, controlling the lift mechanisms to cease further traversal along the second axis (or any axis) after a predetermined condition has been met, and controlling the lift mechanisms 40 to hover the aerial system 12 (e.g., controlling the lift mechanisms 40 to operate at hover speed). In a second example, the lift mechanism operation instructions can include determining the resultant aerial system speed or acceleration along the second axis due to the applied force, spooling up the rotors to maintain the aerial system speed or acceleration along the second axis immediately after imminent operation event detection until a predetermined condition has been met, controlling the lift mechanisms 40 to cease further traversal along the second axis (or any axis) upon satisfaction of the predetermined condition, and controlling the lift mechanisms 40 to hover the aerial system 12 (e.g., controlling the lift mechanisms 40 to operate at hover speed). The predetermined condition can be imminent operation event detection (e.g., wherein the instructions are implemented immediately after imminent operation event detection), within a threshold period of time after imminent operation event detection, after a predetermined condition is met after imminent operation event detection (e.g., after a predetermined distance has been traversed, after a predetermined amount of time has passed, etc.), or at any other suitable time. In one example, the predetermined condition can be selected based on the magnitude of applied force (e.g., acceleration magnitude, etc.). The magnitude of the applied force can be the magnitude of the force applied along the second axis, the total magnitude of the force applied to the system (e.g., less the force applied by gravity), or be otherwise determined.

In a first specific example, the instruction execution delay can be proportional to the amount of applied force, such that the aerial system flies further before halting further aerial system traversal along the second axis when larger forces are applied upon aerial system release. In a second specific example, the instruction execution delay can be inversely proportional to the amount of applied force, such that the aerial system flies a shorter distance before halting when larger forces are applied upon aerial system release. However, the aerial system 12 can be otherwise operated based on sensor signals for the second axis.

The method can optionally include monitoring sensor signals associated with aerial system altitude and determining the lift mechanism operation parameters based on the altitude. In one variation, this can function to select lift mechanism operation parameters to regain an initial aerial system altitude (e.g., compensate for any altitude losses due to freefall prior to recovery). The altitude can be determined based on signals sampled by an altimeter, and/or a relative altitude can be determined based on image analysis, range finding (e.g., using a vertically-oriented rangefinder to determine distance to the ground, floor, and/or ceiling). The altimeter signals (and/or other altitude data) that are considered in determining the lift mechanism operation parameters can be altimeter signals acquired concurrently with the sensor signals for the first axis, before the imminent operation change is detected, after the imminent operation change is detected (e.g., in response to change detection), or at any other suitable time. For example, the method can include determining the initial aerial system altitude within a predetermined time window from imminent operation event detection (e.g., prior to imminent operation event detection, based on altimeter measurements recorded prior to imminent operation event detection), spooling up the rotors to hover the aerial system immediately after imminent operation event detection, and increasing the rotor speed until the aerial system reaches the initial aerial system altitude after the aerial system 12 is stabilized. However, the altimeter signals (and/or other altitude data) can be used in any other suitable manner.

Receiving a control instruction 100S14 can function to enable a user 18 to augment and/or override automatic aerial system operation. The control instruction is preferably received during aerial system flight, but can additionally or alternatively be received before flight and/or at any other suitable time. The processing system 22 preferably receives the control instructions, but any other suitable system can receive the control instructions. The control instructions are preferably received from a user, user device, remote controller, and/or client (e.g., running on a user device) associated with the aerial system 12, but can alternatively be received from a location associated with the aerial system 12 (e.g., from a device at the location), sensors on-board the aerial system 12 (e.g., interpreting hand or body signals), and/or from any other suitable system. The user 18 can be recognized by the aerial system 12 (e.g., through optical recognition, such as facial or body recognition), can be near the aerial system 12 (e.g., within range of the aerial system sensors), can be otherwise associated with the aerial system 12, or can be any suitable user 18. The user device and/or client can be paired with the aerial system 12 (e.g., through a Bluetooth connection, dynamically paired upon aerial system startup, paired at the manufacturing facility, etc.), have a complementary security key pair for the aerial system 12, be associated with the same user account as the aerial system 12, or be otherwise associated with the aerial system 12. The control instructions can be generated by the user 18, generated by the user device or client (e.g., in response to user input receipt), generated by a device at the location associated with the aerial system 12, determined based on a characteristic of the control instruction sender (e.g., location appearance characteristic, ambient environment audio characteristic, etc.), generated by the aerial system 12, and/or generated or determined in any other suitable manner.

In one variation, the control instructions can include a landing instruction. In a first embodiment, 100S14 includes determining a landing area (e.g., automatically identifying the landing area). This can be performed wholly or partially by the processing system 22, remote computing system, or any other suitable system. The landing area can be automatically determined based on aerial system sensor measurements, be received from the control instruction sender, be user-specified (e.g., at the client), or be otherwise determined.

In a first variation of this embodiment, a retention mechanism (e.g., human hand, docking station, capture device, etc.) is determined to be the landing area, based on the position, type, and/or conformation of the retention mechanism. This variation preferably includes optically detecting (e.g., using image recognition techniques, classification techniques, regression techniques, rule-based techniques, pattern-matching techniques, etc.) the retention mechanism position, type, and/or conformation, but can additionally or alternatively include determining the position, type, and/or conformation in any other suitable manner.

Figure 19:
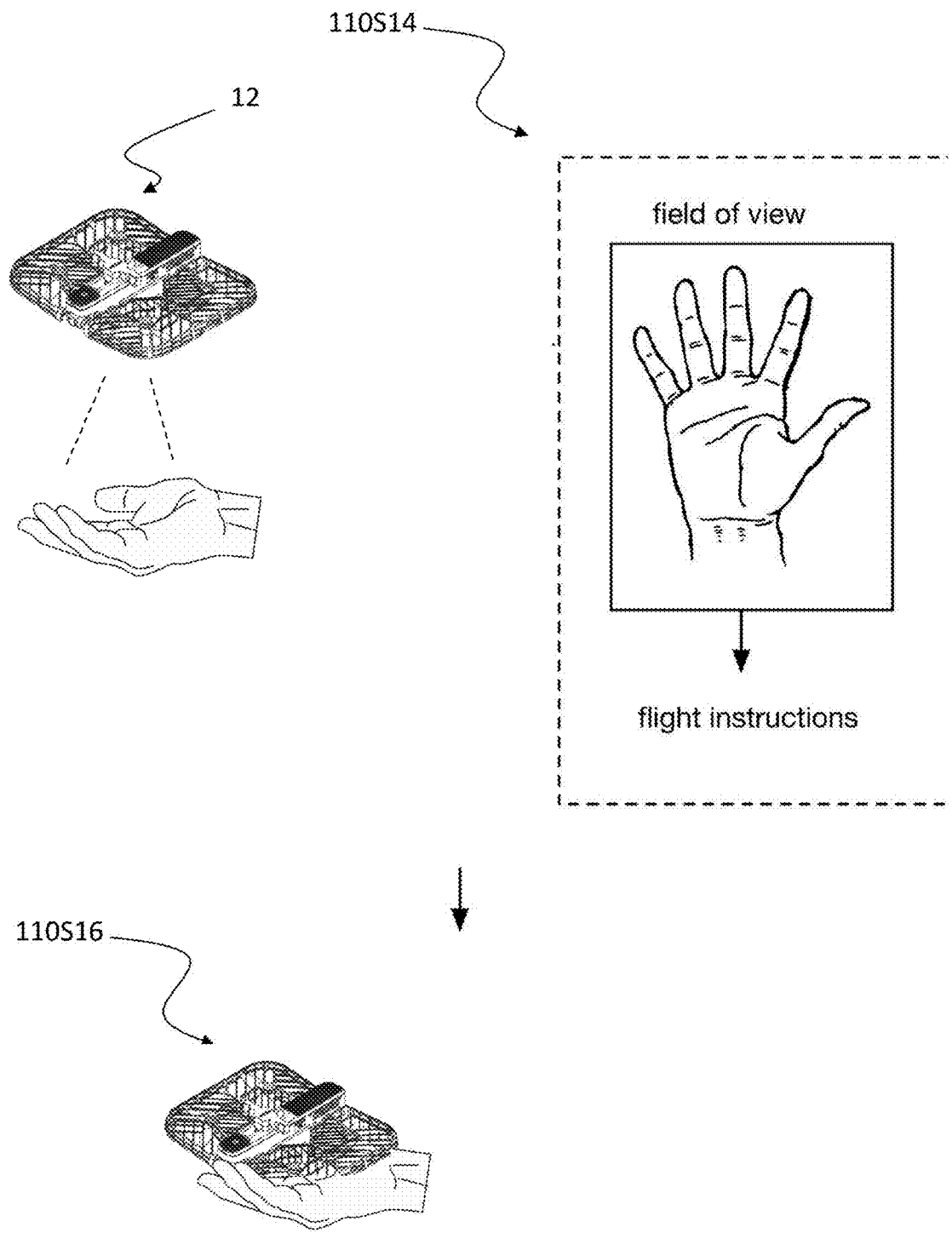
FIG. 19 is a schematic representation of a second variation of detecting a standby event and operating the aerial system in a standby mode, including detecting an open user hand underneath the aerial system as the standby event.
Figure 20:
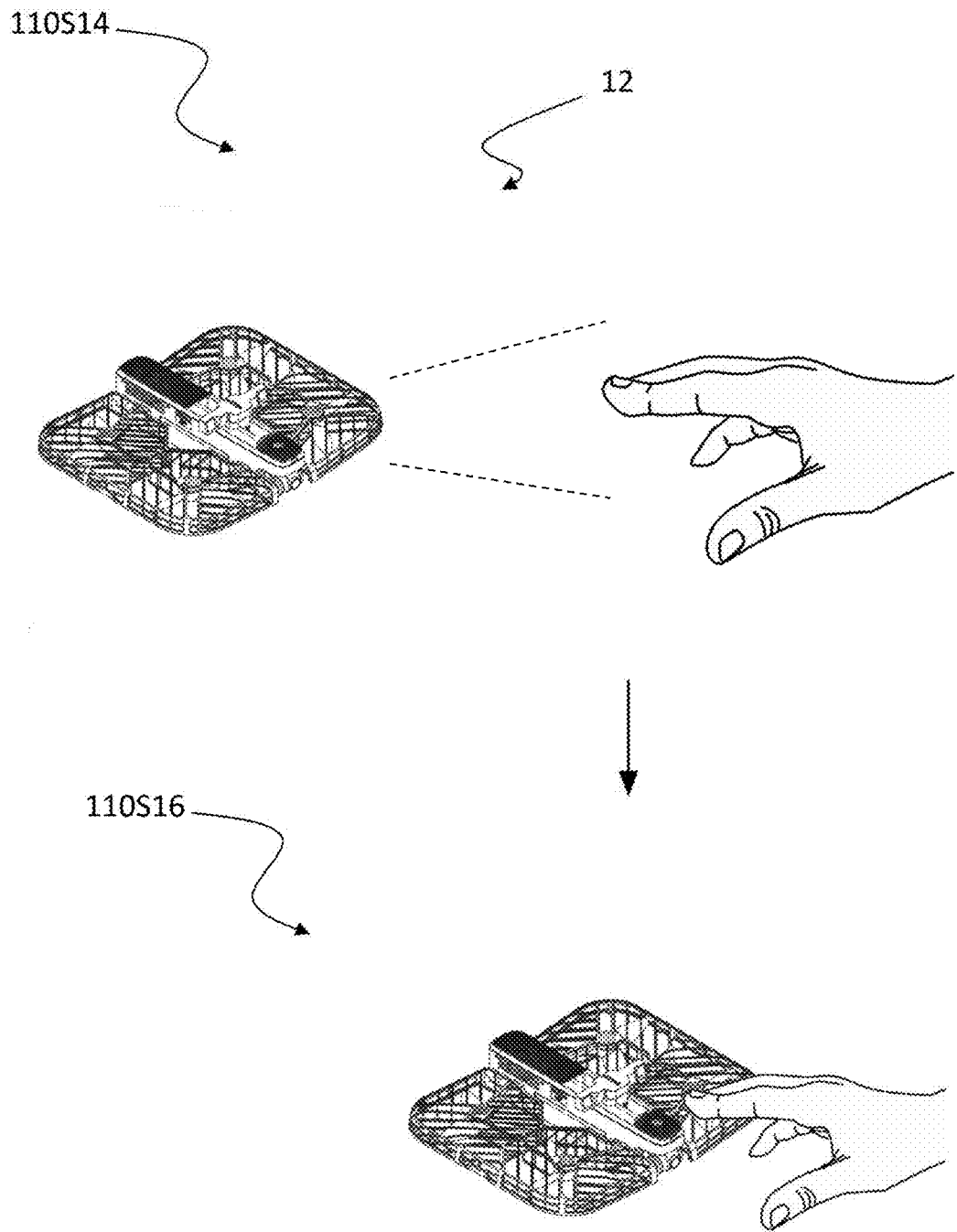
FIG. 20 is a schematic representation of a third variation of detecting a standby event and operating the aerial system in a standby mode, including detecting a user hand in a "ready-to-grab" conformation to the side of the aerial system as the standby event.

For example, the retention mechanism can be a human hand. In a first specific example, the landing area is an open hand detected using images from the downward facing camera (e.g., as shown in FIG. 19). In a second specific example, the landing area is a hand in a "ready-to-grab" conformation (e.g., as shown in FIG. 20). In a third specific example, the landing area is a hand making a beckoning gesture.

This variation can include: periodically analyzing (e.g., using visual analysis techniques, image analysis techniques, etc.) sensor data such as images captured by aerial system cameras (e.g., arranged along the top, side, and/or bottom of the aerial system) for a retention mechanism in a predetermined conformation type (e.g., open hand, "ready-to-grab" hand, etc.), and identifying the retention mechanism as a landing area in response to detection of parameters indicative of the predetermined conformation type.

In a first example, the method can include: sampling a set of infrared images, identifying a region within the image having an infrared signature above a threshold value, and determining that the identified region is a hand (e.g., using pattern matching, deterministic methods, classification, regression, probabilistics, etc.). For example, the identified region can be determined to be a hand when the region perimeter substantially matches a reference pattern for a hand. In a second example, the method can include: sampling a set of visual range images, segmenting the image background from the foreground, and determining that the foreground region is a hand (e.g., using methods discussed above). However, a human hand can be otherwise identified.

This variation can optionally include: identifying a user hand from images (e.g., recorded by a downward facing camera) and identifying the hand as a landing area in response to recognizing the hand as a specific user's hand (e.g., using classification techniques, regression techniques, biometric data such as fingerprints, etc.) associated with the aerial system 12. For example, extracted biometric data can be compared with biometrics can be stored on the aerial system 12, in the user device, or in a remote database, wherein the user can be rejected if the biometric data does not match beyond a threshold percentage, and accepted if the biometric data matches beyond the threshold percentage. This embodiment can optionally include ignoring commands received from a hand (e.g., identifying the hand as a non-landing area) when the detected hand is not associated with a user associated with the aerial system.

In a second variation, the landing area can be a substantially flat surface (e.g., perpendicular a gravity vector) proximal the aerial system 12 (e.g., identified based on based on visual and/or image processing of images recorded by a front facing or downward facing camera, identified by a beacon near the landing area, specified by an instruction received from a user device, etc.). In a third variation, the landing area can be a predetermined docking area (e.g., a home base, identified by an optical pattern, beacon signal, predetermined geographic location, or otherwise identified). However, the landing area can be any other suitable landing area and/or can be otherwise determined.

In a second embodiment, the landing instruction includes a time and/or time period. For example, the landing instruction can include a time to land, a desired flight duration (e.g., measured from the flight event detection time, from the stabilization time, from the landing instruction receipt time, etc.), and/or any other suitable timing information.

Additionally, or alternatively, the control instruction can include a flight instruction (e.g., speed, altitude, heading, flight pattern, target destination, collision avoidance criteria, etc.), a sensor instruction (e.g., begin video streaming, zoom camera, etc.), and/or any other suitable instruction.

Operating the aerial system 12 according to the control instruction 100S16 functions to carry out the control instruction. 100S16 is preferably performed automatically in response to receiving the control instruction 100S14, but can additionally or alternatively be performed at any suitable time after receiving the control instruction 100S14. The processing system 22 preferably operates the lift mechanisms 40 and/or other aerial system modules based on the control instructions, but additionally or alternatively, any other suitable system can operate the aerial system 12. In a first variation, the control instructions override the automatic flight instructions. In a second variation, the control instructions are augmented by the automatic flight instructions (e.g., wherein the processor generates a tertiary set of flight instructions based on the automatic flight instructions determined based on the sensor data and the received control instructions). In a third variation, the control instructions are executed after a predetermined flight state has been reached. In one example of the third variation, the control instructions are executed after the aerial system 12 has stabilized (e.g., has substantially ceased traversal and/or is hovering). However, the control instructions can be executed at any suitable time in any suitable manner. After performing 100S16, the aerial system 12 can resume operating in a previous mode (e.g., the operation mode immediately before performing 100S16, such as a hover mode), can begin operation in a different flight mode, can enter a standby mode, and/or can operate in any other suitable mode.

In a first embodiment, the control instruction includes a flight instruction, and 100S16 can include operating according to the flight instruction. For example, in response to receiving a command to increase altitude and pan left, 100S16 can include automatically operating the lift mechanism 40 to follow the instructions, and then to resume aerial system hovering in the new position. In a second example, in response to receiving a command to increase rotor speed, 100S16 can include increasing the rotor speed accordingly.

In a second embodiment, the control instruction is a landing instruction including a landing area, and 100S16 can include automatically generating a flight path to the landing area, generating lift mechanism operation instructions to follow the generated flight path, and executing the instructions. This can function to automatically land the lift mechanism 40. The flight path can be generated based on the intervening physical volume between the aerial system 12 and the landing area (e.g., as determined based on visual and/or image processing of images recorded by a front facing or downward facing camera), be a predetermined flight path, or otherwise determined. In one example, determining the flight path and/or lift mechanism operation instructions includes: determining the distance between the aerial system and the landing area (e.g., based on LIDAR, the relative size of a reference object or point within the field of view, etc.), and determining a rotor spool down rate based on the instantaneous rotor speed, the standby rotor speed, and the distance. In a second example, determining the flight path and/or lift mechanism operation instructions includes tracking the landing area (e.g., to track flight progress toward the landing area, to track the current position of a moving landing area, etc.) and automatically controlling the aerial system 12 to land on the landing area. However, the lift mechanism operation instructions can be otherwise generated.

In a first specific example, in which the landing area is an open hand, 100S16 includes automatically controlling the aerial system 12 to land on the open hand (e.g., operating the lift mechanism 40, such as by reducing the rotor speeds, to slowly lower the aerial system 12 onto the open hand) in response to detecting the open hand. In a second specific example, in which the landing area is a "ready-to-grab" hand, 100S16 includes automatically controlling the aerial system 12 to fly proximal the hand (e.g., within reach of the hand, in contact with the hand, within a threshold distance of the hand, such as 1 in, 3 in, or 1 foot, etc.) in response to detecting the hand (e.g., immediately after detecting the hand, a period of time after detecting the hand, before detecting a standby event 100S18 and/or operating in a standby mode 100S20, etc.). However, the aerial system 12 can be operated according to the control instruction 100S16 in any suitable manner.

Detecting a standby event 100S18 functions to indicate that the aerial system 12 should commence a standby procedure. The standby event (e.g., flight cessation event) is preferably detected while the aerial system 12 is operating in a flight mode (e.g., hover mode, landing mode, etc.), but can additionally or alternatively be detected while the aerial system 12 is operating in any other suitable mode and/or at any other suitable time. The standby event is preferably detected by the processing system 22 (e.g., of the aerial system), but can alternatively be automatically detected by the remote computing system, the user device, or by any other suitable system.

Detecting the standby event 100S18 preferably includes detecting a grab indication (e.g., indication that the aerial system has been captured or seized by a retention mechanism such as a human hand) and/or holding indication (e.g., indication that the aerial system 12 is in prolonged contact with a user 18, indication that the aerial system 12 is docked at a docking station, etc.), and can additionally or alternatively include detecting a landing indication (e.g., indication that the aerial system has landed on and/or is supported by a landing area), proximity indication (e.g., user proximity, landing area proximity, etc.), and/or any other suitable standby indication. The standby event is preferably detected based on data sampled by sensors, more preferably on-board aerial system sensors (e.g., inertial measurement unit, camera, altimeter, GPS, temperature sensor, etc.). For example, the standby event can be detected based on the value and/or change in value of the aerial system's: orientation (e.g., orientation with respect to gravity, orientation change and/or rate of change, etc.), altitude (e.g., altitude change and/or rate of change; determined based on altimeter readings, image processing, etc.), temperature (e.g., increasing aerial system temperature, temperature difference between regions of the aerial system 12, etc.), and/or force (e.g., aerial system compression). However, the standby event can additionally or alternatively be detected based on transmissions (e.g., from a remote control such as a client of a user device) and/or any other suitable information.

The standby event can be detected using classification, regression, pattern matching, heuristics, neural networks, and/or any other suitable techniques. Monitoring and analyzing data to detect the standby event preferably includes discriminating between standby events (e.g., grab events, etc.) and other events (e.g., wind events, collision events, etc.). For example, the method can include monitoring aerial system sensor data while operating in a flight mode, detecting a first anomalous event and classifying it as a wind event (e.g., flight disturbance due to wind), then detecting a second anomalous event and classifying it as a grab event.

Figure 18:
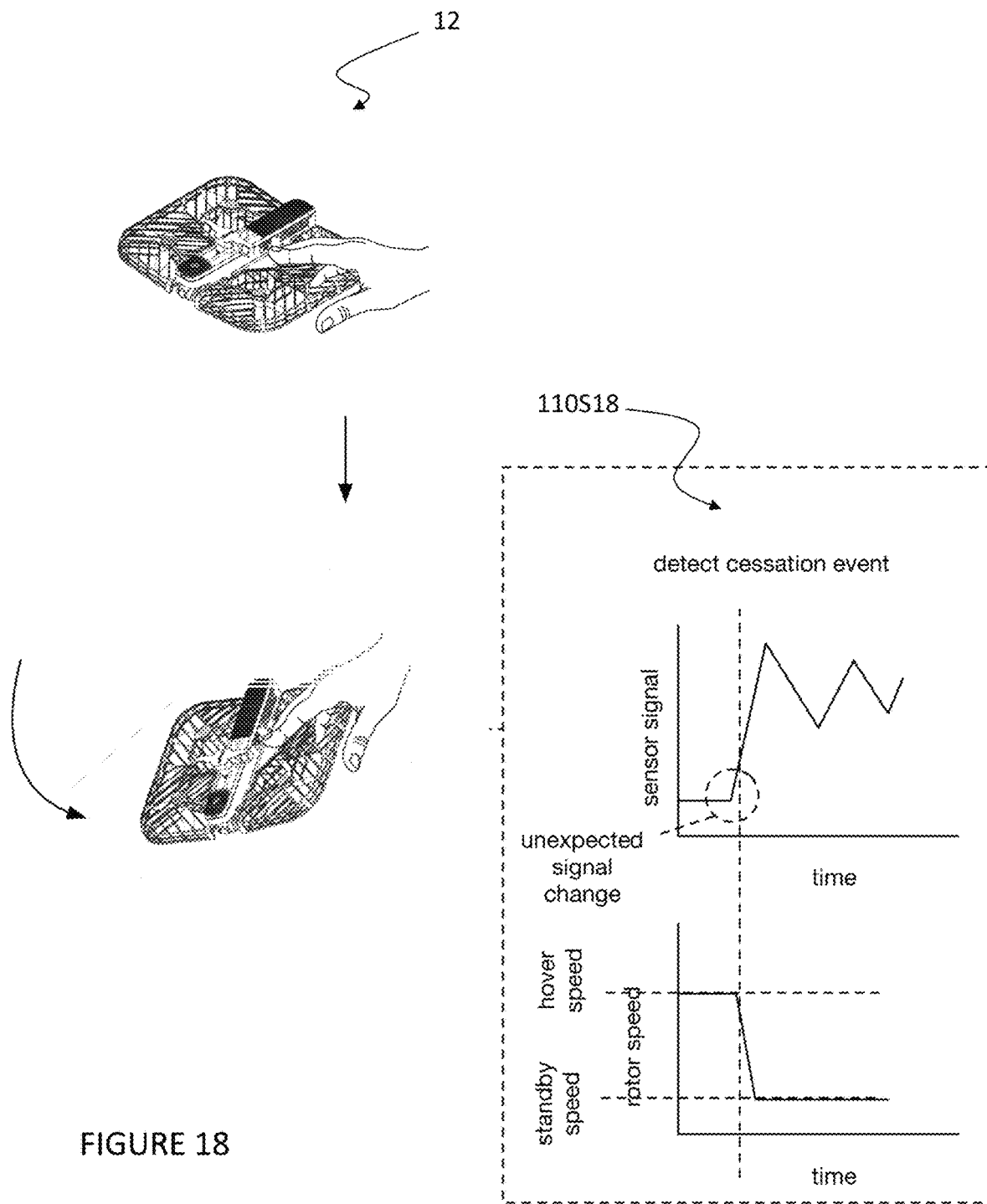
FIG. 18 is a schematic representation of a first variation of detecting a standby event and operating the aerial system in a standby mode, including a specific example of the detected unexpected sensor signal change and a specific example of lift mechanism control in response to the detected standby event.

In a first variation, detecting the standby event 100S18 includes detecting an unexpected spatial sensor signal change. The unexpected spatial sensor signal change can be indicative of a user grabbing the aerial system mid-flight or mid-air, or be indicative of any other suitable event. The unexpected spatial sensor signal change can be a change relative to another spatial sensor signal (e.g., previous signal from the spatial sensor, previous or concurrent signal from a different spatial sensor, etc.), change relative to an expected spatial sensor signal (e.g., corresponding to a target or desired aerial system orientation, velocity, and/or other spatial parameter, based on lift mechanism control, etc.), and/or any other suitable spatial sensor signal change. In a first embodiment of this variation, detecting an unexpected spatial sensor signal change includes detecting a spatial sensor signal change (e.g., gyroscope signal change, accelerometer change, IMU change, altimeter change, etc.) different from expected spatial sensor signals determined based on automatically generated and/or remotely received control instructions. In a first example of this embodiment, a sensor fusion model (e.g., model including an extended Kalman filter, neural network model, regression model, classification model, etc.) can be used to detect the standby event based on the sensor signals. In a second embodiment of this variation, detecting unexpected spatial sensor signal change includes detecting a spatial sensor signal change (e.g., an IMU change) above a predetermined threshold value. The spatial sensor signal can be indicative of acceleration along an axis, velocity along an axis, angular change (e.g., yaw, pitch, roll, etc.), or be indicative of any other suitable aerial system motion and/or position. In a first example of this embodiment (shown in FIG. 18), the unexpected orientation sensor signal change is detected when the aerial system pitch exceeds a threshold rate of change or threshold angular change (e.g., as determined from accelerometer and/or gyroscope signals). In a second example of this embodiment, a first unexpected spatial sensor signal change below the predetermined threshold value is not recognized as a standby event, but rather as a wind perturbation event, and the lift mechanism is controlled to correct for the wind perturbation. In this second example, a second unexpected spatial sensor signal change is above the predetermined threshold value, and is recognized as a standby event. In a third example of this embodiment, the standby event is detected 100S18 based on a combination of an unexpected spatial sensor signal change above the predetermined threshold value and a supplementary signal (e.g., temperature exceeding the ambient environment temperature by a threshold amount, compressive force on the aerial system body exceeding a threshold force, etc.). In a fourth example of this embodiment, the standby event is detected 100S18 when a pattern of spatial sensor signal change substantially matches a predetermined pattern associated with the standby event and/or does not substantially match predetermined patterns associated with other flight events (e.g., wind perturbation). However, the standby event can be otherwise detected.

In a second variation, detecting the standby event 100S18 includes determining that the aerial system 12 has remained within a threshold angular range from a gravity vector and/or expected orientation vector (e.g., tilted from horizontal and/or from an expected aerial system orientation by more than 35°, 45°, 60°, etc.) for a predetermined period of time (e.g., greater than 100 ms, 350 ms, 1 s, 2 s, etc.). For example, the standby event can be detected when the aerial system 12 (e.g., major plane of the aerial system) has been tilted more than 45° from horizontal and/or from the target aerial system orientation for more than 1 second. However, the standby event can be otherwise detected.

In a third variation, detecting the standby event 100S18 includes detecting user and/or retention mechanism proximity to the aerial system 12 (e.g., indicative of a user grabbing the aerial system mid-air, etc.). User and/or retention mechanism proximity can be detected using the aerial system's proximity sensor, touch sensor, temperature sensor (e.g., an increase in temperature), communications module (e.g., when a short-range connection is established between the aerial system and user device), switches, or otherwise detected. For example, 100S18 can include detecting an actuation of a switch mechanically coupled to the housing. The switch can be a button (e.g., button located conveniently for the retention mechanism, such as on the top or bottom housing surface, proximal a housing perimeter, or under a fingertip when the aerial system 12 is held by a human hand), electrical contacts on the body exterior that can be electrically connected by a conductive element of the retention mechanism, and/or any other suitable switch.

In a fourth variation, detecting the standby event 100S18 includes receiving an instruction (e.g., standby instruction) from a remote control (e.g., user device). However, the standby event can be detected 100S18 in any other suitable manner.

Operating the aerial system 12 in a standby mode 100S20 functions to suspend aerial system flight control. The aerial system 12 is preferably operated in the standby mode 100S20 automatically in response to detecting the standby event 100S18 (e.g., immediately after detecting the standby event 100S18, a predetermined time period after detecting the standby event 100S18, after detecting the standby event 100S18 and fulfilling additional criteria, etc.). 100S20 is preferably performed by the aerial system processor, but can additionally or alternatively be performed by other aerial system components, a remote computing system, a user device, and/or any other suitable device.

210S22 preferably includes reducing the aerodynamic force generated by the lift mechanism 40 to a force less than the force required for aerial system flight (e.g., reduced to zero force; to a fraction of the required force, such as 1%, 5%, 10%, 50%, 75%, 1-10%, 5-25%, etc.; to just below the required force; etc.). In a variation in which the lift mechanism 40 includes a set of rotors, the rotors can be stopped or unpowered (e.g., controlled to rotate at zero or minimal angular velocity, provided zero or minimal power by the motors that drive them, etc.), can rotate at a slower angular velocity than when in the flight mode (e.g., a fraction of the flight mode angular velocity or minimum angular velocity required for flight, such as 1%, 5%, 10%, 50%, 75%, 1-10%, 5-25%, etc.), can be otherwise altered to cooperatively generate less aerodynamic force than when in the flight mode (e.g., rotor blade angle decreased), and/or can be controlled in any other suitable manner. For example, operating each of rotor of the set of rotors to cooperatively generate an aerodynamic force less than the flight mode aerodynamic force can include reducing power provided to each rotor to less than a power threshold required for aerial system flight (e.g., a fraction of the required power, such as 1%, 5%, 10%, 50%, 75%, 1-10%, 5-25%, etc.). Additionally, or alternatively, the aerodynamic force generated by the lift mechanism 40 can be reduced, but not below the force required for aerial system flight, can remain unreduced, or can be changed in any other suitable way.

In another aspect of the present invention, with reference to FIGS. 21-42, images may be presented on the remote device 14 that assist the user 18 in controlling the aerial system 12. In the below discussion, the aerial system 12 may be controlled via user input directly onto or into the remote device 14. However, the system 10 may also allow for user control using user expression, e.g., thought, facial expressions, gestures, and/or voice commands.

Figure 21:
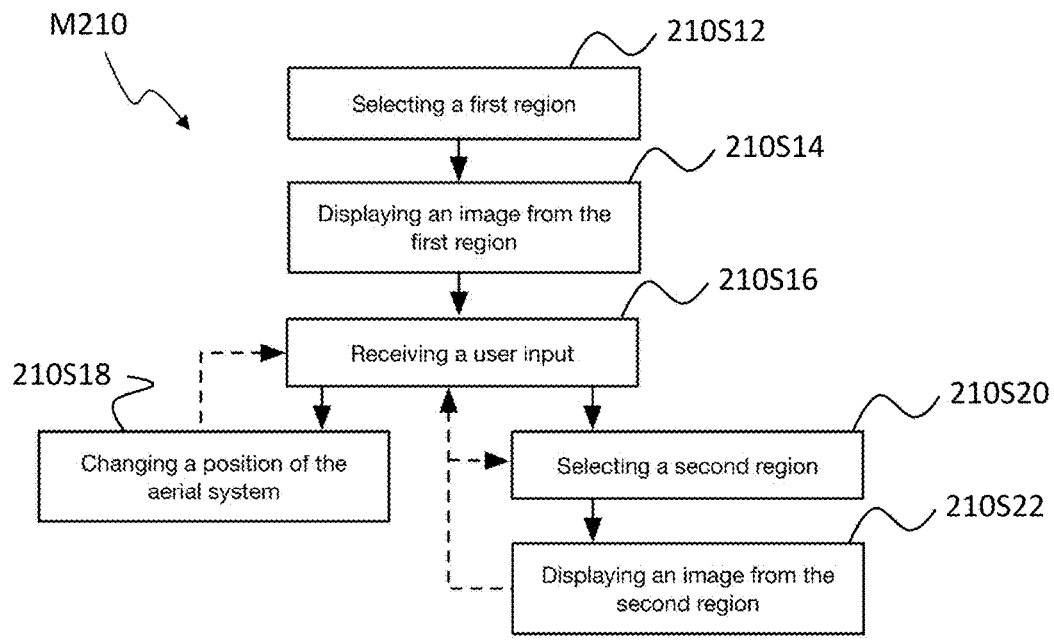
FIG. 21 is as flowchart diagram of a system for controlling flight of an aerial system based on images presented to the user, according an embodiment of the present invention.

As shown in FIG. 21, a method for aerial system control includes: selecting a first region of an imaging element 210S12, displaying an image from the first region 210S14, receiving a user input 210S16, changing a position of the aerial system 210S18, selecting a second region of a second imaging element 210S20, and displaying an image from the second region 210S22.

Figure 22:
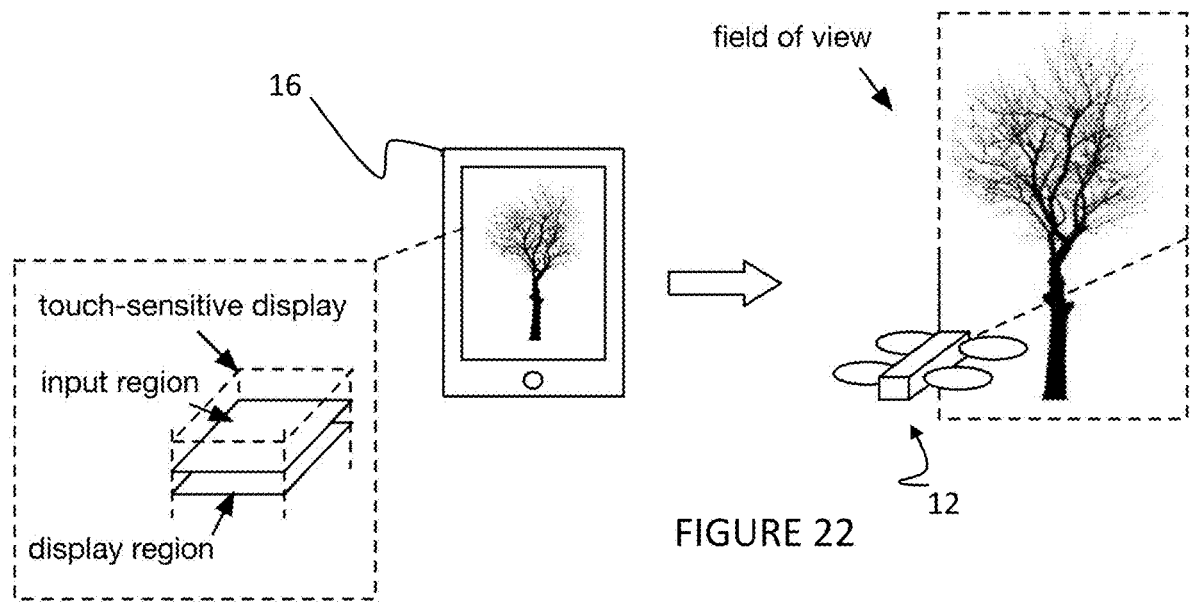
FIG. 22 is a specific example of the control client displaying video recorded by the aerial system.

In operation, as shown in FIG. 22, the aerial system functions to capture and stream video to the remote device in near-real time during aerial system flight. The control client 16 on the remote device functions to receive the video, display the video on a device output, receive commands indicative of aerial system operation instructions from a device input, and send the operation instructions to the aerial system 12 in near-real time. In one variation, the operation instructions can be received at a device input overlaid over the video, such that a user controls the aerial system 12 by moving the video's field of view (FOV). The aerial system 12 can receive the operation instructions and automatically operate based on the operation instructions. In the variation above, the aerial system 12 can be automatically operated such that the resultant optical sensor's FOV moves in the manner prescribed by the user 18 at the remote device 14.

In a specific example, users can directly interact with the video or image on the client (e.g., swipe, zoom, etc.), wherein the user interactions are automatically translated into aerial system movements that physically achieve the desired effect (e.g., translating horizontally to move the frame along the swipe vector, moving toward or away from an object to zoom in or out, respectively, etc.). In this specific example, the system and method can create a WYSIWYG (what you see is what you get)-type interaction.

The system and method for remote aerial system control can confer several benefits over conventional systems.

First, in some variants, the aerial system operation instructions are received on the video displayed by the control client 16. This allows a user 18 to control the drone through the visual output (e.g., by controlling what the camera is aimed at), similar to a "what you see is what you get" experience. The inventors have discovered that this interaction can be more intuitive than conventional control paradigms (e.g., having one or more joysticks that control different aspects of aerial system operation), due to the direct link between the user input (on the video) and the video's response (e.g., created through digital editing and/or aerial system movement). By allowing a user to control the aerial system (e.g., drone) in this indirect manner, the system can simplify remote aerial system control over conventional systems.

Second, in some variants, preferably variants in which the aerial system operation instructions are received on the video displayed by the control client 16, but additionally or alternatively variants in which the operation instructions are otherwise received, the control client 16 can display only a cropped portion of the video on the device output, and the cropping region can be altered based on the operation instructions and/or the aerial system status. This can allow for stabilization and/or responsiveness of the visual output (e.g., using automatic video stabilization programs or methods, etc.). For example, the cropping region can be moved to simulate aerial system motion while waiting for the aerial system to accelerate, and can be rotated to correct for aerial system roll. The inventors have discovered that these modifications of the visual output can provide a more intuitive and less frustrating user experience, due to the ease of watching the visual output and the apparent fast response of the aerial system to operation instructions provided by the user 18.

Third, in some variants, the system can minimize aerial system mass and/or volume by substituting optical sensor actuation with aerial system movement. For example, instead of using a three-axis gimbal system as the optical sensor actuation mechanism, the system can include a single-axis gimbal system, wherein optical sensor actuation about the remaining two axes can be accomplished by moving the aerial system. In a specific example, the optical system can rotate about a single rotational axis (e.g., the x-axis), such that the optical system is only capable of pitching relative to the aerial system; the aerial system replaces optical system yaw or roll (e.g., about the z-axis or y-axis, respectively) by rotating about an aerial system axis. The aerial system 12 can additionally or alternatively function in place of or supplement the optical system's zoom lens (e.g., by flying closer to or retreating away from the video subject, possibly in coordination with actuation of the optical zoom). By substituting the optical sensor component functionalities with aerial system actions (e.g., zoom, rotation, etc.), the system enables the substituted components to be removed from the system, which can reduce overall system mass and/or volume.

However, the system and method can be otherwise configured, and confer any other suitable set of benefits. The control client 16 can define a display frame (e.g., digital structure specifying the region of the remote device output to display the video streamed from the aerial system 12), an input frame (e.g., digital structure specifying the region of the remote device input at which inputs are received), or any other suitable user interface structure. The display frame and input frame preferably overlap, more preferably overlapping entirely (e.g., substantially identical regions), but can alternatively be separate and distinct, adjacent, contiguous, have different sizes, or be otherwise related. The control client 16 can additionally include an operation instruction module that functions to convert inputs, received at the input frame, into aerial system operation instructions. The operation instruction module can be a static module that maps a predetermined set of inputs to a predetermined set of operation instructions; a dynamic module that dynamically identifies and maps inputs to operation instructions; or be any other suitable module. The operation instruction module can calculate the operation instructions based on the inputs, select the operation instructions based on the inputs, or otherwise determine the operation instructions. However, the control client 16 can include any other suitable set of components and/or sub-modules.

The remote device 14 executing the control client 16 functions to display the data (e.g., as instructed by the control client 16), receive user inputs, compute the operation instructions based on the user inputs (e.g., as instructed by the control client 16), send operation instructions to the aerial system 12, store control client information (e.g., associated aerial system identifiers, security keys, user account information, user account preferences, etc.), or perform any other suitable functionality. The remote device 14 can be a user device (e.g., smartphone, tablet, laptop, etc.), a networked server system, or be any other suitable remote computing system. The remote device 14 can include one or more: outputs, inputs, communication systems, sensors, power sources, processing systems (e.g., CPU, memory, etc.), or any other suitable component. Outputs can include: displays (e.g., LED display, OLED display, LCD, etc.), audio speakers, lights (e.g., LEDs), tactile outputs (e.g., a tixel system, vibratory motors, etc.), or any other suitable output. Inputs can include: touchscreens (e.g., capacitive, resistive, etc.), a mouse, a keyboard, a motion sensor, a microphone, a biometric input, a camera, or any other suitable input. Communication systems can include wireless connections, such as radios supporting: long-range systems (e.g., WiFi, cellular, WLAN, WiMAX, microwave, IR, radio frequency, etc.), short-range systems (e.g., BLE, BLE long range, NFC, Zigbee, RF, audio, optical, etc.), or any other suitable communication system. Sensors can include: orientation sensors (e.g., accelerometer, gyroscope, etc.), ambient light sensors, temperature sensors, pressure sensors, optical sensors, acoustic sensors, or any other suitable sensor. In one variation, the remote device 14 can include a display (e.g., a touch-sensitive display including a touchscreen overlaying the display), a set of radios (e.g., WiFi, cellular, BLE, etc.), and a set of orientation sensors. However, the remote device 14 can include any suitable set of components.

As shown in FIG. 21, the method M210 for aerial system control includes: selecting a first region of an imaging element 210S12, displaying an image from the first region 210S14, receiving a user input 210S16, changing a position of the aerial system 210S18, selecting a second region of a second imaging element 210S20, and displaying an image from the second region 210S22. The method functions to allow a user to remotely control the aerial system 12 in an intuitive manner through the user device. Processes of the method are preferably performed sequentially, but can alternatively be performed in parallel or in any other suitable order. Multiple instances of the method (or portions thereof) can be concurrently or serially performed for the same user device-aerial system pair. Each client (e.g., user device) is preferably connected to a single aerial system 12 at any given time, but can alternatively be connected to and/or control multiple aerial systems concurrently.

Selecting a first region of an imaging element 210S12 can function to determine an initial or default imaging element region associated with the aerial system 12. The imaging element can be an optical sensor (e.g., all or subset of a camera active region), image frame, image, set of images, or video sampled by the optical sensor, or be any other suitable image- or imaging-related element. The imaging element is preferably associated with the aerial system 12 (e.g., optical sensor of the aerial system, image frame of the aerial system camera, image captured by the aerial system camera, etc.), but can additionally or alternatively be associated with any other suitable system. Accordingly, the first region of the imaging element can be a region of an optical sensor (e.g., all or a subset of a camera active region), a region of an image frame, image, set of images, or video (e.g., a set of pixel locations of each image or video frame), or a region of any other suitable image- or imaging-related element. The first region can be a default region, or can be selected based on aerial system parameters (e.g., flight parameters such as orientation, velocity, and/or position; optical sensor status; etc.), selected by the user (e.g., preselected, selected in real time at a user device, etc.), selected based on image processing (e.g., object recognition, image segmentation, etc.), and/or selected in any other suitable way. The first region is preferably automatically selected by the aerial system 12 (e.g., prior to image transmission to the remote device), but can alternatively be selected by the remote device (e.g., based on auxiliary sensor measurements received from the aerial system 12), server system, or by any other suitable computing system. The region is preferably selected in near-real time (e.g., before, immediately after, or within a short duration after the image frames are received), but can alternatively be selected at any other suitable time.

The region preferably includes (e.g., encompasses, defines) a regular array of pixels in a contiguous area (e.g., every pixel in the area, every second pixel in the area, every third pixel of every second row in the area, etc.), but can alternatively include multiple non-contiguous areas, irregular pixel arrangements, and/or be any other suitable region. For example, the region can define a rectangle (e.g., be rectangular, be substantially rectangular, be rectangular except for small excisions removed from the rectangle and/or extensions added on to the rectangle, etc.).

The region can be defined by a portion of one or more of the imaging element edges (e.g., occupy the entire area of the sensor, image frame, image, etc.; border one or more of the imaging element edges; extend between the two horizontal edges and lie between the two vertical edges; etc.), can touch one or more of the edges (e.g., be inscribed within the imaging element edges, touch one imaging element edge with one region corner, etc.), or can be strictly inside of the imaging element edges (e.g., occupy a central area; occupy an area near, but not in contact with, one or more edges; etc.). The region can be arranged symmetrically (e.g., with respect to one or more lines of symmetry of the imaging element) or asymmetrically within the imaging element. The region can occupy the entire area of the imaging element, or can occupy any suitable fraction thereof (e.g., 90%, 75%, 10%, at least 50%, 40-90%, etc.). The region can include an orientation relative to the imaging element (e.g., angle between a rectangular region edge and an imaging element edge, orientation associated with a circular region, etc.). However, the region can alternatively have any other suitable arrangement, shape, and/or size with relation to the imaging element. Other regions selected during performance of the method (e.g., the second region, selected in 210S20) can have similar properties as the first region, different properties than the first region, and/or any other suitable properties.

Figure 26:
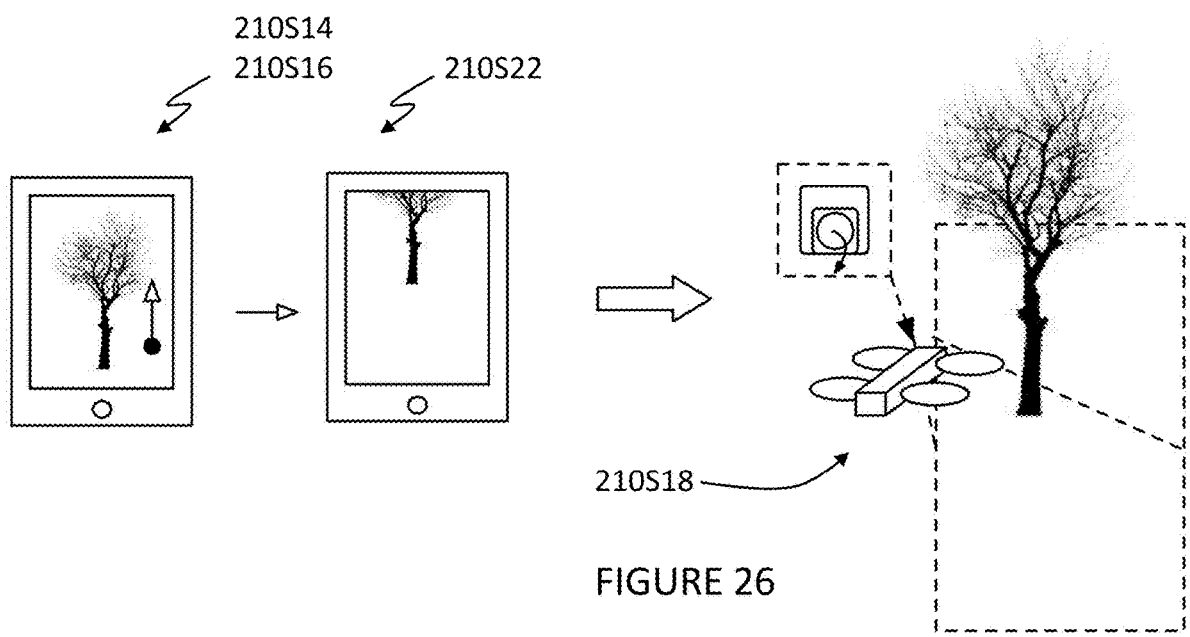
Figure 27:
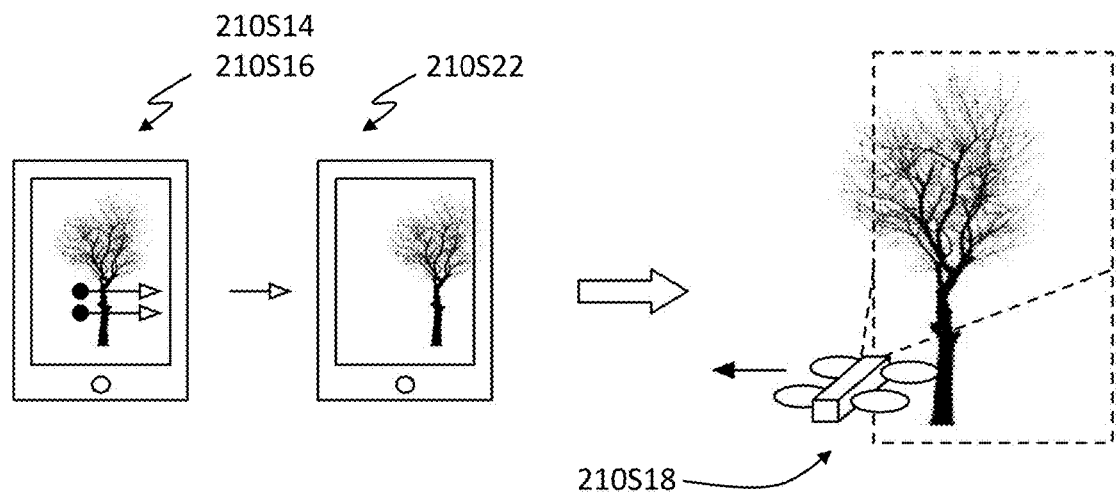
Figure 28:
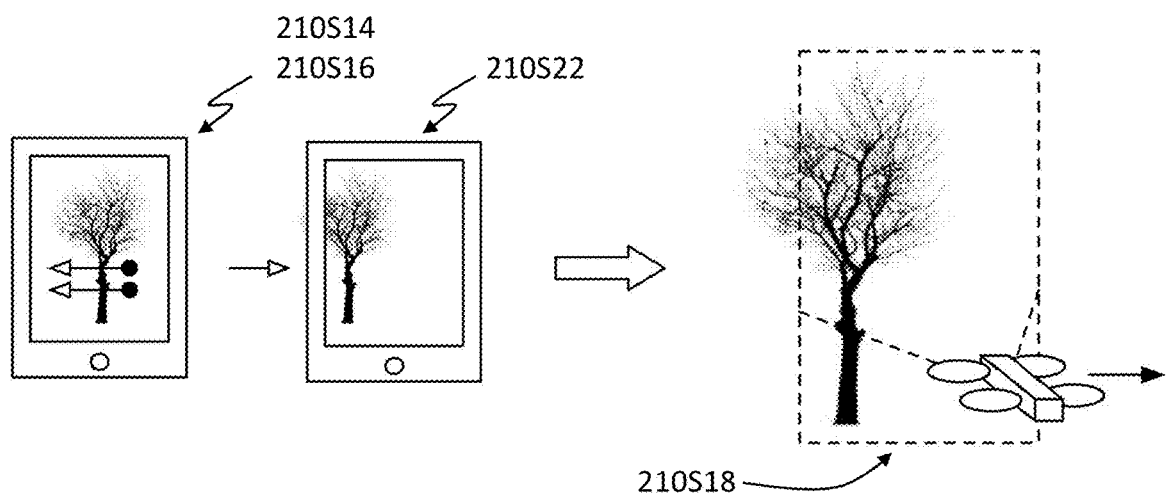
Figure 29:
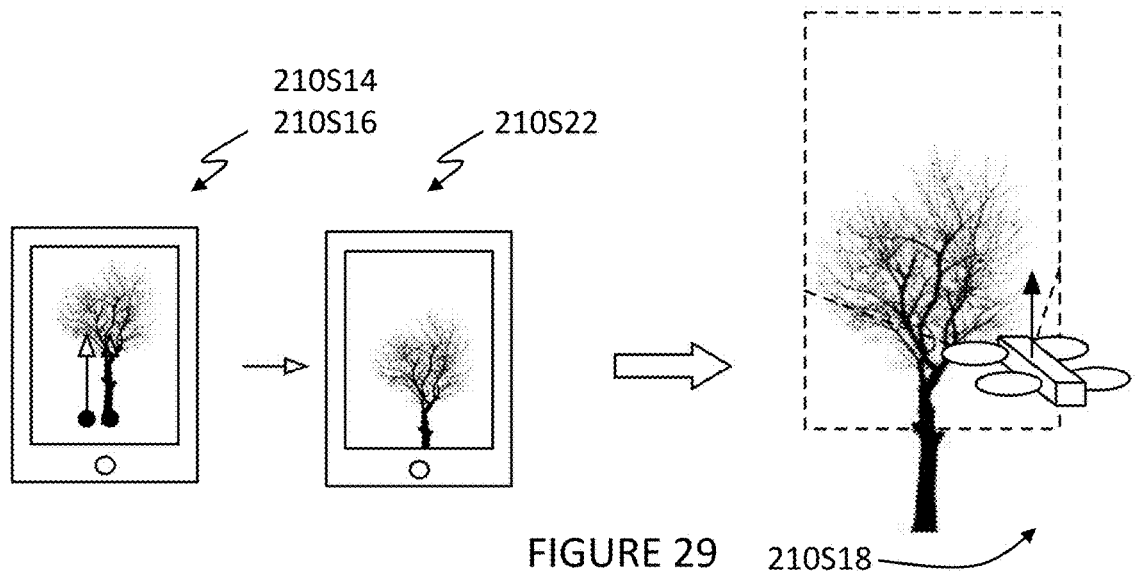
Figure 30:
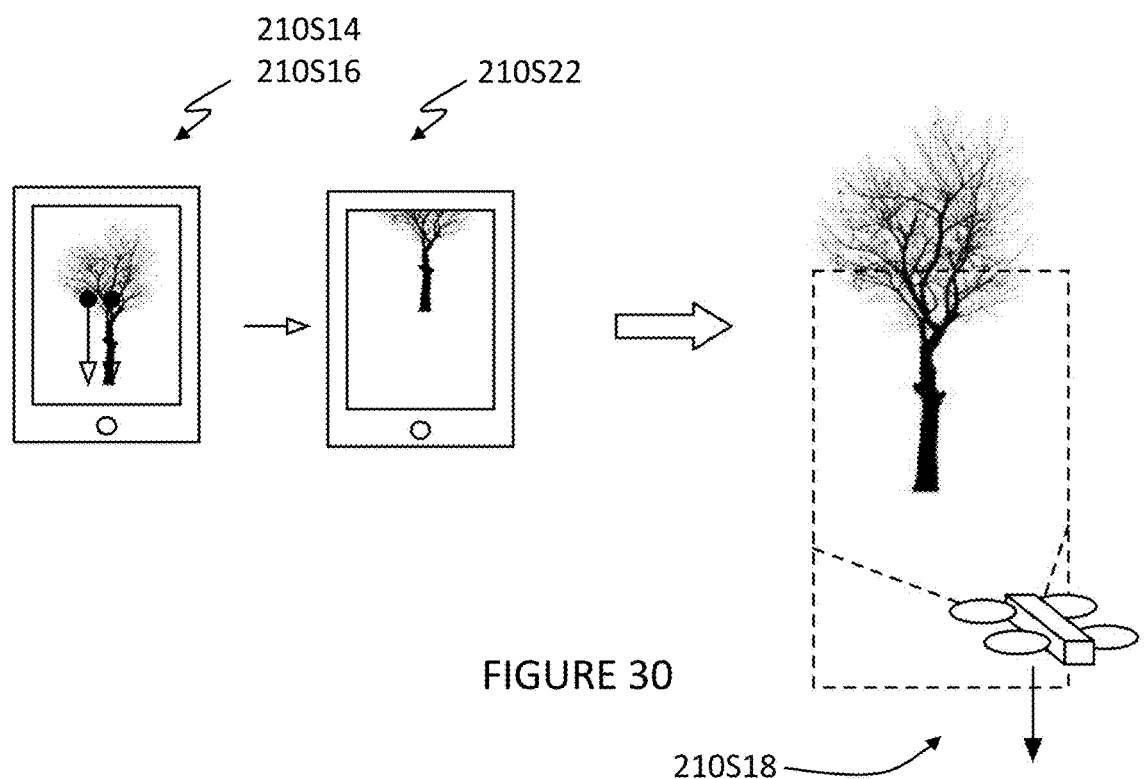
Figure 31:
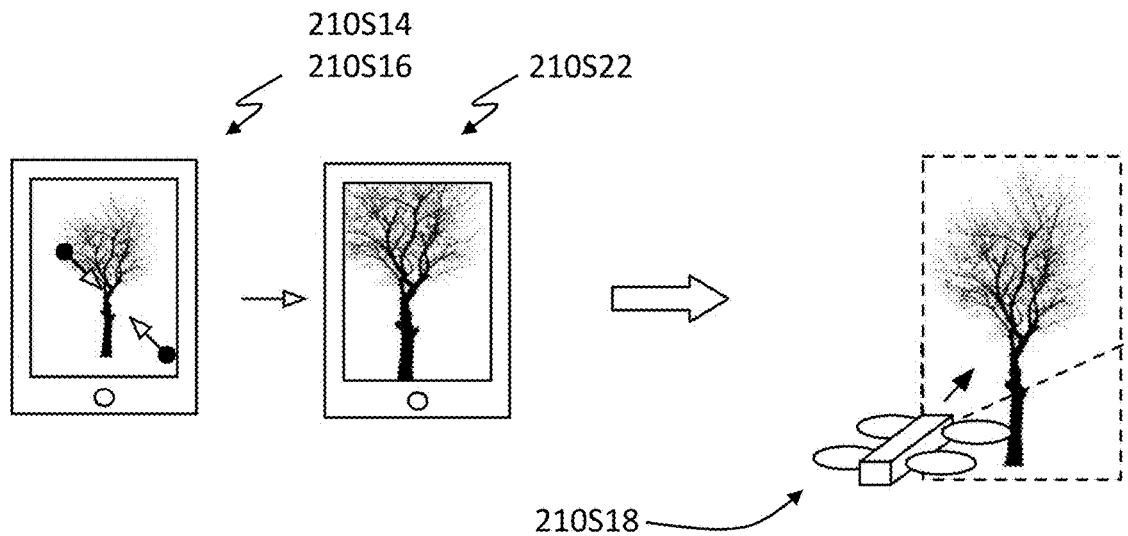
Figure 32:
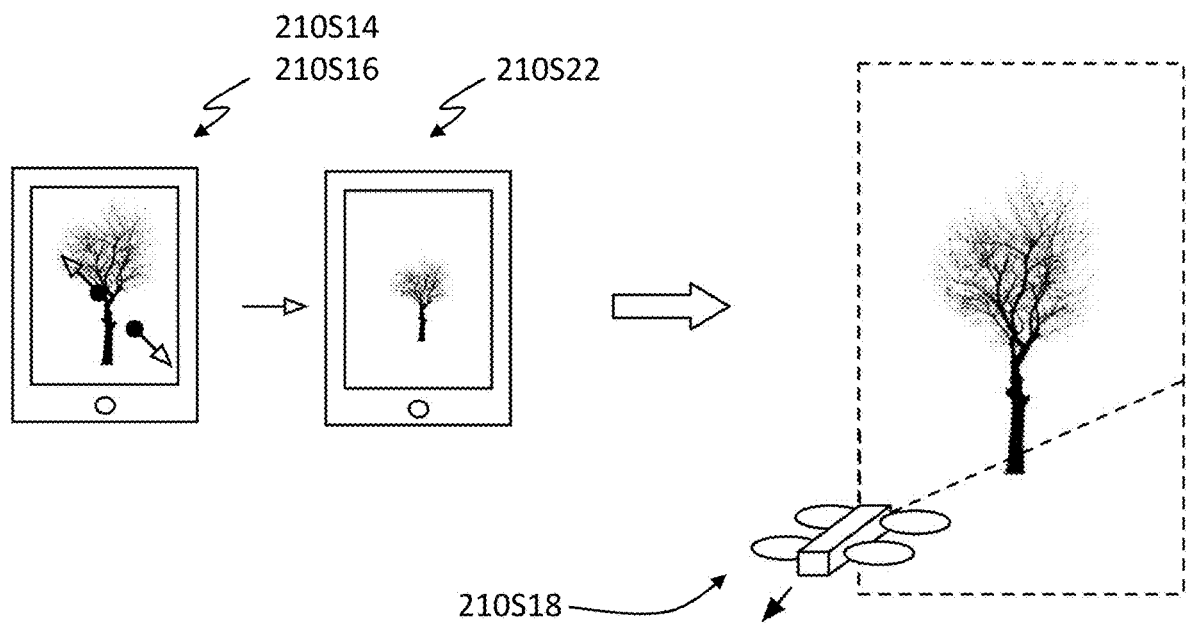
Figure 33:
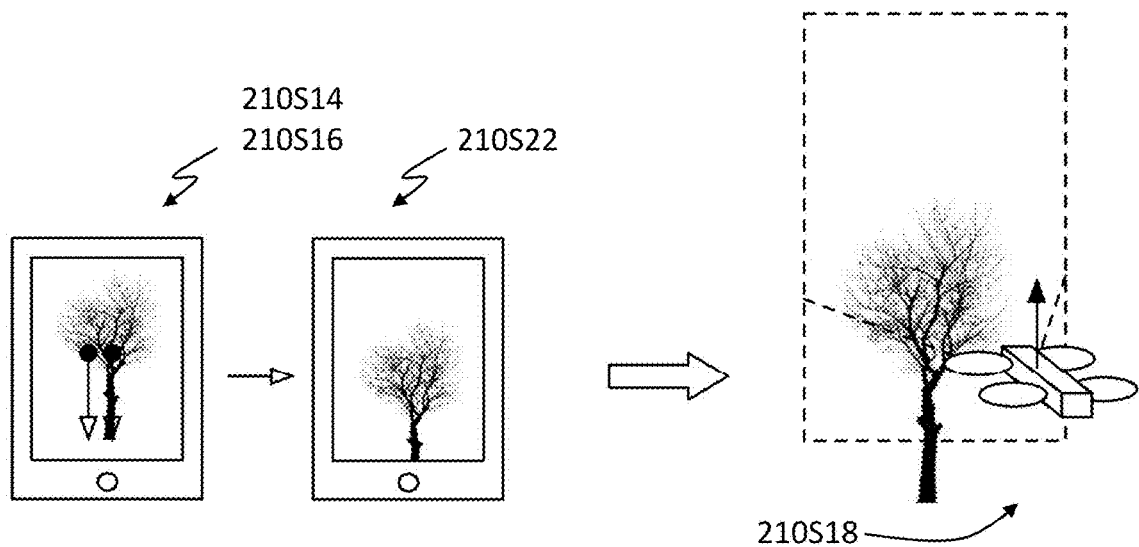
Figure 34:
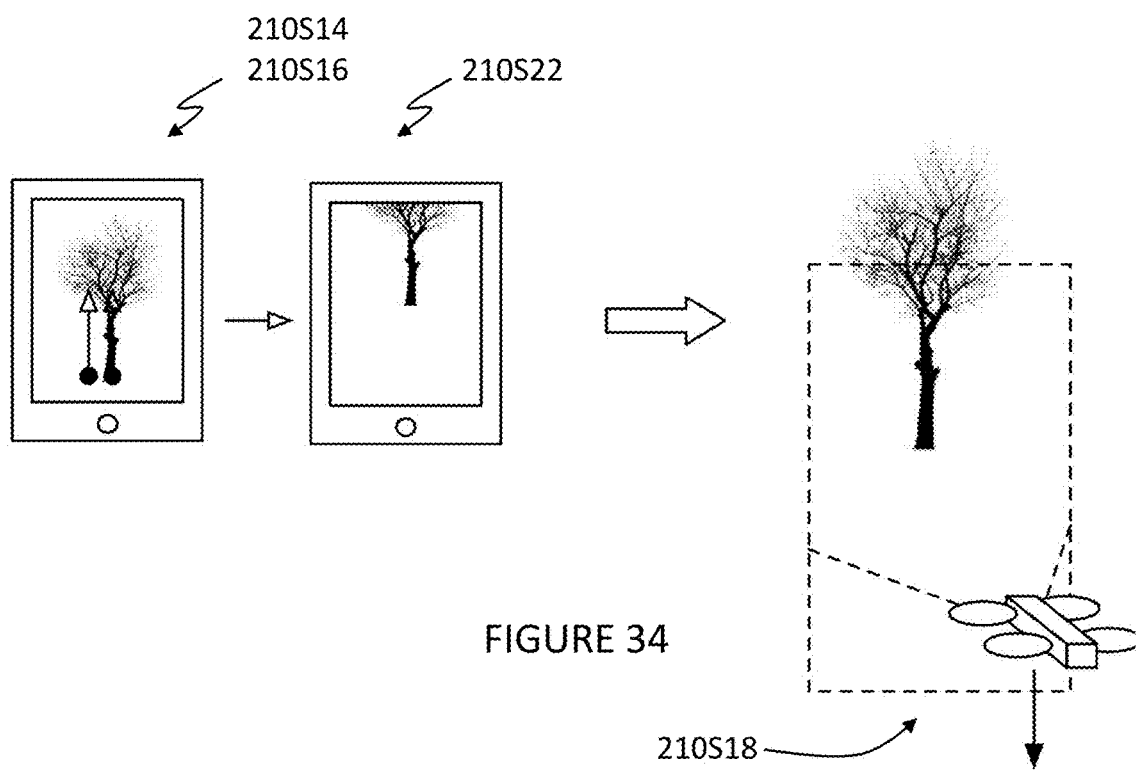
Figure 35:
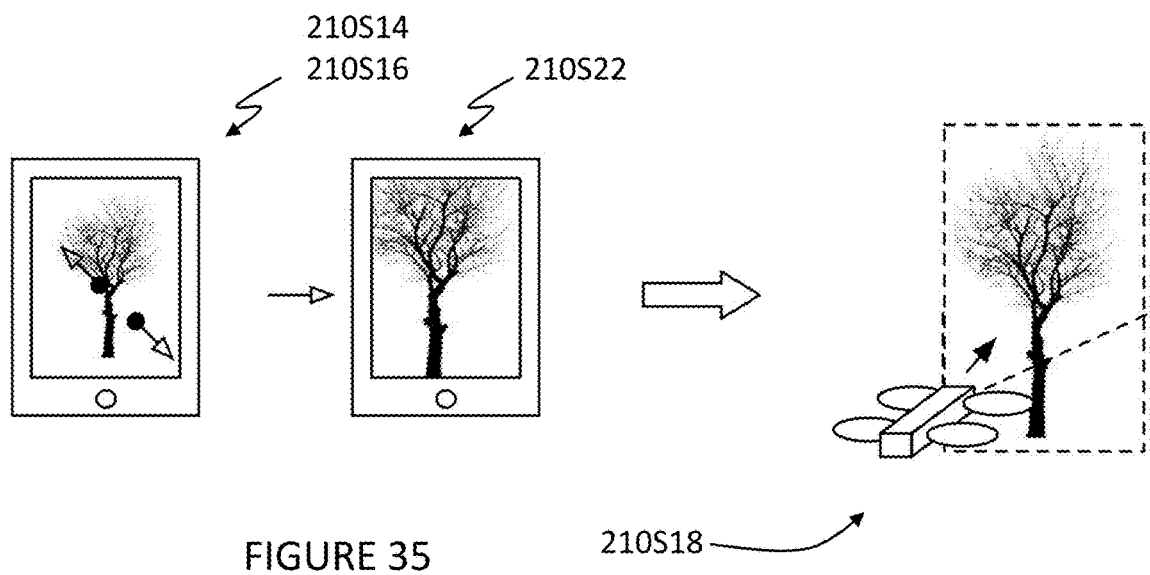
Figure 36:
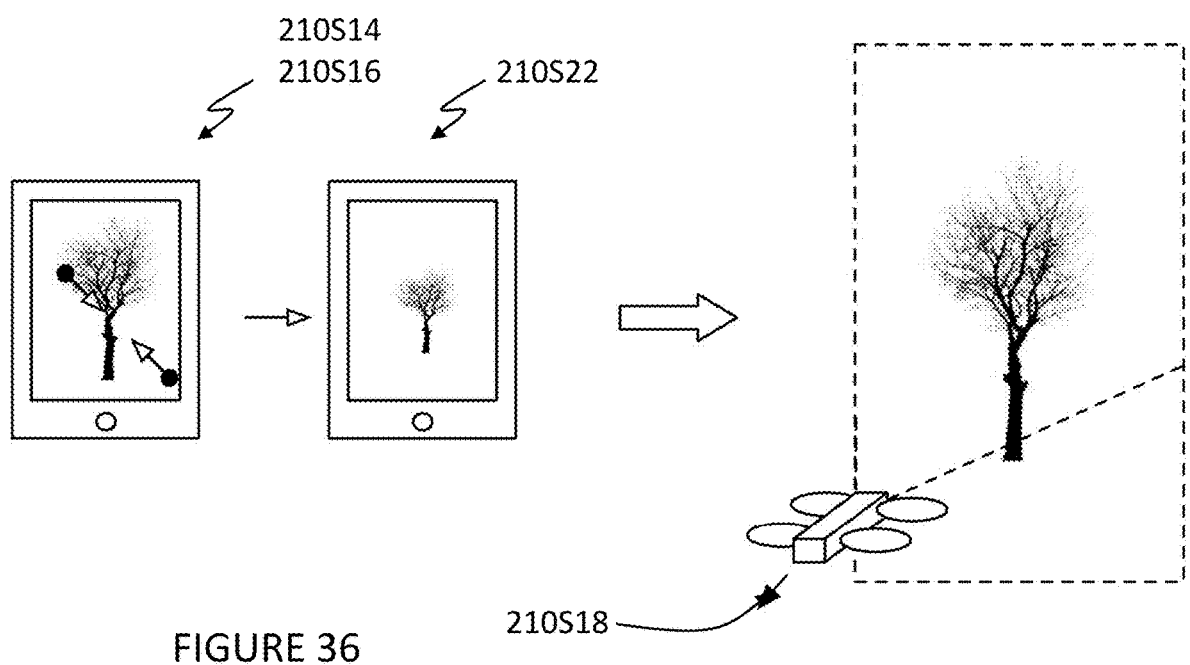
Figure 37:
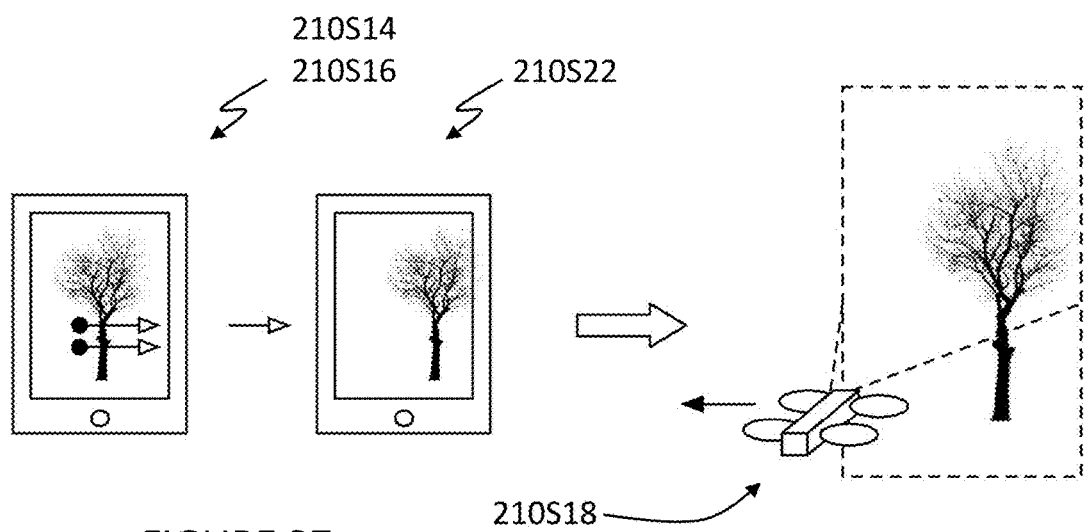
Figure 38:
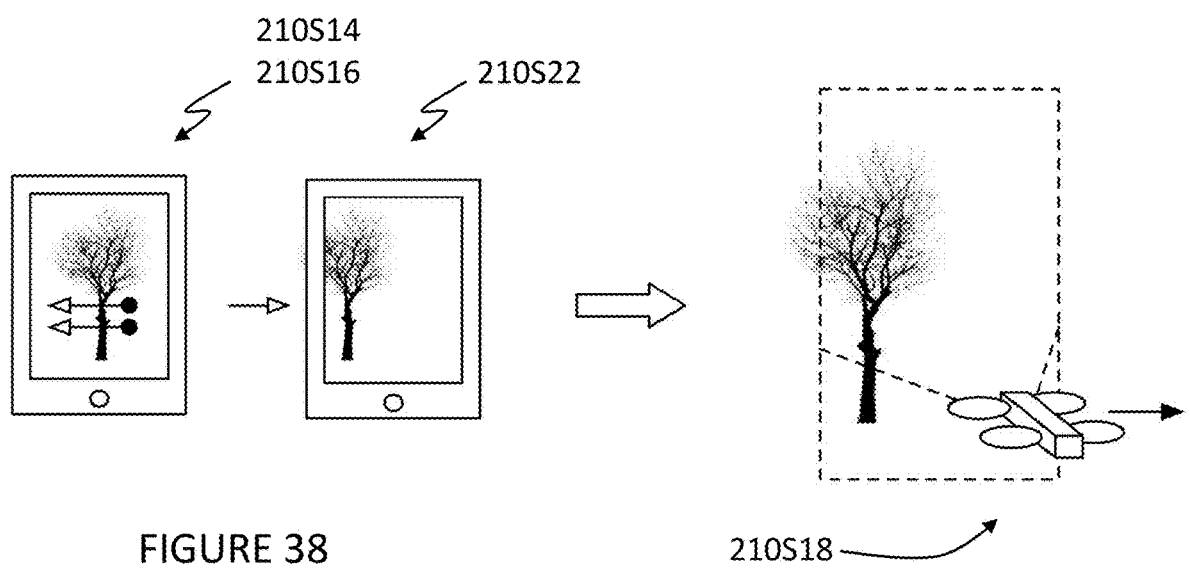
Figure 39:
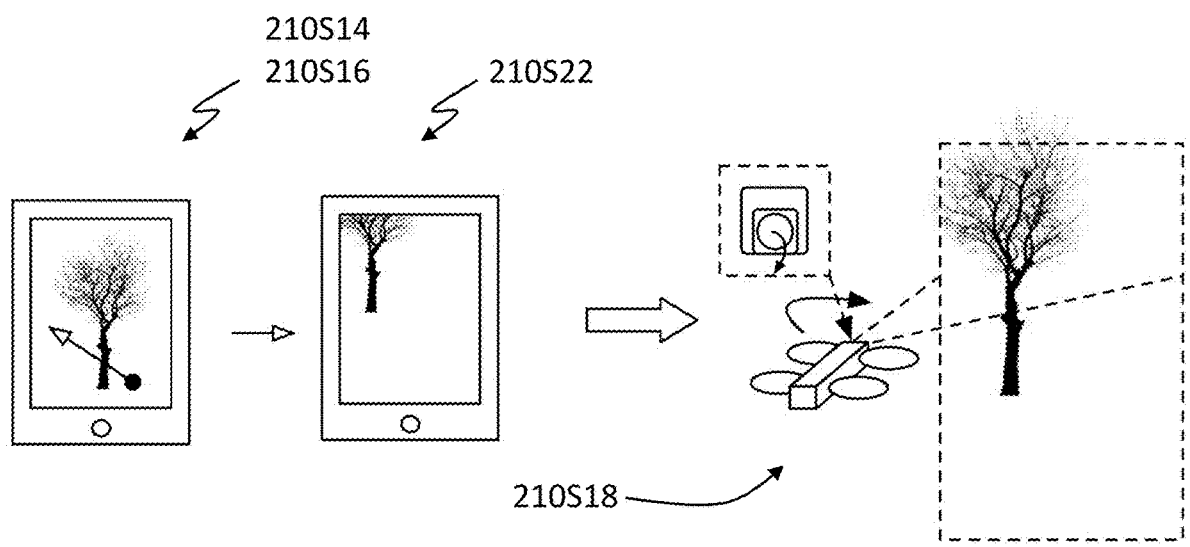
Figure 40:
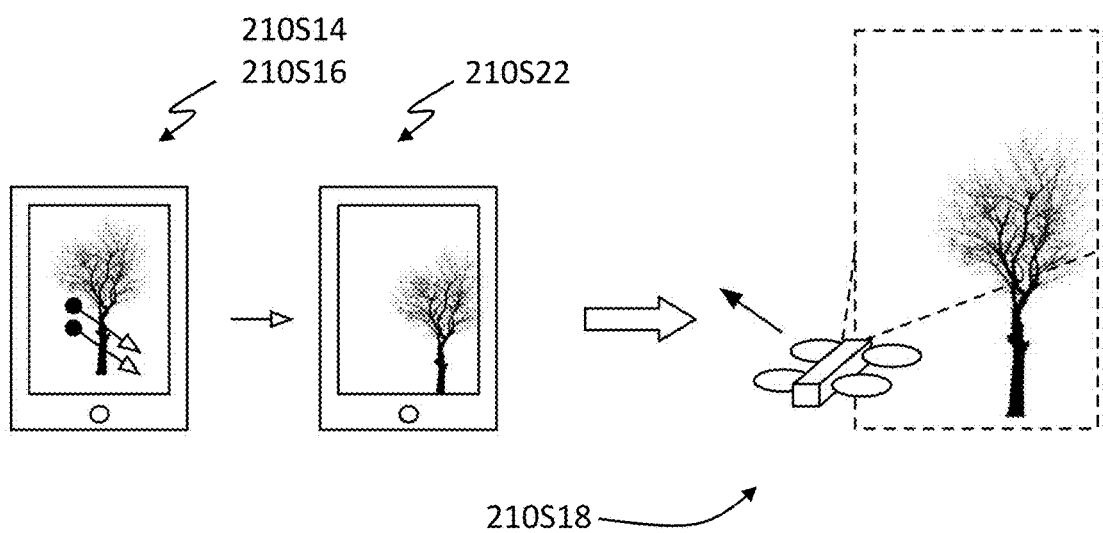
Figure 41:
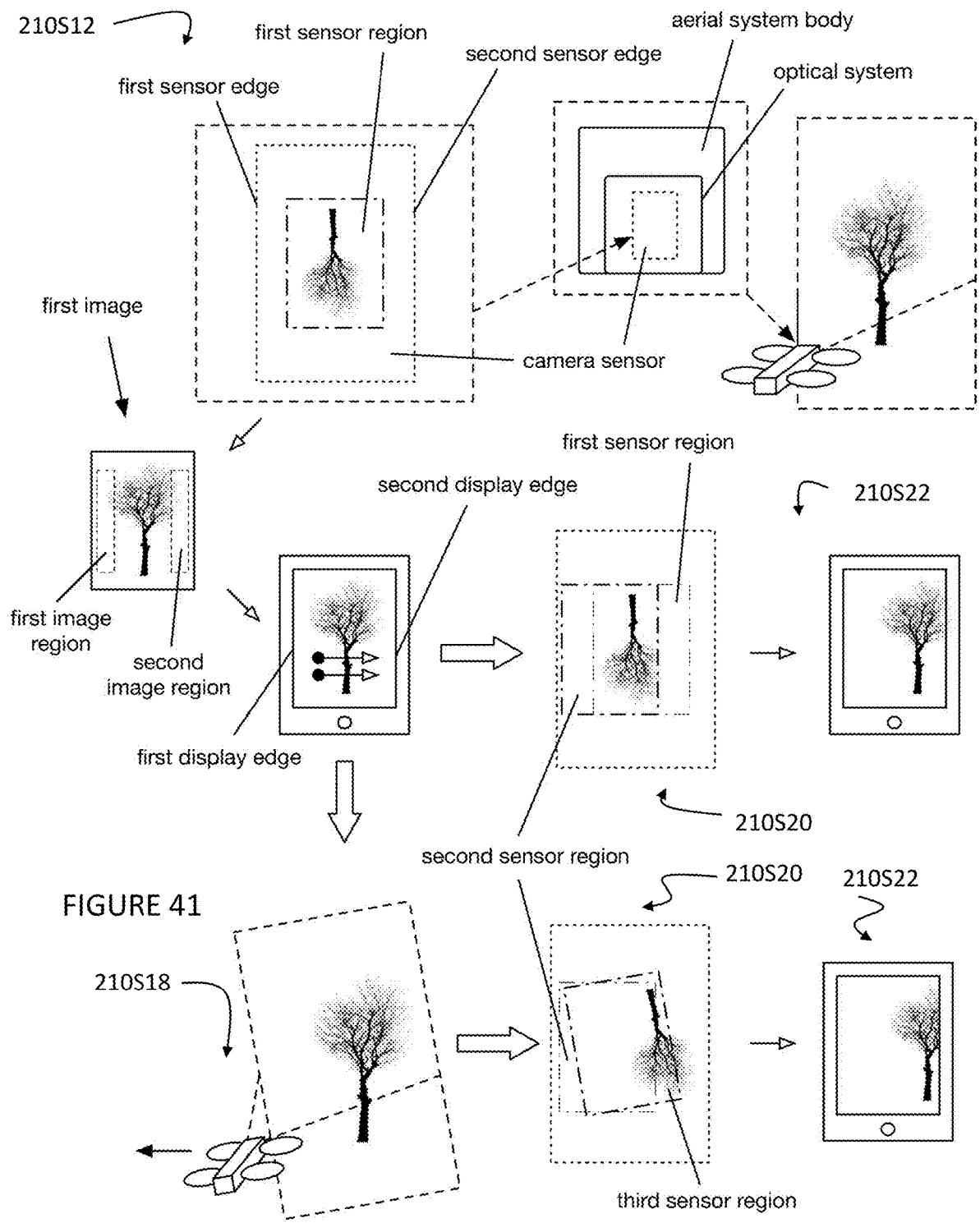
Figure 42:
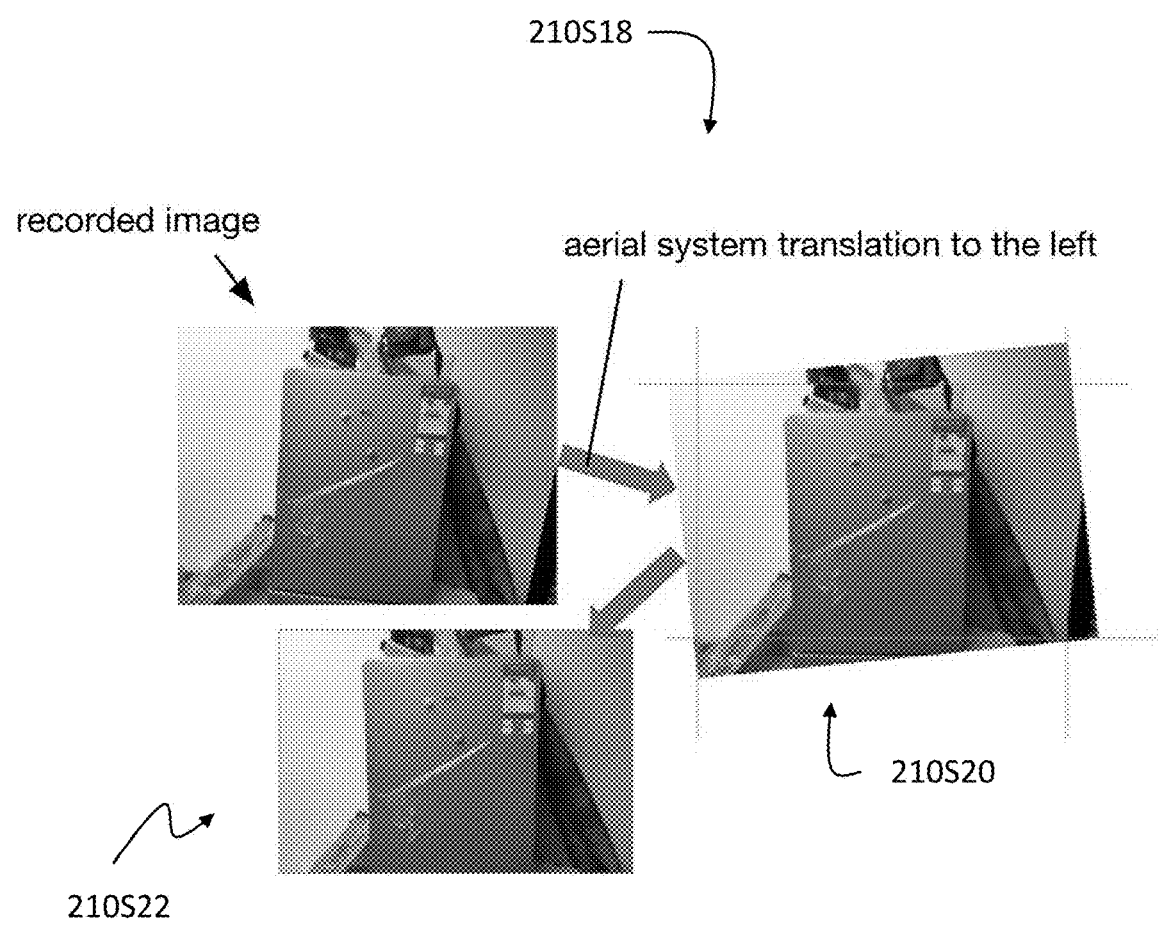
FIG. 42 is a specific example of compensating for aerial system movement.

In one embodiment, regions can be automatically selected to stabilize the video (specific example shown in FIG. 26). In a first example, the region orientation can be selected based on the aerial system orientation (e.g., aerial system body orientation, camera orientation, etc.; orientation relative to a gravity vector, orientation change or rate of change, etc.), which can enable camera tilt compensation. The orientation can be determined based on aerial system sensor readings (e.g., inertial measurement unit readings such as accelerometer and/or gyroscope readings, preferably recorded concurrent with the video capture), based on image analysis (e.g., analysis of frames of the video, of other images captured by an aerial system camera, of images captured of the aerial system, etc.), based on user input (e.g., image rotation request), and/or determined in any other suitable way. For example, the region orientation can be determined based on the aerial system roll angle, yaw angle, pitch angle, translation speed, relative rotor speeds, or based on any other suitable aerial system flight parameter. In a specific example of tilt compensation, a roll angle between an edge of the broad face of the sensor (e.g., active surface edge) and a projection of a gravity vector onto the broad face is determined. In this first specific example, the region orientation and/or change in region orientation relative to another selected region is substantially equal in magnitude to (e.g., within 1° of, within 5° of, within 10° of, etc.) and opposite in direction of the roll angle. However, the region orientation can be otherwise determined based on the roll angle. The region can be selected to maintain a constant size (e.g., scale, resolution, etc.) of an image corresponding to the region, regardless of whether or not the aerial system is rotated, such that the size of a compensated image is indistinguishable from the size of an uncompensated image, but can alternatively can result in different image sizes or be otherwise selected.

The method can include receiving a video, such as a video including an image from the first region, from a camera of the aerial system 12. The video can be received by a processor of the aerial system 12, by a remote computing system (e.g., user device, remote server, etc.), and/or by any other suitable system. The video frames can include only pixels from the first region (e.g., be cropped to the first region), include pixels from both within and outside of the first region, or include pixels from any suitable locations of the image frame. Although a video typically includes many frames per second, a person of skill in the art will understand that the video can be any series of images captured by the camera.

Displaying an image from the first region 210S14 functions to display information relevant to aerial system flight to the user. The method preferably includes sending images (e.g., video frames), recorded by the aerial system 12 (e.g., a camera of the aerial system), to the user device. This can function to stream a video stream from the aerial system 12 to the user device. The aerial system 12 preferably sends the images directly to the user device through a wireless connection (e.g., a BLE connection, WiFi connection, analog RF connection, etc.), but can alternatively send the images indirectly to the user device (e.g., via a remote computing system) or otherwise send the images to the user device. The images (e.g., image frames) can be timestamped, associated with sensor measurements, such as orientation sensor measurements (e.g., concurrently recorded sensor measurements, sensor measurements recorded within a threshold time period, etc.), or associated with any other suitable information.

Figure 25:
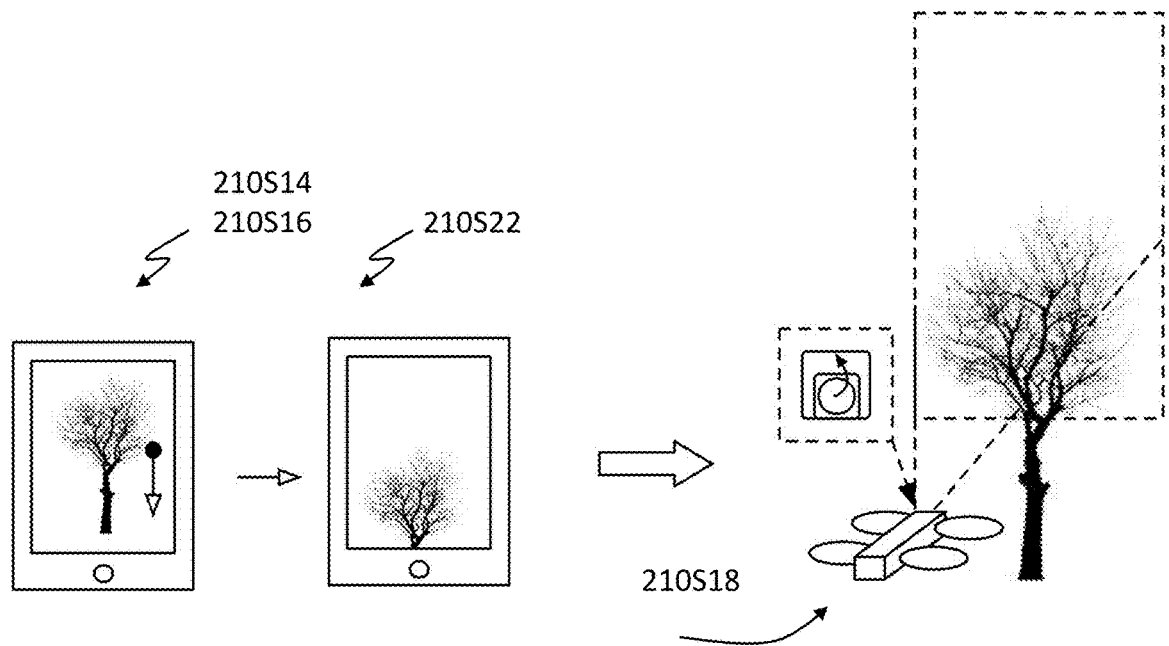

210S14 preferably includes displaying the image(s) in a display area, such as the display area of the user device (example shown in FIG. 6). The display area can be an entire display (e.g., display screen of the user device), a portion of a display, can span all or portions of multiple displays, or can be any other suitable display area. The display is preferably a touch-sensitive display, more preferably having an input area entirely overlapping the display area. In an example, the method includes receiving an image sampled by a first sensor region, wherein the image includes a first image region sampled proximal a first sensor edge and a second image region sampled proximal a second sensor edge opposing the first sensor edge. In this example, 210S14 includes controlling the touch-sensitive display (e.g., of the user device) to display the first image within the entirety of a display area of the touch-sensitive display. Further, in this example, the display area includes a first display edge and a second display edge opposing the first display edge, the first image region is displayed proximal the first display edge, and the second image region is displayed proximal the second display edge (e.g., as shown in FIG. 25).

The image or images are preferably displayed (e.g., the video played) in real- or near-real time (e.g., within a time interval of image capture, such as 1 ms, 10 ms, 20 ms, 50 ms, 1 s, etc.; wherein sending, processing, and displaying the images are performed with minimal delay after image capture). Additionally or alternatively, the image(s) can be displayed after a delay interval (e.g., predetermined delay, delay based on aerial system operation status, etc.) or after any suitable period of time. Video frames are preferably displayed in order and for an amount of time corresponding to the capture frame rate, but alternatively may be displayed in any suitable order and for any suitable period of time. For example, a single image can be displayed for an extended period of time (e.g., throughout performance of the method, 1 min, 10-60 s, 1-30 min, etc.). The images are preferably sent and displayed throughout performance of the method (e.g., continuously throughout, at intervals throughout, etc.), but can additionally or alternatively be sent and/or displayed during a specific interval, at a single time, and/or at any other suitable time.

Receiving a user input 210S16 functions to allow a user 18 to control the aerial system 12. The user input preferably includes a touch input (e.g., drag input, tap input, hold input, etc.), more preferably received by a touch-sensitive display. The user input is preferably received on a video displayed by a user device, which functions to allow a user to interact with the video, wherein the aerial system 12 is automatically controlled to achieve the desired video movement indicated by the user input. The user input is preferably received by the control client 16, more preferably at an input area of the control client 16 (e.g., the input frame, via the input device of the user device), but can alternatively be received by any other suitable input device. The input area is preferably overlaid over, and encompasses substantially the entirety of, the display area of the client and/or user device displaying the video (e.g., wherein the input area is the same size as or larger than the display area; wherein the input area overlaps 90% or more of the display area, etc.), such that the user input can be received at any part of the display area. Alternatively, the input area can be smaller than an overlay a subset of the display area, be larger than an overlay some or all of the display area, be separate from the display area, be adjacent the display area, define virtual joysticks that control different aspects of aerial system control (e.g., separate from or overlapping the display area), or otherwise defined.

The user input is preferably received during image or video display. Accordingly, the user input (e.g., drag input) can be received within a display area concurrent with the display of the image from the first region in the display area. In one example, in which 210S14 includes controlling the touch-sensitive display of the user device to display the first region of video, 210S16 includes receiving a drag input including a translation vector (e.g., from start point to end point, from start point to intermediate hold point, from first to second hold point, from first to second extremum, etc.) from the touch-sensitive display. In this example, the first region of a video (e.g., selected in 210S12) is displayed throughout a time interval, and the drag input is preferably received during the time interval. The translation vector can define a horizontal component parallel to a horizontal edge of the touch-sensitive display, a vertical component parallel to a vertical edge of the touch-sensitive display (and/or perpendicular to the horizontal edge), and/or any other component aligned along any suitable axis (e.g.; axis along an input plane, such as a diagonal axis; axis at an angle to the input plane; etc.).

Additionally or alternatively, the user input can include user device manipulation (e.g., tilting, translating, rotating, etc.), mechanical control input (e.g., joystick, button, switch, slider, etc.), audio input (e.g., voice command, clapping input, audio location input, etc.), optical input (e.g., light signal, input discerned by image recognition, eye-tracking input, etc.), mental input (e.g., based on EEG signals), and/or any other suitable input, and can be received in any suitable way at any suitable time. The aforementioned inputs can be determined by the user device sensors, external sensors monitoring the user device, or determined by any other suitable system.

Changing a position of the aerial system 210S18 functions to effect aerial system control. Changing the position 210S18 is preferably based on the user input, and can include generating operation instructions for the aerial system 12 to adjust the camera angle based on the user input, which functions to interpret a desired video movement into control instructions for the aerial system 12 to achieve the desired video movement (e.g., change in viewpoint, perspective, etc.).

The operation instructions are preferably generated by the control client 16 (e.g., by the user device running the control client 16), but can alternatively be generated by the aerial system 12 (e.g., wherein the user inputs and/or control instruction intermediaries are sent to the aerial system 12), a remote computing system (e.g., wherein the user inputs and/or control instruction intermediaries are sent to the aerial system 12), or any other suitable computing system. The operation instructions can be target aerial system operation parameters (e.g., 5 degrees to the right, 2 meters up, etc.), aerial system control instructions (e.g., voltages for an aerial system component, etc.), or be any other suitable set of instructions. In a first variation, the user device: converts the user inputs into control instructions and sends the control instructions to the aerial system 12, wherein the aerial system operates based on the control instructions. In a second variation, the user device converts the user input into target operation parameters and sends the target operation parameters to the aerial system 12, wherein the aerial system converts the target operation parameters into control instructions and automatically operates based on the control instructions. In a third variation, the user device sends the user inputs to the aerial system 12, wherein the aerial system converts the user inputs into control instructions and automatically operates based on the control instructions. However, the operation instructions can be otherwise generated.

Generating the operation instructions can include interpreting the user input based on a set of predetermined relationships between the user input parameters and aerial system actions. User input parameters can include: the number of concurrent, discrete inputs (e.g., touches); the duration of each continuous input; the distance of each continuous input; the location of each input (e.g., the touch coordinates for each touch, beginning coordinates, end coordinates, etc.); or any other suitable parameter. Aerial system actions can include: actuating the optical system, yawing the aerial system 12 (e.g., about a transverse aerial system axis intersecting the optical system, about a central transverse axis, about an axis parallel the transverse aerial system axis and intersecting a target object, etc.), rolling the aerial system 12 (e.g., about the longitudinal axis, about an axis normal to the camera sensor), pitching the aerial system 12 (e.g., about the lateral axis), translating the aerial system vertically (e.g., adjusting the aerial system height relative to a ground plane), translating the aerial system horizontally (e.g., adjusting the lateral relationship between the aerial system 12 and a target object, moving the aerial system closer to or farther from the target object, etc.), or otherwise actuating the aerial system 12. User inputs can include touch inputs, remote device manipulation (e.g., tilting, translating, etc.), or any other suitable input. In a specific example, a single concurrent touch (e.g., single-finger drag, etc.) is mapped to aerial system and/or optical system rotation, while multiple concurrent touches (e.g., multi-finger drag, pinch, etc.) are mapped to aerial system translation.

The operation instructions generated based on a user input are preferably independent from the region of the display area in which the user input is received (e.g., such that similar user inputs received at different locations within the display area have similar effects). In one example, in which a first drag input is received at a first region of a display area of a touch-sensitive display and defines a first horizontal component parallel to a horizontal edge of the touch-sensitive display, 210S18 includes rotating the aerial system 12 in a first direction about a yaw axis, based on the first horizontal component. In this example, the method can further include receiving a second drag input from the touch-sensitive display (e.g., wherein the touch-sensitive display received the second drag input at a second region of the display area non-overlapping with the first region of the display area), wherein the second drag input includes a second translation vector codirectional with the translation vector of the first drag input, the second translation vector defining a second horizontal component codirectional with the horizontal component. In this example, the method can further include rotating the aerial system 12 in the first direction about the yaw axis again, based on the second horizontal component. However, the region of the display area in which a user input is received can alternatively affect the operation instructions generated based on that user input (e.g., a drag input in a 'yaw' region can control aerial system yaw, while a similar drag input in a 'translation' region can control aerial system translation).

The duration, distance, speed, and/or acceleration of aerial system action (e.g., rotation speed, translation speed, etc.) can be related to: the temporal duration of continuous user input, the distance or length of continuous user input, the speed and/or acceleration of the user input position change or any other suitable user input parameter. The duration, distance, speed, and/or acceleration of aerial system action can be: proportional to the user input parameter, inversely proportional to the user input parameter, a monotonic function of the user input parameter (e.g., increase monotonically or strictly monotonically with the user input parameter, decrease monotonically or strictly monotonically with the user input parameter), or be otherwise related. For example, 210S18 can include rotating the aerial system 12 based on a value of a rotation parameter, wherein the value is a monotonically increasing function of a magnitude of an aspect of a user input (e.g., component of a drag vector, such as vertical or horizontal component). In a specific example, the rotation parameter is the aerial system rotation speed. The value of aerial system parameter change mapped to the user input parameter can be: constant, proportionally scaled with the aerial system parameter value or different aerial system parameter value (e.g., distance from the remote device), inversely scaled with aerial system parameter value, or otherwise related. In one example, the same linear user input can be mapped to a first translation distance when the aerial system is beyond a threshold distance away from the remote device, and mapped to a second translation distance when the aerial system 12 is within a threshold distance away from the remote device, wherein the first translation distance is larger than the second translation distance.

In a first variation, the user inputs are indicative of field of view rotations (e.g., turn left, turn right, turn up, turn down), wherein the rotation inputs are mapped to a blend of optical system and aerial system rotation actions. The aerial system 12 is preferably translated in the opposing direction as the rotation input arcuate direction, but can alternatively be translated in the same direction.

A first embodiment of the first variation includes rotating the aerial system about a yaw axis based on the horizontal component (specific examples shown in FIGS. 7-8). In this embodiment, a user input to rotate the field of view to the left (e.g., move the camera FOV to the left; move the video perspective to the left; change the horizontal perspective to the left but not the vertical perspective; etc.) is mapped to control instructions to yaw the aerial system counterclockwise (e.g., positive yaw; counterclockwise as viewed from above relative to a gravity vector, aerial system top, camera top, etc.) about a yaw axis, and/or a user input to rotate the field of view to the right (e.g., move the camera FOV to the right; move the video perspective to the right; change the horizontal perspective to the right but not the vertical perspective; etc.) is mapped to control instructions to yaw the aerial system clockwise (e.g., negative yaw; clockwise as viewed from above relative to a gravity vector, aerial system top, camera top, etc.) about a yaw axis (e.g., same or different yaw axis). The yaw axis can intersect the aerial system or be external the aerial system 12. When the yaw axis is external the aerial system 12, the system generating the control instructions can automatically: determine the target object distance from the aerial system 12, determine the yaw axis location relative to the aerial system 12 based on the target object distance, and determine the control instructions based on the yaw axis location (e.g., transform or shift the control instructions accordingly). Alternatively, the yaw axis distance from the aerial system 12 can be substantially constant, wherein the aerial system yaws along the same arc angle, irrespective of the target object distance from the aerial system 12. However, the left and/or right rotation user input can be otherwise mapped.

The left rotation user input can include: a single-touch hold (e.g., temporally continuous signal) and drag (e.g., a series of temporally continuous signals, each (or substantially all of, a majority of, etc.) temporally successive signal further along a positive x-axis than the last signal, etc.) to the right of the display area and/or input area (e.g., toward a right vertical edge of the display); a touch, hold, and drag to the left of the display area and/or input area; a single-touch hold on the left of the display area and/or input area; a series of consecutive taps on the left of the display area and/or input area; a series of consecutive taps on the right of the display area; user device roll counterclockwise (e.g., as determined by the user device orientation sensor); or include any other suitable input pattern with any other suitable set of parameters. For example, the left rotation user input can include a translation vector that defines a horizontal component that points right, and in response, the aerial system 12 can rotate about a yaw axis counterclockwise as viewed from above (e.g., relative to a gravity vector, etc.).

The right rotation user input can include: a single-touch hold and drag (e.g., a series of temporally continuous signals, each (or substantially all of, a majority of, etc.) temporally successive signal further along a negative x-axis than the last signal, etc.) to the left of the display area and/or input area (e.g., toward a left vertical edge of the display); a touch, hold, and drag to the right of the display area and/or input area; a single-touch hold on the right of the display area and/or input area; a series of consecutive taps on the right of the display area and/or input area; a series of consecutive taps on the left of the display area; user device roll clockwise (e.g., as determined by the user device orientation sensor); or include any other suitable input pattern with any other suitable set of parameters. For example, the right rotation user input can include a translation vector that defines a horizontal component that points left, and in response, the aerial system 12 can rotate about a yaw axis clockwise as viewed from above (e.g., relative to a gravity vector, etc.).

In a second embodiment of the first variation (specific examples shown in FIGS. 9-10), the aerial system 12 includes a gimbal system (e.g., single-axis gimbal system) rotatably mounting the optical sensor 36 to the body 20. For example, the optical sensor 36 (e.g., camera) can be rotatable about a gimbal axis, wherein the gimbal axis is substantially (e.g., within 1°, within 5°, within 10°, etc.) perpendicular the yaw axis and/or roll axis, and/or substantially (e.g., within 1°, within 5°, within 10°, etc.) parallel the optical sensor active surface (e.g., camera sensor). The optical system angular position and/or gimbal position can be determined based on: user inputs, desired scene changes, the aerial system pitch angle (e.g., wherein the optical system angular position can be dynamically changed to counteract changes in the sampled scene due to aerial system pitch), or otherwise determined. In one example, a user input to rotate the field of view upward (e.g., move the camera FOV upward; move the video perspective to upward; change the vertical perspective upwards but not the horizontal perspective; etc.) is mapped to control instructions to control instructions to pitch the optical sensor upward about the gimbal axis, and/or a user input to rotate the field of view downward (e.g., move the camera FOV downward; move the video perspective downward; change the vertical perspective downwards but not the horizontal perspective; etc.) is mapped to control instructions to pitch the optical sensor downward about the gimbal axis.

The upward rotation user input can include: a single-touch hold and drag (e.g., a series of temporally continuous signals, each (or substantially all of, a majority of, etc.) temporally successive signal further along a negative y-axis than the last signal, etc.) to the bottom of the display area and/or input area (e.g., toward a lower horizontal edge of the display); a touch, hold, and drag to the top of the display area and/or input area; a single-touch hold on the top of the display area and/or input area; a series of consecutive taps on the top of the display area and/or input area; a series of consecutive taps on the bottom of the display area; user device pitch forward (e.g., as determined by the user device orientation sensor); or include any other suitable input pattern with any other suitable set of parameters. For example, the upward rotation user input can include a translation vector that defines a vertical component (e.g., perpendicular to the horizontal edge of the display) that points down, and in response, the camera can rotate upward about the gimbal axis based on the vertical component.

The downward rotation user input can include: a single-touch hold and drag (e.g., a series of temporally continuous signals, each (or substantially all of, a majority of, etc.) temporally successive signal further along a positive y-axis than the last signal, etc.) to the top of the display area and/or input area (e.g., toward an upper horizontal edge of the display); a touch, hold, and drag to the bottom of the display area and/or input area; a single-touch hold on the bottom of the display area and/or input area; a series of consecutive taps on the bottom of the display area and/or input area; a series of consecutive taps on the top of the display area; user device pitch backward, toward the user (e.g., as determined by the user device orientation sensor); or include any other suitable input pattern with any other suitable set of parameters. For example, the downward rotation user input can include a translation vector that defines a vertical component (e.g., perpendicular to the horizontal edge of the display) that points up, and in response, the camera can rotate downward about the gimbal axis based on the vertical component.

In a third embodiment of the first variation, a user input to rotate the field of view upward (e.g., move the camera FOV upward; move the video perspective to upward; change the vertical perspective upwards but not the horizontal perspective; etc.) is mapped to control instructions to pitch the optical system upward about a rotational axis, and/or a user input to rotate the field of view downward (e.g., move the camera FOV downward; move the video perspective downward; change the vertical perspective downwards but not the horizontal perspective; etc.) is mapped to control instructions to pitch the optical system downward about a rotational axis. Alternatively, the upward rotation user input can be mapped to pitch the aerial system upward about a pitch axis (e.g., lateral axis, axis parallel the lateral axis, etc.), or be otherwise mapped, and/or the downward rotation user input can be mapped to pitch the aerial system downward about a pitch axis (e.g., lateral axis, axis parallel the lateral axis, etc.), or be otherwise mapped. The upward and/or downward rotation user input can be the same as in the second embodiment, and/or can be any other suitable input.

In a fourth embodiment of the first variation, a user input to rotate the field of view about an axis normal to the field of view can be mapped to control instructions to roll the aerial system about a roll axis (e.g., longitudinal axis, axis parallel the longitudinal axis, etc.), control instructions to rotate the cropped region of the image, or be otherwise mapped. The roll rotation user input can include: a two-touch hold and drag along a substantially arcuate path; a single touch hold and drag along a substantially arcuate path; user device yaw (e.g., as determined by the user device orientation sensor); or any other suitable input pattern with any other suitable set of parameters. The aerial system preferably rolls in the angular direction of the arcuate path, but can alternatively roll in the opposing direction.

In a second variation, the user inputs are indicative of field of view translations (e.g., move left, move right, move up, move down), wherein the translation inputs are mapped to aerial system translation actions. The aerial system is preferably translated in the same direction as the translation input axis, but can alternatively be translated in the opposing direction. The translation user inputs can be different from the rotation user inputs, but can alternatively be substantially similar. In one example of the latter variation, the same input can be mapped to a FOV rotation action until an input threshold is reached, at which point the input is mapped to a FOV translation action. In a specific example, a continuous single-touch hold on the left of the display can rotate the FOV leftward, up to a 180° rotation, at which point the input is remapped to aerial system translation to the left. However, the translation inputs can be otherwise related to the rotation inputs.

Figures 12, 13:
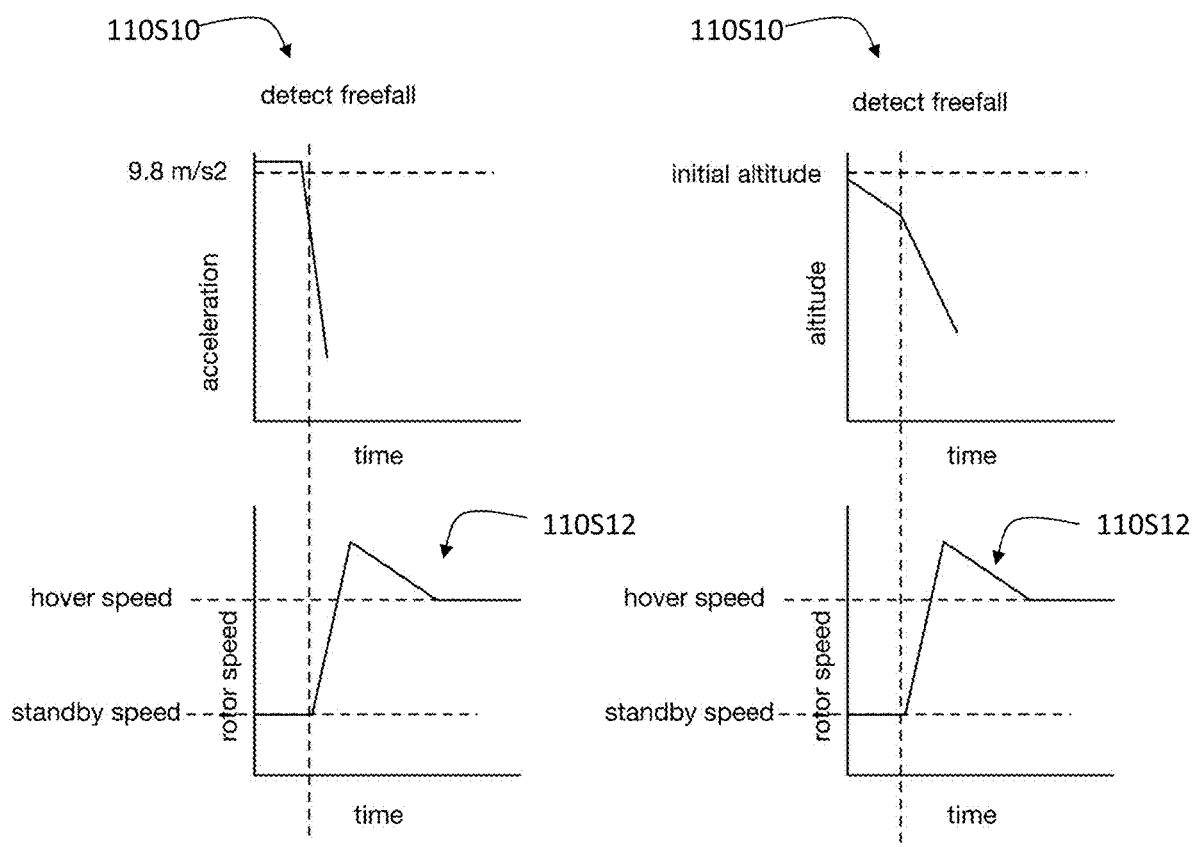
FIGS. 12 and 13 are a first and second specific example of detecting a change in an orientation sensor signal indicative of an imminent operation event and automatically operating the lift mechanisms based on the detected change, respectively.

In a first embodiment of the second variation, a user input to translate the field of view horizontally (e.g., laterally translate the camera FOV; laterally translate the video perspective; translate the horizontal perspective but not change the vertical perspective; etc.) can be mapped to: control instructions to translate the aerial system 12 (e.g., along an x-axis) along a lateral translation axis (e.g., parallel or coincident the central lateral axis of the body 20; perpendicular a gravity vector and parallel the optical sensor active surface; substantially parallel and/or perpendicular these or other references, such as within 1°, 5°, or 10°; etc.), to translate the optical system along the lateral translation axis, or to any other suitable aerial system action. However, the lateral translation user input can be otherwise mapped. The lateral translation user input can include: a two-touch hold and linear lateral drag on the display area and/or input area (e.g., toward a vertical edge of the display); a single-touch hold on one side of the display area and/or input area; a series of consecutive taps on one side of the display area and/or input area; user device roll; or include any other suitable input pattern with any other suitable set of parameters. For example, the lateral translation user input can include a translation vector that defines a horizontal component parallel to a horizontal edge of the display, and in response, the aerial system can translate in a direction substantially parallel (e.g., within 1°, 5°, 10°, etc.) to a broad face of the optical sensor (e.g., camera sensor active surface), based on the horizontal component. In a first specific example (e.g., as shown in FIGS. 11 and 21), the horizontal component points right and the aerial system translates left. In a second specific example (e.g., as shown in FIGS. 12 and 22), the horizontal component points left and the aerial system translates right. However, the translation directions can be reversed, or the input can be mapped to any other suitable translation.

In a second embodiment of the second variation (specific examples shown in FIGS. 13, 14, 17, and 18), a user input to translate the field of view vertically (e.g. vertically translate the camera FOV; vertically translate the video perspective; translate the vertical perspective but not change the horizontal perspective; etc.) can be mapped to: control instructions to translate the aerial system (e.g., along an y-axis) along a vertical translation axis (e.g., parallel or coincident the central vertical axis of the body, parallel or coincident the aerial system yaw axis, parallel a gravity vector, substantially parallel and/or perpendicular these or other references, such as within 1°, 5°, or 10°, etc.), to translate the optical system along the vertical translation axis, or to any other suitable aerial system action. However, the vertical translation user input can be otherwise mapped. The vertical translation user input can include: a two-touch hold and linear longitudinal drag on the display area and/or input area (e.g., along a y-axis of the display area or input area); a single-touch hold on one end of the display area and/or input area (e.g., top end, bottom end); a series of consecutive taps on one end of the display area and/or input area; user device pitch; or include any other suitable input pattern with any other suitable set of parameters.

In a third variation, the user inputs are indicative of image scale adjustments, wherein the image scale user inputs are mapped to aerial system translation actions. The aerial system preferably moves away from the target object (e.g., away from the object currently within the FOV; against a normal vector of the active face of the camera; etc.) in response to a zoom out user input, and moves closer to the target object (e.g., toward the object currently within the FOV; along a normal vector of the active face of the camera; etc.) in response to a zoom in user input; specific examples shown in FIGS. 15 and 16. Additionally or alternatively, the user input can be mapped to a blend of optical system zoom and aerial system translation. In one example, in response to receipt of a zoom in user input, the aerial system moves toward the target object up to a threshold distance away from the target object. Upon achieving the threshold distance and receiving further inputs indicative of zooming in, the inputs can be automatically remapped to zooming in the camera (e.g., through digital zoom). When a zoom out user input is received, the camera is zoomed out until the maximum camera focal length is achieved, at which point the user input is remapped to aerial system translation (e.g., translation away from the target object). The threshold distance can be predetermined, set by the user 18 (e.g., entered into the control client 16), or otherwise determined. The image scale user input can include: a pinching movement (e.g., two-touch moving toward each other), indicative of zooming in; an expanding movement (e.g., two-touch moving away from each other), indicative of zooming out; a sliding movement (e.g., sliding up, indicative of zooming in; sliding down, indicative of zooming out, etc.); or any other suitable user input.

In a fourth variation, the user inputs are indicative of image scale adjustments, wherein the image scale user inputs are mapped to aerial system translation actions. The aerial system preferably moves away from the target object (e.g., away from the object currently within the FOV; against a normal vector of the active face of the camera; etc.) in response to a zoom out user input, and moves closer to the target object (e.g., toward the object currently within the FOV; along a normal vector of the active face of the camera; etc.) in response to a zoom in user input; specific examples shown in FIGS. 19 and 20. Additionally or alternatively, the user input can be mapped to a blend of optical system zoom and aerial system translation. In one example, in response to receipt of a zoom in user input, the aerial system moves toward the target object up to a threshold distance away from the target object. Upon achieving the threshold distance and receiving further inputs indicative of zooming in, the inputs can be automatically remapped to zooming in the camera (e.g., through digital zoom). When a zoom out user input is received, the camera is zoomed out until the maximum camera focal length is achieved, at which point the user input is remapped to aerial system translation (e.g., translation away from the target object). The threshold distance can be predetermined, set by the user (e.g., entered into the control client 16), or otherwise determined. The image scale user input can include: a pinching movement (e.g., two-touch moving toward each other), indicative of zooming out; an expanding movement (e.g., two-touch moving away from each other), indicative of zooming in; a sliding movement (e.g., sliding up, indicative of zooming out; sliding down, indicative of zooming in, etc.); or any other suitable user input.

Figure 23:
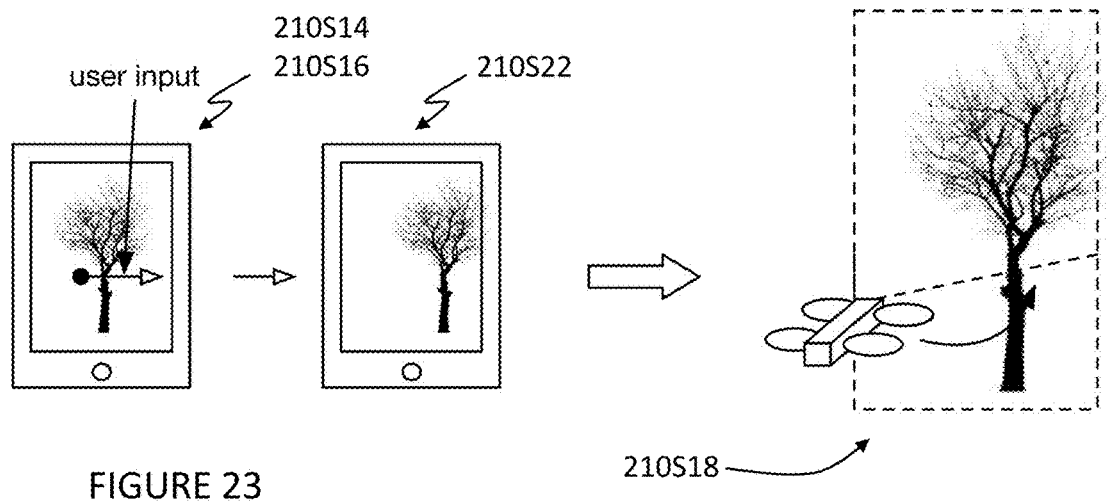
FIGS. 23-41 are specific examples of different user input and the respective mapped aerial system actions.
Figure 24:
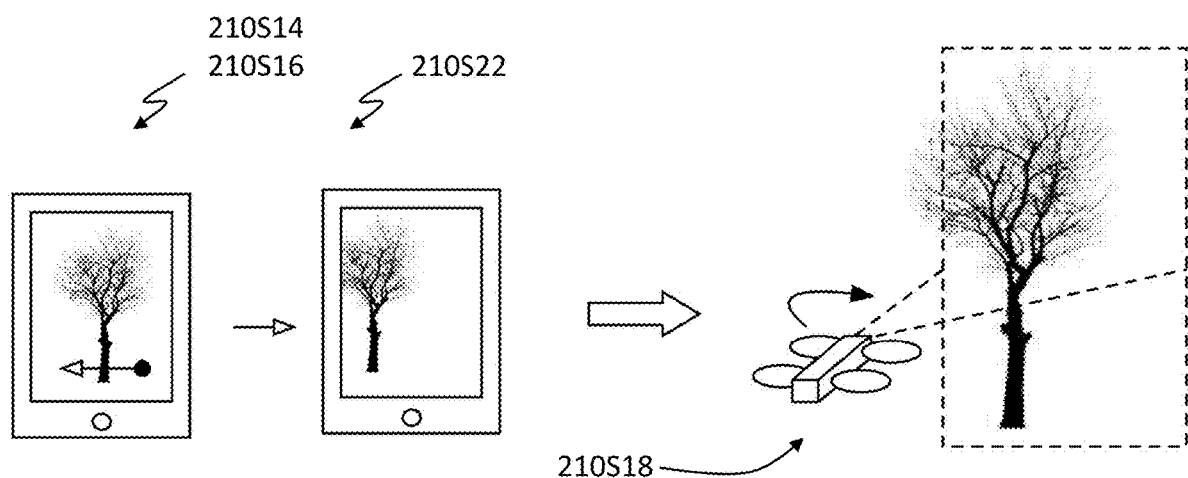

210S18 can include mapping a user input to multiple aerial system movements (e.g., as shown in FIGS. 23 and 24). For example, based on a user input corresponding to multiple directional components (e.g., orthogonal components such as a horizontal component and a vertical component), the aerial system 12 can perform a movement corresponding to each directional component. In a first specific example, a one-finger diagonal drag input pointing up and to the right is mapped to both a positive aerial system yaw and a downward camera rotation about a gimbal axis. In a second specific example, a two-finger diagonal drag input pointing down and to the right is mapped to an aerial system translation up and to the left. However, the user input can be otherwise mapped to multiple directional commands. In a specific example, a leftward expanding movement (e.g., wherein both finger contact points move left while moving away from each other, wherein the midpoint between the finger contact points moves left, etc.) is mapped to an aerial system translation both rightward and toward the target object.

The aerial system can perform the movements concurrently, at overlapping times, consecutively, in alternating steps (e.g., performing a first step of a yaw movement, then a first step of an elevation increase movement, then a second step of the yaw movement, and then a second step of the elevation increase movement), or with any other suitable timing. Additionally or alternatively, a user input can be mapped to a single aerial system movement (e.g., a predominantly horizontal user input being mapped only to a horizontal aerial system movement, such as yaw or horizontal translation; a predominantly vertical user input being mapped only to a vertical aerial system movement, such as aerial system or camera pitch or vertical translation), or can be interpreted in any other suitable way.

Additionally or alternatively, some or all of the user inputs can be determined based on remote control (e.g., user device) position, orientation, and/or movement. In a first specific example, tilting the user device forward can be mapped to zooming in and/or translating the aerial system 12 toward the target object, and/or tilting the user device backward can be mapped to zooming out and/or translating the aerial system away from the target object. In a second specific example, tilting the user device to the left can be mapped to the aerial system translating to the left, and/or tilting the user device to the right can be mapped to the aerial system translating to the right. In a third specific example, translating the user device to the left can be mapped to the aerial system undergoing a positive yaw, and/or translating the user device to the right can be mapped to the aerial system undergoing a negative yaw. However, any suitable user inputs can be mapped to any suitable aerial system movements.

Selecting a second region of a second imaging element region 210S20 can function to compensate for aerial system operation. The second imaging element region is preferably the same imaging element region used in 210S12 (e.g., both regions of the same video, both regions of the same camera sensor, etc.), but alternatively can be an imaging element region temporally preceding the first imaging element region (e.g., beyond or within a threshold time duration), temporally following the first imaging element region (e.g., beyond or within a threshold time duration), spatially adjacent or overlapping the first imaging element region (e.g., recorded concurrently with the imaging element region or recorded at any other suitable time), associated with (e.g., of or captured by) a second optical sensor on the same or different aerial system 12, or be any other suitable image- or imaging-related element. The second region is preferably selected by the same system as the system that selects the first region in 210S12, but additionally or alternatively can be selected by any other suitable computing system. The second region is preferably selected in near-real time (e.g., before, immediately after, or within a short duration after the image frames are received), similar to the first region, but can alternatively be selected at any other suitable time. The second region is preferably selected 210S20 concurrently with changing a position of the aerial system 210S18, but can additionally or alternatively be selected before 210S18, after 210S18, or at any other suitable time. The second region preferably defines a similar area (or areas) as the first region (e.g., a regular array of pixels in a contiguous area, such as an area defining a rectangle), but can alternatively include multiple non-contiguous areas, irregular pixel arrangements, and/or be any other suitable region. Similar to the first region, the second region can have any suitable arrangement, shape, and/or size with relation to the imaging element from which it is selected. The first and second regions can be the same or different sizes, can have the same or different orientation, and can be in the same position as each other, overlap (e.g., share pixels), be contiguous, or be entirely separate. Although 210S20 refers to a second region, a person skilled in the art will understand that the region can be any suitable region (e.g., third region, fourth region, etc.).

210S20 preferably includes compensating for aerial system response lag. For example, aerial system response lag (e.g., behind user input) can be due to an operation instruction generation delay, signal transmission delay, propeller spool up time, aerial system acceleration time (e.g., to begin aerial system movement, to halt or slow aerial system movement, etc.), delays due to the aerodynamics of flight, or delay due to any other suitable effect. Compensating for aerial system response lag can include determining a translation vector associated with the user input and selecting the second region such that the second region is displaced along the translation vector from the first region. The translation vector can be a display vector (e.g., vector from start point to end point or end point to start point of a drag input received on the display, vector aligned along a display axis, etc.), an aerial system vector (e.g., vector along or opposing aerial system motion associated with the user input, vector aligned along an aerial system or optical sensor axis, vector along an optical sensor active surface associated with a drag input on an image sampled by the optical sensor, etc.), or be any other suitable vector, defined relative to any other suitable system component.

In one variation, the first and second regions cooperatively define a translation vector from the center of the first region to the center of the second region. The variation can additionally or alternatively include moving the camera in a direction substantially opposing (e.g., within 1°, 5°, 10°, etc.) the translation vector (e.g., in 210S18). In a first embodiment of the variation, a camera sensor includes a first sensor edge and a second sensor edge opposing the first sensor edge, and the first and second regions are regions of the camera sensor. In this embodiment, the translation vector defines a horizontal component perpendicular to the first sensor edge, and 210S18 includes translating the aerial system in a flight direction at an obtuse (e.g., substantially straight, such as within 1°, 5°, 10°, etc.) or straight angle to the horizontal component. In one example of this embodiment, the flight direction is substantially perpendicular (e.g., within 1°, 5°, 10°, etc.) a gravity vector and substantially parallel (e.g., within 1°, 5°, 10°, etc.) a broad face of the camera sensor (e.g., the active surface).

A specific example further includes: receiving a first image sampled by the first region of the camera sensor (first sensor region), the first image including a first image region sampled proximal the first sensor edge and a second image region sampled proximal the second sensor edge; displaying the first image within the entirety of a display area of a touch-sensitive display, the display area including a first display edge and a second display edge opposing the first display edge, the first image region displayed proximal the first display edge and the second image region displayed proximal the second display edge; concurrent with the display of the first image (e.g., first image displayed at some point during the drag input, first image displayed throughout the entire drag input, etc.), receiving a drag input from the touch-sensitive display, the drag input received within the display area, the drag input including a drag vector extending toward the second display edge (e.g., and away from the first display edge); and selecting a second region of the camera sensor (second sensor region) based on the drag input, wherein the center of the first region is more proximal the second sensor edge (e.g., and more distal the first sensor edge) than the center of the second region.

In an example of compensating for aerial system response lag, wherein a video is received from the aerial system camera (e.g., wherein the regions are selected from the video, selected from the camera sensor that samples the video, etc.), 210S12 can include cropping out one or more edges of every image frame (of the video); and in response to receipt of a user input 210S16 indicative of aerial system movement in a first direction, 210S20 can include cropping out less of a first image edge, and cropping out more of a second image edge. This can function to give the appearance of video frame motion until the aerial system catches up with (e.g., performs) the specified action. In one example, each videoframe is cropped to show only the center of the frame. In response to receipt of a lateral user input to translate the aerial system to the left, each subsequent videoframe can be cropped to show a frame region left of center. Upon aerial system translation (e.g., as determined from the aerial system accelerometer or gyroscope), subsequent videoframes can be cropped to show only the frame center again. The selected region can be adjusted gradually (e.g., moving an incremental amount for each of several video frames, such as all the video frames to be displayed during the expected delay period), adjusted suddenly, adjusted based on the user input speed (e.g., tracking a drag input, such as moving an image frame region to maintain its position under the finger used for the drag input), or adjusted at any other suitable rate.

Compensating for the aerial system response lag can additionally or alternatively include recovering from a second region selection (e.g., re-centering the region selection, shifting the displayed region back to the first region, etc.). The recovery type, direction, speed, acceleration, or other recovery parameter can be predetermined, automatically determined based on aerial system parameters (e.g., flight speed, angular position, target position, etc.), or otherwise determined. In one variation, after selecting a second region displaced from the first region in a first direction, the method can include selecting a third region displaced from the second region in a second direction, wherein the first and second directions cooperatively form an obtuse or straight angle (e.g., antiparallel; oppose each other; substantially oppose each other, such as within 1°, 5°, 10°, etc.; have vertical and/or horizontal components that oppose each other; etc.). For example, the center of the third region can be between the centers of the first and second regions, can be substantially coincident the center of the first region (e.g., wherein the third region substantially overlaps the first region, wherein the third region is rotated relative to the first region, etc.), can oppose the center of the second region across the center of the first region, or can have any other suitable position relative to the other regions. The centers can be considered substantially coincident if they are within a threshold distance (e.g., 5, 10, or 50 pixels; 1, 2, or 10 mm; etc.) or within a threshold fraction (e.g., 1%, 5%, 10%, etc.) of a dimension associated with the region (e.g., a length or width of the region or the imaging element the region is selected from).

In a first embodiment of this variation, the region selection is recovered during the aerial system movement (e.g., recovered gradually throughout the movement). For example, the method can additionally include, while rotating the aerial system about the yaw axis based on a user input: receiving a third video; selecting a third region of the third video, wherein the third region is between the first and second regions (e.g., not overlapping either region, overlapping one or both regions); and displaying the third region of the third video (e.g., at the touch-sensitive display). This example can further include (e.g., still during the aerial system rotation, after the aerial system rotation, after displaying the third region of the third video, etc.) selecting a first region of the fourth video, wherein the first region of the fourth video is in the same position as the first region of the first video, and displaying the first region of the fourth video (e.g., at the touch-sensitive display). In a specific example, after displaying the second region of the second video, subsequent intermediate regions are selected and displayed to gradually move the region selection back toward the first region (e.g., the center region).

In a second embodiment of this variation, the region selection is recovered during or temporally near (e.g., within 1, 2, or 10 s, etc.) a change in the aerial system movement (e.g., return to hovering, movement direction change, etc.). This can function to compensate for lag associated with the aerial system movement change (e.g., lag in responding to a stop command, acceleration lag, etc.). For example, after selecting a second region rotated in a first direction relative to the first region and beginning to translate the aerial system (e.g., in a direction substantially parallel to the camera sensor active surface), the method can additionally include: receiving a third video from the camera; selecting a third region of the third video (e.g., wherein the center of the third region is substantially coincident with the center of the first region, wherein the third region is rotated relative to the first region in a direction opposite the first direction); and displaying the third region of the third video (e.g., at the touch-sensitive display). In a first specific example, during most of the aerial system movement, regions near the second region are selected and displayed, and near the end of aerial system movement, regions closer to the first region are selected to compensate for the aerial system deceleration time. In a second specific example, intermediate regions are selected and displayed to gradually move the region selection back toward the first region during the aerial system movement, and near the end of aerial system movement, regions past the first region are selected to compensate for the aerial system deceleration time (after which, further intermediate regions can be selected and displayed to again gradually move the region selection back toward the first region). However, the aerial system response lag can be otherwise compensated for.

210S20 can additionally or alternatively include compensating for aerial system rotation (e.g., as described in 210S12), which can occur when the aerial system rotates or translates. This functions to stabilize the resultant image, which would otherwise appear to rotate with the aerial system 12. For example, the aerial system 12 can roll when rotating laterally or translating horizontally. In a second example, the aerial system 12 will pitch when moving forward or backward. Compensating for aerial system rotation preferably includes selecting the orientation of the second region. For example, the second region can be rotated relative to the first region (e.g., by an amount substantially equal to an aerial system roll angle, such as within 1°, 5°, or 10°). In a specific example, a second camera sensor region is rotated about a roll axis in a first direction relative to a first camera sensor region, the roll axis normal to a broad face of the camera sensor (e.g., active surface), and an aerial system translation movement includes rotating the aerial system about the roll axis in a second direction opposite the first direction. In this specific example, the second region is preferably substantially upright (e.g., an edge of the second region substantially aligned with a gravity vector, such as within 1°, 5°, or 10°) during the capture of images (e.g., to be displayed in 210S22) from the second region.

In a first variation of 210S20, the second region is selected based on the user input, preferably concurrent with changing a position of the aerial system based on the user input. In a first example, the user input is a drag input including a translation vector (e.g., vector from start point to end point; component of a vector associated with the drag input, such as a horizontal or vertical component; etc.), and the second region is translated along the translation vector relative to the first region. In a second example, the user input is a drag input received within a display area of a touch-sensitive display, the display area including (e.g., bordered by) a first display edge and a second display edge opposing the first display edge. In this example, the drag input includes a drag vector (e.g., vector from start point to end point) extending away from the first display edge toward the second display edge. Furthermore, in this example, an image sampled by a first sensor region is displayed within the entirety of the display area (e.g., concurrent with receiving the drag input), wherein the image includes a first image region sampled proximal a first sensor edge and a second image region sampled proximal a second sensor edge opposing the first sensor edge, the first image region is displayed proximal the first display edge, and the second image region is displayed proximal the second display edge. In this example, the second region is selected based on the drag input such that the center of the first region is more proximal the second sensor edge than the center of the second region.

In a first embodiment of this variation, in response to a user input to move the field of view laterally (e.g., rotate left, translate left, rotate right, translate right), the second region is displaced laterally relative to the first region. In a first specific example of this embodiment (e.g., as shown in FIG. 25), in which the regions are selected from a camera sensor, the second region is selected to the left of the first region as viewed facing toward the camera (e.g., viewpoint within the camera field of view) in response to a user input to move the field of view left. In a second specific example of this embodiment, the second camera sensor region is selected to the right of the first camera sensor region as viewed facing toward the camera in response to a user input to move the field of view right. In a third specific example of this embodiment, in which the regions are selected from a video, image, or image frame, the second region is selected to be to the left of the first region in response to a user input to move the field of view left. In a fourth specific example of this embodiment, in which the regions are selected from a video, image, or image frame, the second region is selected to be to the right of the first region in response to a user input to move the field of view right.

In a second embodiment of this variation, in response to a user input to move the field of view vertically (e.g., rotate up, translate up, rotate down, translate down), the second region is displaced vertically relative to the first region. In a first specific example of this embodiment, in which the regions are selected from a video, image, or image frame, the second region is selected to be above the first region in response to a user input to move the field of view up. In a second specific example of this embodiment, in which the regions are selected from a video, image, or image frame, the second region is selected to be below the first region in response to a user input to move the field of view down. In a third specific example of this embodiment, in which the regions are selected from a camera sensor and the image formed on the camera sensor is flipped (e.g., due to the camera optics) relative to the objects forming the image, the second region is selected to be below the first region in response to a user input to move the field of view up. In a fourth specific example of this embodiment, in which the regions are selected from a camera sensor and the image formed on the camera sensor is flipped (e.g., due to the camera optics) relative to the objects forming the image, the second region is selected to be above the first region in response to a user input to move the field of view down.

In a second variation of 210S20, the second region is selected based on an aerial system position change. This can function to stabilize the video stream. The position change can be an intentional change (e.g., aerial system roll or pitch to enable lateral translation), unintentional change (e.g., movement due to wind or aerial system collision), or any other suitable position change. However, the second region can additionally or alternatively be selected in any other suitable way, based on any other suitable criteria, at any other suitable time.

The second region is preferably selected by the aerial system 12. In one example, receiving the first video and second videos and selecting the first and second regions is performed by a processor on-board the aerial system 12. Additionally or alternatively, the second region can be selected at a remote computing system such as the user device, or at any other suitable system.

Displaying an image from the second region 210S22 can function to stream the compensated images. The images can be displayed as described in 210S14, or in any other suitable manner. For example, different pixel location subsets of the image frame can be selected as the first and second regions (e.g., wherein the corresponding pixels of the first and second regions are displayed at the touch-sensitive display during 210S14 and 210S22, respectively).

The image from the second region is preferably displayed concurrent with 210S18. The image can be displayed at the start of aerial system motion, during aerial system motion, at the end of aerial system motion, and/or during the entirety of aerial system motion. In one example, the second region of the second video is displayed concurrent with changing the aerial system position based on the drag input. Additionally or alternatively, the image can be displayed before 210S18, after 210S18, and/or at any other suitable time. In one example, the image from the second region and the image from the first region are sub-images of the same image. However, the image from the second region can be otherwise displayed.

The method can optionally include compensating for aerial system rotation using a gimbal system (e.g., active or passive), attached to the optical system, that automatically stabilizes the image (e.g., relative to a gravity vector). In one example, the gimbal system can be multi-axis (e.g., 3-axis), wherein each gimbal (e.g., roll, pitch, and yaw) includes a resolver. The resolvers receive a gyro output (e.g., indicative of gyro deviation from null), perform an automatic matrix transformation according to each gimbal angle, and deliver the required torque to the respective drive motor connected to each gimbal. However, the aerial system rotation can be otherwise compensated for.

Aerial system components other than the lift mechanism preferably continue to operate in the standby mode, but can alternatively be turned off (e.g., unpowered), operated in a standby state, or otherwise operated. For example, the sensors and processor can continue to detect and analyze aerial system operation parameters and/or determine the aerial system operation status (e.g., spatial status, flight status, power status, etc.), and the communication system can continue to transmit data (e.g., video stream, sensor data, aerial system status, etc.) from the aerial system (e.g., to a user device, remote computing system, etc.). Continuing to detect and analyze aerial system status can enable the system to detect a flight event 100S10 while operating in the standby mode 100S20. For example, this enables repetition of the method (e.g., re-entering a flight mode, etc.) when the aerial system is released after being grabbed and retained (e.g., and entering a standby mode in response). In addition, this can enable flight mode recovery when an event is incorrectly identified as a standby event. In a specific example, in which a wind perturbation or collision with an object is misidentified as a grab event, the aerial system can enter the standby mode and begin to freefall (as it is not actually supported by a retention mechanism). In this specific example, the freefall can then be detected, and the aerial system 12 can resume operation in the flight mode 100S12 in response to freefall detection. Alternatively, operating the aerial system 12 in the standby mode 100S20 can include turning off and/or reducing the power consumption of any or all of the other aerial system components, operating the aerial system components at any suitable power consumption level in any suitable manner, and/or 100S20 can be performed in any other suitable manner.

Figure 43:
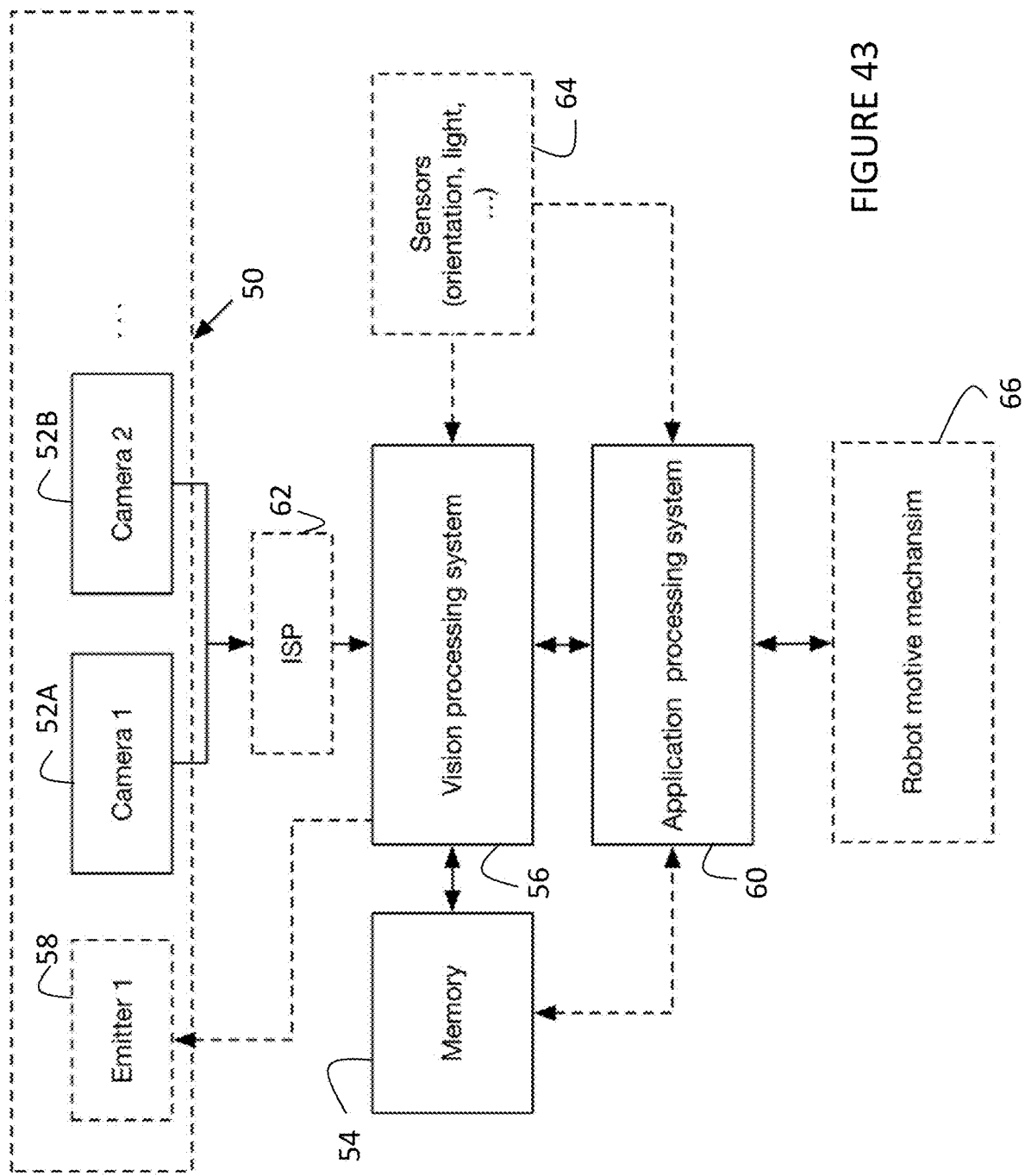
FIG. 43 is a schematic representation of an aerial system including an obstacle detection and avoidance system, according to an embodiment of the present invention.

With reference to FIG. 43, in another aspect of the present invention, the aerial system 12 may include an obstacle detection and avoidance system 50. In one embodiment, the obstacle detection and avoidance system 50 includes the pair of ultra-wide angle lens cameras 52A 52B. As will be described more fully below, the pair of cameras 52A, 52B, are equipped coaxially at the center top and center bottom of the fuselage (see below).

The method and/or system can confer several benefits over conventional systems. First, the images recorded by the camera are processed on-board, in real- or near-real time. This allows the robot to navigate using the images recorded by the cameras.

The pair of cameras 52A, 52B are generally mounted or statically fixed to housing of the body 20. A memory 54 and a vision processor 56 are connected to the pair of cameras 52A, 52B. The system functions to sample images of a monitored region for real- or near-real time image processing, such as depth analysis. The system can additionally or alternatively generate 3D video, generate a map of the monitored region, or perform any other suitable functionality.

The housing functions to retain the pair of cameras 52A, 52B in a predetermined configuration. The system preferably includes a single housing that retains the pair of cameras 52A, 52B, but can alternatively include multiple housing pieces or any other suitable number of housing pieces.

The pair of cameras 52A, 52B may function to sample signals of the ambient environment surrounding the system 12. The pair of cameras 52A, 52B are arranged with the respective view cone of each camera overlapping a view cone of the other camera (see below).

Each camera 52A, 52B can be a CCD camera, CMOS camera, or any other suitable type of camera. The camera can be sensitive in the visible light spectrum, IR spectrum, or any other suitable spectrum. The camera can be hyperspectral, multispectral, or capture any suitable subset of bands. The cameras can have a fixed focal length, adjustable focal length, or any other suitable focal length. However, the camera can have any other suitable set of parameter values. The cameras of the plurality can be identical or different.

Each camera is preferably associated with a known location relative to a reference point (e.g., on the housing, a camera of the plurality, on the host robot, etc.), but can be associated with an estimated, calculated, or unknown location. The pair of cameras 52A, 52B are preferably statically mounted to the housing (e.g., through-holes in the housing), but can alternatively be actuatably mounted to the housing (e.g., by a joint). The cameras can be mounted to the housing faces, edges, vertices, or to any other suitable housing feature. The cameras can be aligned with, centered along, or otherwise arranged relative to the housing feature. The camera can be arranged with an active surface perpendicular a housing radius or surface tangent, an active surface parallel a housing face, or be otherwise arranged. Adjacent camera active surfaces can be parallel each other, at a non-zero angle to each other, lie on the same plane, be angled relative to a reference plane, or otherwise arranged. Adjacent cameras preferably have a baseline (e.g., inter-camera or axial distance, distance between the respective lenses, etc.) of 6.35 cm, but can be further apart or closer together.

The cameras 52A, 52B may be connected to the same visual processing system and memory, but can be connected to disparate visual processing systems and/or memories. The cameras are preferably sampled on the same clock, but can be connected to different clocks (e.g., wherein the clocks can be synchronized or otherwise related). The cameras are preferably controlled by the same processing system, but can be controlled by different processing systems. The cameras are preferably powered by the same power source (e.g., rechargeable battery, solar panel array, etc.; host robot power source, separate power source, etc.), but can be powered by different power sources or otherwise powered.

The obstacle detection and avoidance system 50 may also include an emitter 58 that functions to illuminate a physical region monitored by the cameras 52A, 52B. The system 50 can include one emitter 58 for one or more of the cameras 52A, 52B, multiple emitters 58 for one or more of the cameras 52A, 52B, or any suitable number of emitters 58 in any other suitable configuration. The emitter(s) 58 can emit modulated light, structured light (e.g., having a known pattern), collimated light, diffuse light, or light having any other suitable property. The emitted light can include wavelengths in the visible range, UV range, IR range, or in any other suitable range. The emitter position (e.g., relative to a given camera) is preferably known, but can alternatively be estimated, calculated, or otherwise determined.

In a second variation, the obstacle detection and avoidance system 50 operates as a non-contact active 3D scanner. The non-contact system is a time of flight sensor, including a camera and an emitter, wherein the camera records reflections (of the signal emitted by the emitter) off obstacles in the monitored region and determines the distance between the system 50 and the obstacle based on the reflected signal. The camera and emitter are preferably mounted within a predetermined distance of each other (e.g., several mm), but can be otherwise mounted. The emitted light can be diffuse, structured, modulated, or have any other suitable parameter. In a second variation, the non-contact system is a triangulation system, also including a camera and emitter. The emitter is preferably mounted beyond a threshold distance of the camera (e.g., beyond several mm of the camera) and directed at a non-parallel angle to the camera active surface (e.g., mounted to a vertex of the housing), but can be otherwise mounted. The emitted light can be collimated, modulated, or have any other suitable parameter. However, the system 50 can define any other suitable non-contact active system. However, the pair of cameras can form any other suitable optical range finding system.

The memory 54 of the system 50 functions to store camera measurements. The memory can additionally function to store settings; maps (e.g., calibration maps, pixel maps); camera positions or indices; emitter positions or indices; or any other suitable set of information. The system 50 can include one or more pieces of memory. The memory is preferably nonvolatile (e.g., flash, SSD, eMMC, etc.), but can alternatively be volatile (e.g. RAM). In one variation, the cameras 52A, 52B write to the same buffer, wherein each camera is assigned a different portion of the buffer. In a second variation, the cameras 52A, 52B write to different buffers in the same or different memory. However, the cameras 52A, 52B can write to any other suitable memory. The memory 54 is preferably accessible by all processing systems of the system (e.g., vision processor, application processor), but can alternatively be accessible by a subset of the processing systems (e.g., a single vision processor, etc.).

The vision processing system 56 of the system 50 functions to determine the distance of a physical point from the system. The vision processing system 56 preferably determines the pixel depth of each pixel from a subset of pixels, but can additionally or alternatively determine the object depth or determine any other suitable parameter of a physical point or collection thereof (e.g., object). The vision processing system 56 preferably processes the sensor stream from the cameras 52A, 52B The vision processing system 56 may process each sensor stream at a predetermined frequency (e.g., 30 FPS), but can process the sensor streams at a variable frequency or at any other suitable frequency. The predetermined frequency can be received from an application processing system 60, retrieved from storage, automatically determined based on a camera score or classification (e.g., front, side, back, etc.), determined based on the available computing resources (e.g., cores available, battery level remaining, etc.), or otherwise determined. In one variation, the vision processing system 56 processes multiple sensor streams at the same frequency. In a second variation, the vision processing system 56 processes multiple sensor streams at different frequencies, wherein the frequencies are determined based on the classification assigned to each sensor stream (and/or source camera), wherein the classification is assigned based on the source camera orientation relative to the host robot's travel vector.

The application processing system 60 of the system 50 functions to determine the time multiplexing parameters for the sensor streams. The application processing system 60 can additionally or alternatively perform object detection, classification, tracking (e.g., optical flow), or any other suitable process using the sensor streams. The application processing system 60 can additionally or alternatively generate control instructions based on the sensor streams (e.g., based on the vision processor output). For example, navigation (e.g., using SLAM, RRT, etc.) or visual odometry processes can be performed using the sensor streams, wherein the system and/or host robot is controlled based on the navigation outputs.

The application processing system 60 can additionally or alternatively receive control commands and operate the system 12 and/or host robot based on the commands. The application processing system 60 can additionally or alternatively receive external sensor information and selectively operate the system and/or host robot based on the commands. The application processing system 60 can additionally or alternatively determine robotic system kinematics (e.g., position, direction, velocity, and acceleration) based on sensor measurements (e.g., using sensor fusion). In one example, the application processing system 60 can use measurements from an accelerometer and gyroscope to determine the traversal vector of the system and/or host robot (e.g., system direction of travel). The application processing system 60 can optionally automatically generate control instructions based on the robotic system kinematics. For example, the application processing system 60 can determine the location of the system (in a physical volume) based on images from the cameras 52A, 52B, wherein the relative position (from the orientation sensors) and actual position and speed (determined from the images) can be fed into the flight control module. In this example, images from a downward-facing camera subset can be used to determine system translation (e.g., using optical flow), wherein the system translation can be further fed into the flight control module. In a specific example, the flight control module can synthesize these signals to maintain the robot position (e.g., hover a drone).

The application processing system 60 can include one or more application processors. The application processor can be a CPU, GPU, microprocessor, or any other suitable processing system. The application processing system 60 can implemented as part of, or separate from, the vision processing system 56, or be different from the vision processing system 56. The application processing system 60 may be connected to the visual processing system 56 by one or more interface bridges. The interface bridge can be a high-throughput and/or bandwidth connection, and can use a MIPI protocol (e.g., 2-input to 1-output camera aggregator bridges—expands number of cameras that can be connected to a vision processor), a LVDS protocol, a DisplayPort protocol, an HDMI protocol, or any other suitable protocol. Alternatively, or additionally, the interface bridge can be a low-throughout and/or bandwidth connection, and can use a SPI protocol, UART protocol, I2C protocol, SDIO protocol, or any other suitable protocol.

The system can optionally include an image signal processing unit (ISP) 62 that functions to pre-process the camera signals (e.g., images) before passing to vision processing system and/or application processing system. The ISP 62 can process the signals from all cameras, the signals from the camera subset, or signals any other suitable source. The ISP 62 can auto-white balance, correct field shading, rectify lens distortion (e.g., dewarp), crop, select a pixel subset, apply a Bayer transformation, demosaic, apply noise reduction, sharpen the image, or otherwise process the camera signals. For example, the ISP 62 can select the pixels associated with an overlapping physical region between two cameras from images of the respective streams (e.g., crop each image to only include pixels associated with the overlapping region shared between the cameras of a stereo-camera pair). The ISP 62 can be a system on a chip with multi-core processor architecture, be an ASIC, have ARM architecture, be part of the vision processing system, be part of the application processing system, or be any other suitable processing system.

The system can optionally include sensors 64 that function to sample signals indicative of system operation. The sensor output can be used to determine system kinematics, process the images (e.g., used in image stabilization), or otherwise used. The sensors 64 can be peripheral devices of the vision processing system 56, the application processing system 60, or of any other suitable processing system. The sensors 64 are preferably statically mounted to the housing but can alternatively be mounted to the host robot or to any other suitable system. Sensors 64 can include: orientation sensors (e.g., IMU, gyroscope, accelerometer, altimeter, magnetometer), acoustic sensors (e.g., microphones, transducers), optical sensors (e.g., cameras, ambient light sensors), touch sensors (e.g., force sensors, capacitive touch sensor, resistive touch sensor), location sensors (e.g., GPS system, beacon system, trilateration system), or any other suitable set of sensors.

The system can optionally include inputs (e.g., a keyboard, touchscreen, microphone, etc.), outputs (e.g., speakers, lights, screen, vibration mechanism, etc.), communication system (e.g., a WiFi module, BLE, cellular module, etc.), power storage (e.g., a battery), or any other suitable component.

The system is preferably used with a host robot that functions to traverse within a physical space. The host robot can additionally or alternatively receive remote control instructions and operate according to the remote control instructions. The host robot can additionally generate remote content or perform any other suitable functionality. The host robot can include one or more: communication modules, motive mechanisms, sensors, content-generation mechanisms, processing systems, reset mechanisms, or any other suitable set of components. The host robot can be a drone, vehicle, robot, security camera, or be any other suitable remote-controllable system. The motive mechanism can include a drivetrain, rotors, jets, treads, rotary joint, or any other suitable motive mechanism. The application processing system is preferably the host robot processing system, but can alternatively be connected to the host robot processing system or be otherwise related. In a specific example, the host robot includes an aerial system (e.g., drone) with a WiFi module, a camera, and the application processing system. The system can be mounted to the top of the host robot (e.g., as determined based on a gravity vector during typical operation), the bottom of the host robot, the front of the host robot, centered within the host robot, or otherwise mounted to the host robot. The system can be integrally formed with the host robot, removably coupled to the host robot, or otherwise attached to the host robot. One or more systems can be used with one or more host robots.

In another aspect of the present invention, a (sub) system and method M220 may be utilized to provide autonomous photography and/or videography to the aerial system 12. The autonomous photography and/or videography system 70 may be implemented, at least in part, by the processing system 22, the optical system 26, the actuation system 28 and the lift mechanism 32.

As will be discussed in more detail below, the autonomous photography and/or videography system 70 is configured to establish a desired flight trajectory, to detect a target, and to control the flight of the aerial system 12 as a function of the desired flight trajectory relative to the target using the lift mechanism. The autonomous photography and/or videography system 70 is further configured to control the camera to capture pictures and/or video.

Further, the autonomous photography and/or videography system 70 may be operable to (1) automatically modify the camera angle and flight trajectory with the target in the picture without any interaction between the user and any device; (2) automatically take photos or record videos without any interaction between the user and any device; and (3) automatically select good candidates of photos and/or video clips from raw photo/video material for further user editing or automatic editing procedures.

Figure 44:
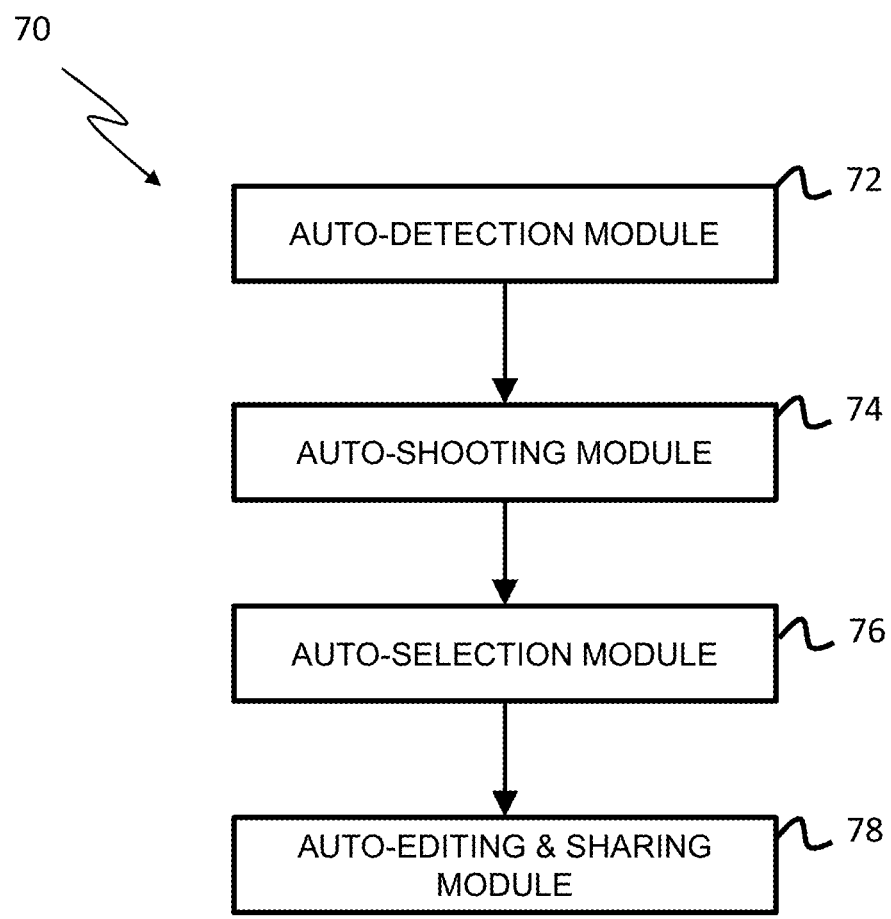
FIG. 44 is a block diagram of an autonomous photography and/or videography system, according to an embodiment of the present invention.

With reference to FIG. 44, in one embodiment the autonomous photography and/or videography system 70 includes an auto-detection and tracking module 72, an auto-shooting module 74, an auto-selection module 76 and an auto-editing and sharing module 76. As stated above, the modules 72, 74, 76, 78 may be implemented in part by a combination of software implemented vision algorithms and hardware, e.g., the processing system 22. From a user perspective, the modules 72, 74, 76, 78 may provide a fully autonomous experience. Alternatively, one or more of the modules 72, 74, 76, 78 may be used to provide a (less than fully autonomous) mode that allows the user to more easily take pictures or videos with the aerial system 12.

After the aerial system 12 has launched, the auto-detection and tracking module 72 initiates a target detection process. The target detection process will detect a target, such as a person or other item or object (see above).

After the target has been detected/located, the auto-detection and tracking module 72 modifies the angle of one of the optical sensors or cameras 36 of the optical system 26 using the actuation system 28 and modifies the flight trajectory of the aerial system 12 based on a selected flight trajectory.

The optical sensor(s) 36 acts as a vision sensor for the auto-detection and tracking module 72. The auto-detection and tracking module 72 may utilize a target detection and tracking algorithm to detect and locate the target from the video feed of the optical system 26 and a self-positioning fusion algorithm to integrate positioning data from various sensors 44. By combining the information from the self-positioning sensor fusion algorithm and the target detection and tracking algorithm, the relative position and velocity of the target to the aerial system 12 can be obtained.

In one embodiment, the target detection and tracking algorithm may include one or more of the following techniques:

(a) Tracker based techniques: TLD-tracker, KCF-tracker, Struck-tracker, CNN-based-tracker, etc.

(b) Detector based techniques: face detection algorithms, like Haar+Adaboost, face recognition algorithms, like EigenFace, human body detection algorithms, like HOG+SVM or DPM, CNN-based-object-detection methods, etc.

Additional sensor(s) may be attached to the target for even more reliable performance. For example, a GPS sensor and an inertial measurement unit (IMU) may be included in the tracker device attaching to the target. Then the information of the sensors may be transmitted via a wireless method such as Wi-Fi, or Bluetooth to the main aerial system 12. The synchronized sensor info can be used as additional supplementary observation data for better assisting the vision based target detection and tracking algorithms. The data can be used either in a filter based manner such as dumping the data into a EKF system, or in a supplementary manner such as using it as prior information for providing better tracking accuracy of the vision based tracker.

In one embodiment, the self-positioning fusion algorithm may include an extended Kalman Filter (EKF) doing sensor filtering and fusion of accelerometer, gyroscope, magnetometer, barometer, optical flow sensor, GPS, proximity sensor, sonar/radar, TOF based range finder, etc.

The same or additional vision sensor(s) providing visual odometry capability. The vision sensor is preferably having a known and fixed relative pose to the body of the aerial system. A movable vision sensor may also be provided (as long as its relative pose to the body can be accurately monitored and updated promptly). Extra inertial sensor measurements are preferred but not required. If without synchronous readings from inertial measurement unit (IMU), techniques such as visual SLAM, and SVO may be applied. If we do use the additional IMU info, then VIO and VIN can be applied.

Once the (1) the aerial system self-positioning information by using self-positioning sensor fusion techniques, (2) gimbal angle(s), and (3) 2D target position from the vision sensor, have been established, an online estimation of absolute position and velocity of the target, as well as the position and velocity of the target relative to the aerial system, may be derived.

Then the system may apply proper control strategies to fly in a designed trajectory while aiming the target in the meantime. Several different control strategies may be applied:

(a) The aerial system 12 may simply follow the target from behind, keeping a fixed distance (indefinitely or for a finite amount of time);

(b) The aerial system 12 may lead the target at the front while aiming the target, keeping a fixed distance (indefinitely or for a finite amount of time);

(c) The aerial system 12 may orbit around the target at a fixed distance with a constant/varying speed (indefinitely or for a finite amount of time);

(d) The aerial system 12 may move closer to or further away from certain camera aiming angle, with a constant/varying speed, for a finite amount of time;

(e) The aerial system 12 may move in a certain direction (in world coordinates or in target coordinate) while the optical system 26 is aimed the target, with a constant/varying speed, for a finite amount of time;

(f) The aerial system 12 may fix some degrees of freedom and only use some of its DOFs to track and aim the target, for example, it may stay at a certain 3D position in the air, and only track and aim the target by controlling its own yaw angle and the axes of its camera gimbal;

(g) A piece of trajectory and/or a series of control commands may be performed by professional photographers and recorded as a candidate of pre-defined trajectory. Data such as camera angle, relative distance and velocity of the target to the aerial system, location of target in the scene, absolute position and velocity of the aerial system, etc. at each time stamp can be saved, then an online trajectory planning algorithm can be applied to generate control commands to replicate the same trajectory;

(h) A combination of any above control strategies (or other control strategies under same principle) in sequence, either in a pre-defined order, or in a pseudo random order.

In one embodiment, one or more of these strategies may be presented to the user and selected as a desired flight trajectory.

After the target has been identified, the auto-shooting module 74 will control the optical system 26 to automatically begin obtaining pictures and/or video, i.e., "auto-shooting". While auto-shooting, the aerial system 12 or drone will fly on a designed flight trajectory with the camera angle automatically changing to maintain the target within the pictures and/or video. Auto-shooting may be based on several mechanisms: auto light condition optimization, face movement analysis, expression analysis, behavior analysis, pose analysis, condition analysis, composition analysis, and object analysis. From video-taking perspective, the aerial system 12 or drone may also automatically move in a wide range, both low and high, close and distant, lift and right, front and back and side, to make the video more vivid. The designated flight trajectory may be dynamically determined based on predetermined parameters and/or changing conditions based on sensor input. In other words, the drone or aerial system 12 could traverse a trajectory to simulate or emulate operation of the camera in a manner similar to a professional photographer or videographer. Alternatively, the user can select one or more trajectories from a set of pre-designed routes or pre-defined routes.

Further, in another aspect of the present invention, the auto-shooting module 74 has one or more modes. For example, in one embodiment, the auto-shooting module 74 may have one the following modes:

Mode 1: Taking a series of snapshots;
Mode 2: Taking a continuous video; or,
Mode 3: Taking a continuous video, at the same time taking a series of snapshots.

The mode may be selected by the user and/or be associated with a selected flight trajectory (see below).

The auto-selection module 76 selects pictures and/or video (segments) from among the obtained (or captured) pictures and/video based on a set of predetermined parameters. The selected pictures and/or video may be retained ad/or stored or alternatively, marked as being "selected". The set of predetermined parameters may include, but is not limited to: blurriness, exposure, and/or composition. For example, a blurriness detector may utilize a either a Laplacian of Gaussian filter or a variance of Laplacian filter or other suitable filter.

One example of vibration detector may utilize an inertial measurement unit or IMU (accelerometer, gyroscope, etc.) data, for a given section of data, pick a moving window time interval, calculate the variance/standard deviation within this moving window, and compare it to a pre-defined threshold.

A lower frequency vibration filter, i.e. video stability filter, can be realized by checking the 2D trajectory of the main target in the view, or by checking the sensor detected camera angle traces. A stable video can better keep the target in the view and/or keep a more stable camera angle.

For pictures, pictures are selected and/or not-selected based on the predetermined parameters. For videos, video segments may be selected and/or not selected based on the predetermined parameters. Alternatively, the auto-selection module 76 may select sub-segments from a given video segment based on the predetermined parameters and crop (and save) the sub-segment(s) as a function of the predetermined parameters.

In one aspect of the present invention, the auto-selection module 76 may be implemented. This module can work on a drone or on a smart phone. It is capable of automatically selecting photos or a truncated video clip (for example, 3-second/6-second/10-second video snippet), from a longer raw video material. Here are some rules for judging a piece of footage/video snippet: blurriness, video-stability, exposure, composition, etc. Technical points are as follows:

Over/under exposure detector: Calculate the exposure value at regions of interest, and check whether the values are below the lower threshold—underexposure/above the higher threshold—overexposure.

Composition: For each photo and video clip candidate, a target object detection or retrieve the recorded target object detection result may be performed. The results may then be analyzed to determine if the photo composition is "good" or "acceptable", in other words, whether the target is at a good location in the photo/video frame. A straight forward rule can be that if the center of the bounding box of the detected target is not within certain preferred area of the view, then it is considered as a bad candidate. More sophisticated methods leveraging deep learning may also be applied to check whether it is a good photo composition, such as: a number of Good or Acceptable photos and a number of Bad or Unacceptable photos are collected and analyzed. The collected photos are used to train a neural network to learn the rules. Finally the trained network can be deployed on the device (drone or phone) to help selecting Good or Acceptable photos.

The auto-editing and sharing module 78 modifies, i.e., edits, the selected pictures and/or selected video (segments or sub-segments) based on a set of predetermined editing parameters. The parameters may be modified by the user, e.g., using templates. In another aspect of the present invention, the auto-editing and sharing module shares the select and/or edited pictures and/or video segments with other users, devices, social networking or media sharing services. In still another aspect of the present invention, the auto-editing and sharing module 78 allows users to manually edit pictures and/or video.

Figure 45:
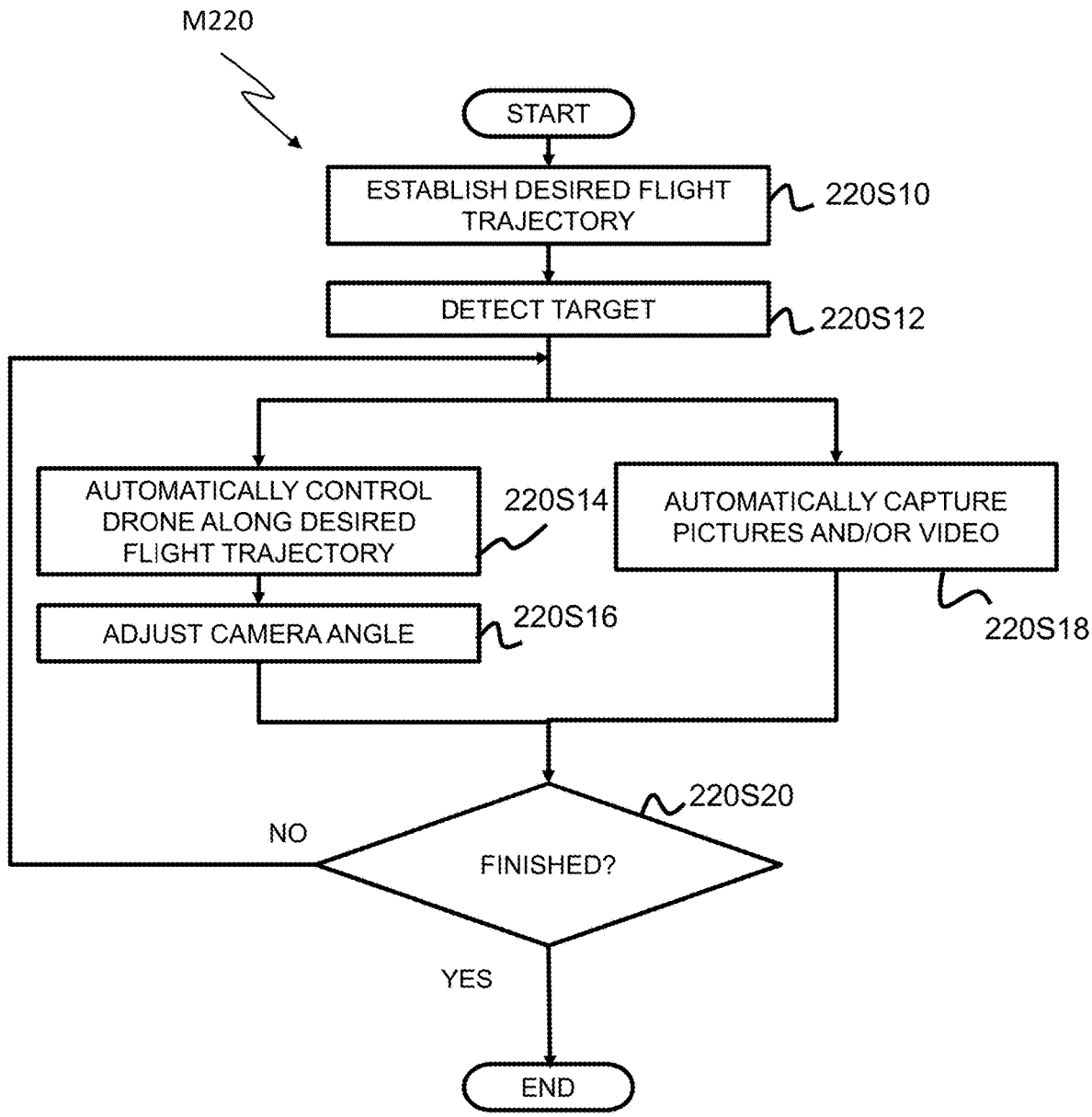
FIG. 45 is a flow diagram of a method associated with the autonomous photography and/or videography system of FIG. 44.

With reference to FIG. 45, a method M220 for operating the aerial system 12, according to an embodiment of the present invention is shown. In a first step 220S10, a desired flight trajectory is established. In general, the flight trajectory may be selected by the user from a set of predefined flight trajectories (see above). In a second step 220S12, a target is detected. The flight of the drone, relative to the target, is controlled (step 220S14) and a camera angle of the optical system 26 (step 220S16) is adjusted according to the desired flight trajectory, for example, to keep the target in frame, in a desired position in the frame and/or along a path within the frame.

In a fifth step 220S18, pictures and/or video are automatically captured as the drone is controlled over the desired flight trajectory.

In a sixth step 220S20, if the flight trajectory has been completed, then the method M220 ends. Otherwise, control returns to the third and fifth steps.

Figure 46:
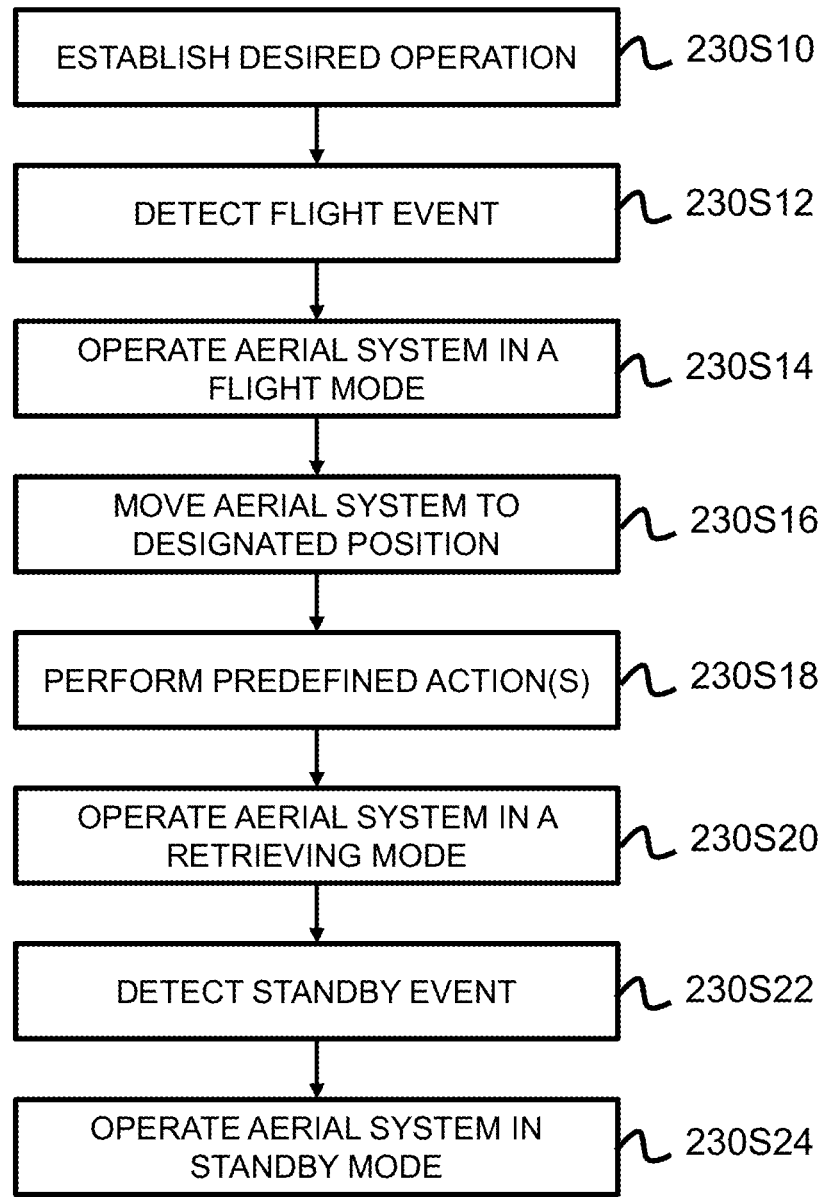
FIG. 46 is a flow diagram of a method for providing easy to use release and auto-positioning of a drone according to an embodiment of the present invention.

With reference to FIG. 46, a method M230 for controlling an aerial system 12 is provided. The method M230 allows the user to select an operation from a list of possible operations and initiate a flight event. Based on the selected desired operation and flight event, the method M230 makes the aerial system 12 to enter a flight mode, moves the aerial system 12 to a designate position and performs one or more predefined actions. Once the predefined actions are completed, the aerial system 12 may be placed in a retrieving mode. Once retrieved, the aerial system 12 may detect a standby event and operated or placed in a standby mode.

In a first step 230S10, the user is presented with a set of predefined operations. In general, the predefined operations may include a mode and at least one target. The mode may include, but is not limited to: (1) taking a snapshot, (2) taking a series of snapshots, (3) taking a video with or without snapshot(s), and (4) taking one or more videos with or without snapshot(s). More complex operations may also be utilized, e.g., an auto-follow of the target while taking snapshot(s) and/or video. Each of the actions may be performed immediately or after a time delay. Videos may be of a fixed length or may be terminate after a predetermined event. Snapshots and/or video may be taken after a predetermined condition has been met, e.g., human/face detection/recognition or until the camera has focused on the target. The target may be the user, another (or target) person, or an object or location. The target person, object or location may be an object in a direction associated with the flight event (see below) or may be marked with a RFID or similar tag (see above).

In one embodiment, the set of predefined operations is presented to the user via a user interface. The user interface may be located on the remote device 14 or the body 20 of the aerial system 12 or drone. In general, the predefined operations are preset, but some operations, may be defined by the user, e.g., more complex operations with more than one target and/or a mode with more than one action.

If the user interface is located on the body 20 of the aerial system 12, the user interface may include a display screen with one more buttons for navigating through, and/or selecting one of, the set of predefined operations. Alternatively, a touchscreen device may be used to navigate through, and/or to select one of, the set of predefined operations. After the operation has been completed, the capture snapshot(s) and/or video(s) may be previewed on the display screen.

Figure 47:
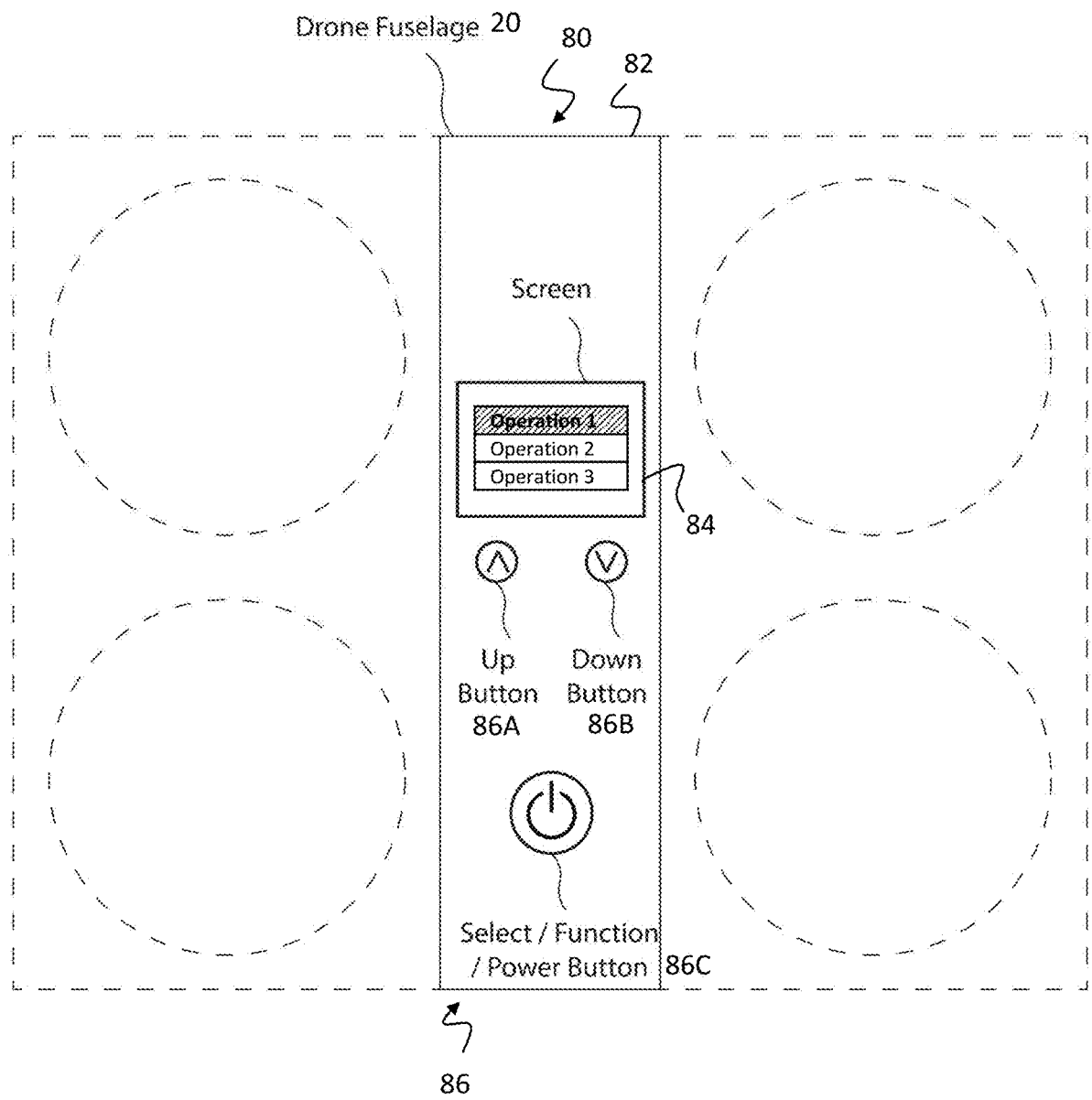
FIG. 47 is a diagrammatic illustration of an aerial system having a user interface located on a body of the aerial system, according to an embodiment of the present invention.

With reference to FIG. 47, an exemplary user interface 80 is shown. The user interface 80 is embodied in a user screen module 82 that includes a display screen 84 and one or more buttons 86. In the illustrated embodiment, the screen module 82, including the buttons 86 are equipped on the body 20 of the aerial system 12. The physical screen module 82 can be designed and placed on the top, bottom or side surface of the body 20. The display screen 84 can be a LED array display, TFT (Thin Film Diode) display, OLED (Organic Light-Emitting Diode) display, AMOLED (Active-matrix organic light-emitting diode) display, capacitive touchscreen, or any other alternative screen display. As shown, the display screen 84 may display the available operations and the currently selected operation of the drone. In the illustrated embodiment, the buttons include an up and down buttons 86A, 86B to navigate the available operations. A power button 86C may also operate as a select or function button.

The interface to connect the system application processor and the display may be a MIPI display serial interface (DSI), a display parallel interface (DPI), etc. or other suitable interface. One or multiple buttons can be utilized to choose and/or confirm flight mode selection.

The screen module 82 may include a touchscreen device. The buttons 86 may be replaced by, or supplemented by like buttons or functions implemented on the touchscreen device. Events like single click, multiple clicks, long press, etc. can be applied to interpret different instructions.

In another embodiment, the screen may also be replaced, or supplemented by a speaker such that mode selection and confirmation can be achieved in an interactive audio way. In yet another embodiment, the display can be replaced by one or multiple single-color or multi-color LEDs. Different combinations of lid LEDs stand for different mode selection and/or status.

Returning to FIG. 46, in a second step 230S12, a flight event is detected. Detection of a flight event provides an indication to the aerial system 12 to initiate the selected operation. Exemplary flight events include, but are not limited to: (1) release of the aerial system 12 from a user's hand, (2) the aerial system 12 being moved, e.g., tossed or thrown, along a force vector, (3) the aerial system 12 has been raised above a predetermined threshold, or (4) other suitable event. Other examples and further details are explained above, starting with FIG. 10, and in particular step 100S10.

In a third step 230S14, once the flight event has been detected, aerial system 12 is operating into a flight mode (see above, and in particular, step 100S12 of FIG. 10 and description following).

In a fourth step 230S16, the aerial system 12 is operating to move into a designated position. For instance, the designated position may be relative to the user, target user, object or location. More complex operations may have multiple target user(s), object(s) and/or location(s). The designated position may also be determined as a function of the flight event. For example, a flight event may have an associated force vector, i.e., the vector at which the drone is tossed. The aerial system 12 may utilizing a self-positioning algorithm to estimate the aerial system's 12 trajectory as the flight event is detected and then operating a flight mode.

In one embodiment, the designated position may be determined as a function of the flight event. For example, different initial release & hover speed can be interpreted as different distance travel command. A faster initial speed (a hard throw) may be interpreted as a command of "going further away from the target". The direction to travel can be also determined by using the obtained estimated trajectory information. As the aerial system 12 travels to designated position, it then automatically orients itself toward the user or target by adjusting its yaw direction and camera gimbal controls (if applicable).

In one embodiment, the information from an onboard inertial measurement unit (IMU) is used to estimate the velocity and position of the aerial system, for example, by integrating the measurements from the 3-axis accelerometer. The obtained trajectory information within a small period of time (e.g., 0.5 to 1 s) is then used to interpret the positioning command from the user.

In another embodiment, a vision-based localization system is equipped onboard to estimate the trajectory of the aerial system. The sensors of the vision-based localization system may be composed of but not limited to: a monovision camera system, a monovision camera system with IMU(s), a stereovision camera system, a stereovision camera system with IMU(s), etc. Algorithms in categories of optical flow, simultaneous localization and mapping (SLAM), and visual odometry (VO) may be applied to estimate the position and trajectory of the aerial system. In a preferred embodiment, a visual inertial odometry system is used. The system consists of a wide angle global shutter camera, an IMU, and a processor for performing the VIO algorithm. Preferably, the IMU and one or more cameras are rigidly mounted on the fuselage of the aerial system. The camera can be mounted downward, forward, or at a 45-degree angle downward. Detailed visual inertial odometry algorithm can be referred to state-of-the-art techniques such as VIO, and VIN, etc.

In another embodiment, the aerial system 12 first stabilizes itself in the air and then flies to a designated location via a designated route (see above).

In a fifth step 230S18, the predefined action(s) in the selected operation are performed (see above). It should be noted one or more of the action(s) may occur prior to the fourth step 230S16, i.e., snapshots and/or video may be taken before the aerial system 12 has reached the designated position, e.g., as the aerial system 12 is moving towards the designated position.

In a sixth step 230S20, after the operating has finished, (i.e., all actions completed, a time out, or user interrupt), a retrieval process or mode is initiated (see above). In one embodiment, the aerial system 12 automatically hovers and moves down to a reachable height for the user to grab it back. In another embodiment, the aerial system 12 detects the relative position between the aerial system 12 and the user by using history trajectory information or by recalculating the desired trajectory in an online manner using vision information, and then flies back to the user.

Once the retrieval process has completed, in a seventh step 230S22 a standby event is detected, and then in an eighth step 230S24, the aerial system 12 is placed in a standby mode.

The above method M230 discussed with respect to FIG. 46, provides a method that makes it easier for the user to position a drone at a desired location and provides simpler and more direct user interaction with button/screen/touchscreen on the aerial system 12. Since the user selects the desired operation and the aerial system 12 handles the rest, the time necessary to position a drone position at a desired location to perform predefined actions, without requiring manual user control, is shortened.

Although omitted for conciseness, the preferred embodiments include every combination and permutation of the various system components and the various method processes, wherein the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

What is claimed is:

1. An aerial system, comprising:
   a body;
   a lift mechanism coupled to the body;
   an optical system including an optical sensor mounted to the body;
   a user interface including a display screen mounted on an outer surface of the body; and
   a processing system including a memory device and a processor coupled the memory device, the memory device including a plurality of predefined flight control operations stored thereon, each predefined flight control operation including a corresponding flight trajectory performed by the lift mechanism and a corresponding image capture operation performed by the optical system, the processor programmed to:
   display the plurality of predefined flight control operations on the display screen;
   receive a selection of a predefined flight control operation from a user via the user interface; and
   execute the user selected predefined flight control operation by:
   operating the lift mechanism in a flight mode;
   operating the optical system to detect a target;
   establishing a current flight trajectory relative to the target based on the corresponding flight trajectory associated with the selected predefined flight control operation;
   controlling the lift mechanism to move the aerial system based on the established current flight trajectory; and
   operate the optical system to perform the corresponding image capture operation associated with the selected predefined flight control operation; and
   operate the aerial system in a standby mode upon completing the selected predefined flight control operation.

2. The aerial system of claim 1, wherein the processor is programmed to:
   detect a release event in which the aerial system is released from being physically held by the user and responsively operate the lift mechanism to hover the aerial system;
   detect a flight event indicating that the aerial system has been supported substantially horizontally for greater than a threshold period of time; and
   control the lift mechanism to move the aerial system based on the established current flight trajectory upon detecting the flight event.

3. The aerial system of claim 2, wherein the processor is programmed to:
   determine a current location of the aerial system upon receiving the selection of the predefined flight control operation by the user via the user interface;
   associate the current location of the aerial system with an initial target location associated with the target;
   detect the release event and responsively operate the lift mechanism to hover the aerial system; and
   control the lift mechanism to orientate the optical sensor towards the initial target location.

4. The aerial system of claim 3, wherein the processor is programmed to detect an initial release speed upon detecting the release event and responsively establish a distance travel command as a function of the detected initial release speed.

5. The aerial system of claim 4, wherein the processor is programmed to:
   detect an initial trajectory upon detecting the release event; and
   establish a direction to travel based on the established current flight trajectory and the detected initial trajectory.

6. The aerial system of claim 1, wherein the processor is programmed to:
   operate the aerial system in a retrieving mode when the selected predefined flight control operation has completed;
   detect a standby event; and
   operate the aerial system in the standby mode in response to detecting the standby event.

7. The aerial system of claim 1, wherein the user interface is implemented using one or more of the following: a menu displayed on the display screen, a touchscreen device, and/or one or more buttons.

8. The aerial system of claim 1, wherein the processor is programmed to operate the optical system to perform the corresponding image capture operation including automatically begin obtaining pictures and/or video of the target.

9. The aerial system of claim 8, wherein the processor is programmed to track the target during flight mode and automatically adjust an orientation of the optical sensor to maintain the target within pictures and/or video captured by the optical sensor.

10. The aerial system of claim 1, wherein the corresponding image capture operation includes the optical system performing one of more of: (1) taking a snapshot, (2) taking a series of snapshots, (3) taking a video with or without snapshot(s), and (4) taking one or more videos with or without snapshot(s).

11. A method for controlling an aerial system including a body, a lift mechanism coupled to the body, an optical system including an optical sensor mounted to the body, a user interface including a display screen mounted on an outer surface of the body, and a processing system including a memory device and a processor coupled the memory device, wherein the memory device includes a plurality of predefined flight control operations stored thereon, each predefined flight control operation including a corresponding flight trajectory performed by the lift mechanism and a corresponding image capture operation performed by the optical system, the method includes the processor performing the steps of:
displaying the plurality of predefined flight control operations on the display screen;
receiving a selection of a predefined flight control operation from a user via the user interface; and
executing the user selected predefined flight control operation by:
operating the lift mechanism in a flight mode;
operating the optical system to detect a target;
establishing a current flight trajectory relative to the target based on the corresponding flight trajectory associated with the selected predefined flight control operation;
controlling the lift mechanism to move the aerial system based on the established current flight trajectory; and
operate the optical system to perform the corresponding image capture operation associated with the selected predefined flight control operation; and
operate the aerial system in a standby mode upon completing the selected predefined flight control operation.

12. The method of claim 11, including the processor performing the steps of:
detecting a release event in which the aerial system is released from being physically held by the user and responsively operating the lift mechanism to hover the aerial system;
detecting a flight event indicating that the aerial system has been supported substantially horizontally for greater than a threshold period of time; and
controlling the lift mechanism to move the aerial system based on the established current flight trajectory upon detecting the flight event.

13. The method of claim 12, including the processor performing the steps of:
determining a current location of the aerial system upon receiving the selection of the predefined flight control operation by the user via the user interface;
associating the current location of the aerial system with an initial target location associated with the target;
detecting the release event and responsively operate the lift mechanism to hover the aerial system; and
controlling the lift mechanism to orientate the optical sensor towards the initial target location.

14. The method of claim 13, including the processor performing the steps of detecting an initial release speed upon detecting the release event and responsively establishing a distance travel command as a function of the detected initial release speed.

15. The method of claim 14, including the processor performing the steps of:
detecting an initial trajectory upon detecting the release event; and
establishing a direction to travel based on the established current flight trajectory and the detected initial trajectory.

16. The method of claim 11, including the processor performing the steps of:
operating the aerial system in a retrieving mode when the selected predefined flight control operation has completed;
detecting a standby event; and
operating the aerial system in the standby mode in response to detecting the standby event.

17. The method of claim 11, wherein the user interface is implemented using one or more of the following: a menu displayed on the display screen, a touchscreen device, and/or one or more buttons.

18. The method of claim 11, including the processor performing the steps of operating the optical system to perform the corresponding image capture operation including automatically begin obtaining pictures and/or video of the target.

19. The method of claim 18, including the processor performing the steps of tracking the target during flight mode and automatically adjusting an orientation of the optical sensor to maintain the target within pictures and/or video captured by the optical sensor.

20. The method of claim 11, wherein the corresponding image capture operation includes the optical system performing one of more of: (1) taking a snapshot, (2) taking a series of snapshots, (3) taking a video with or without snapshot(s), and (4) taking one or more videos with or without snapshot(s).

* * * * *